US007967682B2

(12) United States Patent
Huizinga

(10) Patent No.: US 7,967,682 B2
(45) Date of Patent: Jun. 28, 2011

(54) WIRELESS GAMING ENVIRONMENT

(75) Inventor: Richard Huizinga, Mercer Island, WA (US)

(73) Assignee: Bally Gaming, Inc., Las Vegas, NV (US)

(*) Notice: Subject to any disclaimer, the term of this patent is extended or adjusted under 35 U.S.C. 154(b) by 707 days.

(21) Appl. No.: 11/480,274

(22) Filed: Jun. 30, 2006

(65) Prior Publication Data

US 2007/0243935 A1 Oct. 18, 2007

Related U.S. Application Data

(60) Provisional application No. 60/791,397, filed on Apr. 12, 2006.

(51) Int. Cl.
*G06F 17/00* (2006.01)
*G06F 19/00* (2006.01)

(52) U.S. Cl. .............................. 463/42; 463/40; 463/41

(58) Field of Classification Search ............... 463/40–42
See application file for complete search history.

(56) References Cited

U.S. PATENT DOCUMENTS 3,766,452 A 10/1973 Burpee et al. ............. 317/262 R
3,787,660 A 1/1974 Meyers et al. ........... 235/61.9 R
3,810,172 A 5/1974 Burpee et al. ............... 343/5 PD
4,026,309 A 5/1977 Howard ........................ 133/8 R
4,108,361 A 8/1978 Krause .......................... 235/375
4,339,798 A * 7/1982 Hedges et al. .................. 463/26
4,373,726 A 2/1983 Churchill et al. ......... 273/138 A
4,467,424 A 8/1984 Hedges et al. ................ 364/412
4,531,187 A 7/1985 Uhland ......................... 364/412
4,592,377 A 6/1986 Paulsen et al. ................ 133/5 R
4,636,846 A 1/1987 Villarreal ...................... 358/100
4,656,463 A 4/1987 Anders et al. ................. 340/572
4,693,480 A 9/1987 Smith ........................... 273/296
4,725,079 A 2/1988 Koza et al. ...................... 283/73
4,755,941 A 7/1988 Bacchi .......................... 364/412
4,802,218 A 1/1989 Wright et al. .................... 380/23
4,814,589 A 3/1989 Storch et al. .................. 235/375
4,832,341 A 5/1989 Muller et al. ................. 273/139
4,861,041 A 8/1989 Jones et al. ................... 273/292
4,926,996 A 5/1990 Eglise et al. .................. 194/212
(Continued)

FOREIGN PATENT DOCUMENTS

DE 44 39 502 C1 9/1995
(Continued)

OTHER PUBLICATIONS

U.S. Appl. No. 11/030,609, filed Jan. 5, 2005, Soltys et al.

(Continued)

*Primary Examiner* — Melba Bumgarner
*Assistant Examiner* — Milap Shah
(74) *Attorney, Agent, or Firm* — Seed IP Law Group PLLC

(57) ABSTRACT

A system employs a server computing system with an integrated database and wireless communications devices, for example, handheld personal digital assistants (PDAs). The server computing system may also communicate with fully automated data collection systems associated with some gaming tables and/or with the casino's legacy data collection systems and databases. The server computing system may communicate with various non-gaming related casino systems, such as point-of-sale terminals and/or accounting systems, related to the various guest facilities, for example, allowing player comps to be freely exchanged for services and merchandise. The wireless communications devices permit remote wagering.

17 Claims, 40 Drawing Sheets

U.S. PATENT DOCUMENTS

| | | | | |
|---|---|---|---|---|
| 4,948,138 | A | 8/1990 | Pease et al. | 273/138 A |
| 5,007,641 | A | 4/1991 | Seidman | 273/138 A |
| 5,053,612 | A | 10/1991 | Pielemeier et al. | 235/462 |
| 5,083,800 | A | 1/1992 | Lockton | 273/439 |
| 5,103,081 | A | 4/1992 | Fisher et al. | 235/464 |
| 5,156,397 | A | 10/1992 | Valenza, Jr. | 273/138 |
| 5,166,502 | A | 11/1992 | Rendleman et al. | 235/492 |
| 5,179,517 | A | 1/1993 | Sarbin et al. | 364/410 |
| 5,199,710 | A | 4/1993 | Lamle | 273/149 R |
| 5,216,234 | A | 6/1993 | Bell | 235/494 |
| 5,258,837 | A | 11/1993 | Gormley | 358/140 |
| 5,265,874 | A | 11/1993 | Dickinson et al. | 273/138 A |
| 5,273,281 | A | 12/1993 | Lovell | 273/138 R |
| 5,283,422 | A | 2/1994 | Storch et al. | 235/375 |
| 5,324,035 | A | 6/1994 | Morris et al. | 273/138 A |
| 5,326,104 | A | 7/1994 | Pease et al. | 273/138 A |
| 5,361,885 | A | 11/1994 | Modler | 194/214 |
| 5,364,104 | A | 11/1994 | Jones et al. | 273/292 |
| 5,386,103 | A | 1/1995 | DeBan et al. | 235/379 |
| 5,397,133 | A | 3/1995 | Penzias | 273/439 |
| 5,398,932 | A | 3/1995 | Eberhardt et al. | 273/138 A |
| 5,406,264 | A | 4/1995 | Plonsky et al. | 340/572 |
| 5,416,308 | A | 5/1995 | Hood et al. | 235/454 |
| 5,458,333 | A | 10/1995 | Takemoto et al. | 273/138 A |
| 5,470,079 | A | 11/1995 | LeStrange et al. | 273/138 A |
| 5,472,194 | A | 12/1995 | Breeding et al. | 273/138 A |
| 5,487,544 | A | 1/1996 | Clapper, Jr. | 273/138 A |
| 5,505,449 | A | 4/1996 | Eberhardt et al. | 273/138 A |
| 5,505,461 | A | 4/1996 | Bell et al. | 273/433 |
| 5,507,489 | A | 4/1996 | Reibel et al. | 273/138 A |
| 5,562,284 | A | 10/1996 | Stevens | 273/139 |
| 5,575,474 | A | 11/1996 | Rossides | 463/26 |
| 5,580,311 | A | 12/1996 | Haste, III | 463/29 |
| 5,586,936 | A | 12/1996 | Bennett et al. | 463/25 |
| 5,595,538 | A | 1/1997 | Haste, III | 463/17 |
| 5,605,334 | A | 2/1997 | McCrea, Jr. | 273/309 |
| 5,605,506 | A | 2/1997 | Hoorn et al. | 463/47 |
| 5,613,680 | A | 3/1997 | Groves et al. | 273/138.2 |
| 5,613,912 | A | 3/1997 | Slater | 463/25 |
| 5,643,086 | A | 7/1997 | Alcorn et al. | 463/29 |
| 5,643,088 | A | 7/1997 | Vaughn et al. | 463/40 |
| 5,645,486 | A | 7/1997 | Nagao et al. | 463/27 |
| 5,651,548 | A | 7/1997 | French et al. | 273/309 |
| 5,655,961 | A | 8/1997 | Acres et al. | 463/27 |
| 5,676,376 | A | 10/1997 | Valley | 273/288 |
| 5,679,077 | A | 10/1997 | Pocock et al. | 463/19 |
| 5,707,287 | A | 1/1998 | McCrea, Jr. | 463/27 |
| 5,735,525 | A | 4/1998 | McCrea, Jr. | 273/309 |
| 5,735,742 | A | 4/1998 | French | 463/25 |
| 5,737,418 | A | 4/1998 | Saffari et al. | 380/9 |
| 5,741,183 | A | 4/1998 | Acres et al. | 463/42 |
| 5,742,656 | A | 4/1998 | Mikulak et al. | 377/7 |
| 5,755,618 | A | 5/1998 | Mothwurf | 453/17 |
| 5,757,876 | A | 5/1998 | Dam et al. | 377/7 |
| 5,759,102 | A | 6/1998 | Pease et al. | 463/42 |
| 5,759,103 | A | 6/1998 | Freels et al. | 463/42 |
| 5,770,533 | A | 6/1998 | Franchi | 463/42 |
| 5,779,545 | A | 7/1998 | Berg et al. | 463/22 |
| 5,781,647 | A | 7/1998 | Fishbine et al. | 382/1 |
| 5,785,321 | A | 7/1998 | van Putten et al. | 273/309 |
| 5,788,574 | A | 8/1998 | Ornstein et al. | 463/25 |
| 5,800,268 | A * | 9/1998 | Molnick | 463/40 |
| 5,801,766 | A | 9/1998 | Alden | 348/157 |
| 5,803,808 | A | 9/1998 | Strisower | 463/11 |
| 5,809,482 | A | 9/1998 | Strisower | 705/30 |
| 5,813,912 | A | 9/1998 | Shultz | 463/25 |
| 5,820,463 | A | 10/1998 | O'Callaghan | 463/42 |
| 5,823,879 | A | 10/1998 | Goldberg et al. | 463/42 |
| 5,830,067 | A * | 11/1998 | Graves et al. | 463/40 |
| 5,830,068 | A | 11/1998 | Brenner et al. | 463/42 |
| 5,831,669 | A | 11/1998 | Adrain | 348/143 |
| 5,842,921 | A | 12/1998 | Mindes et al. | 463/16 |
| 5,850,447 | A | 12/1998 | Peyret | 380/25 |
| 5,851,149 | A * | 12/1998 | Xidos et al. | 463/42 |
| 5,890,963 | A | 4/1999 | Yen | 463/42 |
| 5,895,321 | A | 4/1999 | Gassies et al. | 463/29 |
| 5,902,983 | A | 5/1999 | Crevelt et al. | 235/380 |
| 5,909,876 | A | 6/1999 | Brown | 273/309 |
| 5,911,626 | A | 6/1999 | McCrea, Jr. | 463/27 |
| 5,919,090 | A | 7/1999 | Mothwurf | 463/25 |
| 5,931,731 | A | 8/1999 | Chwalisz | 453/32 |
| 5,936,527 | A | 8/1999 | Isaacman et al. | 340/572.1 |
| 5,941,769 | A | 8/1999 | Order | 463/12 |
| 5,957,776 | A | 9/1999 | Hoehne | 463/25 |
| 5,971,851 | A | 10/1999 | Pascal et al. | 463/24 |
| 5,999,808 | A * | 12/1999 | LaDue | 455/412.2 |
| 6,001,016 | A | 12/1999 | Walker et al. | 463/42 |
| 6,021,949 | A | 2/2000 | Boiron | 235/492 |
| 6,029,891 | A | 2/2000 | Freeman et al. | 235/380 |
| 6,042,150 | A | 3/2000 | Daley | 283/86 |
| 6,048,269 | A | 4/2000 | Burns et al. | 463/25 |
| 6,062,481 | A | 5/2000 | Storch et al. | 235/494 |
| 6,068,553 | A | 5/2000 | Parker | 463/27 |
| 6,077,161 | A | 6/2000 | Wisler | 463/11 |
| 6,080,063 | A | 6/2000 | Khosla | 463/42 |
| 6,083,105 | A | 7/2000 | Ronin et al. | 463/17 |
| 6,089,980 | A | 7/2000 | Gauselmann | 463/27 |
| 6,093,103 | A | 7/2000 | McCrea, Jr. | 463/27 |
| 6,102,799 | A | 8/2000 | Stupak | 463/27 |
| 6,104,815 | A | 8/2000 | Alcorn et al. | 380/251 |
| 6,106,396 | A | 8/2000 | Alcorn et al. | 463/29 |
| 6,110,041 | A | 8/2000 | Walker et al. | 463/20 |
| 6,110,043 | A | 8/2000 | Olsen | 463/27 |
| 6,117,012 | A | 9/2000 | McCrea, Jr. | 463/27 |
| 6,126,166 | A | 10/2000 | Lorson et al. | 273/148 R |
| 6,135,887 | A | 10/2000 | Pease et al. | 463/42 |
| 6,142,876 | A | 11/2000 | Cumbers | 463/25 |
| 6,146,273 | A | 11/2000 | Olsen | 463/27 |
| 6,149,522 | A | 11/2000 | Alcorn et al. | 463/29 |
| 6,152,824 | A | 11/2000 | Rothschild et al. | 463/42 |
| 6,154,131 | A | 11/2000 | Jones, II et al. | 340/540 |
| 6,165,069 | A | 12/2000 | Sines et al. | 463/12 |
| 6,166,763 | A | 12/2000 | Rhodes et al. | 348/143 |
| 6,168,523 | B1 | 1/2001 | Piechowiak et al. | 463/26 |
| 6,179,711 | B1 | 1/2001 | Yoseloff | 463/25 |
| 6,183,366 | B1 | 2/2001 | Goldberg et al. | 463/42 |
| 6,186,892 | B1 | 2/2001 | Frank et al. | 463/19 |
| 6,186,895 | B1 | 2/2001 | Oliver | 463/25 |
| 6,190,256 | B1 | 2/2001 | Walker et al. | 463/25 |
| 6,200,218 | B1 | 3/2001 | Lindsay | 463/25 |
| 6,210,277 | B1 | 4/2001 | Stefan | 463/27 |
| 6,217,447 | B1 | 4/2001 | Lofink et al. | 463/12 |
| 6,219,836 | B1 | 4/2001 | Wells et al. | 717/11 |
| 6,227,972 | B1 | 5/2001 | Walker et al. | 463/25 |
| 6,234,898 | B1 | 5/2001 | Belamant et al. | 463/25 |
| 6,244,958 | B1 | 6/2001 | Acres | 463/26 |
| 6,251,014 | B1 | 6/2001 | Stockdale et al. | 463/16 |
| 6,254,484 | B1 | 7/2001 | McCrea, Jr. | 463/27 |
| 6,264,109 | B1 | 7/2001 | Chapet et al. | 235/492 |
| 6,264,561 | B1 | 7/2001 | Saffari et al. | 463/42 |
| 6,267,671 | B1 | 7/2001 | Hogan | 463/25 |
| 6,275,586 | B1 | 8/2001 | Kelly | 380/46 |
| 6,283,856 | B1 | 9/2001 | Mothwurf | 463/17 |
| 6,287,202 | B1 | 9/2001 | Pascal et al. | 463/42 |
| 6,299,534 | B1 | 10/2001 | Breeding et al. | 463/25 |
| 6,313,871 | B1 | 11/2001 | Schubert | 348/143 |
| 6,346,044 | B1 | 2/2002 | McCrea, Jr. | 463/27 |
| 6,347,738 | B1 | 2/2002 | Crevelt et al. | 235/380 |
| 6,352,261 | B1 | 3/2002 | Brown | 273/288 |
| 6,394,900 | B1 | 5/2002 | McGlone et al. | 463/20 |
| 6,394,907 | B1 | 5/2002 | Rowe | 463/42 |
| 6,400,272 | B1 | 6/2002 | Holtzman et al. | 340/572.1 |
| 6,409,602 | B1 | 6/2002 | Wiltshire et al. | 463/42 |
| 6,425,817 | B1 | 7/2002 | Momemy | 453/17 |
| 6,435,970 | B1 | 8/2002 | Baerlocher et al. | 463/46 |
| 6,439,996 | B2 | 8/2002 | LeMay et al. | 463/29 |
| 6,443,839 | B2 | 9/2002 | Stockdale et al. | 463/16 |
| 6,446,864 | B1 | 9/2002 | Kim et al. | 235/382 |
| 6,457,715 | B1 | 10/2002 | Friedman | 273/274 |
| 6,460,848 | B1 | 10/2002 | Soltys et al. | 273/149 R |
| 6,464,584 | B2 | 10/2002 | Oliver | 463/25 |
| 6,478,676 | B1 | 11/2002 | Dayan | 463/17 |
| 6,488,581 | B1 | 12/2002 | Stockdale | 463/29 |
| 6,488,585 | B1 | 12/2002 | Wells et al. | 463/43 |
| 6,503,147 | B1 | 1/2003 | Stockdale et al. | 463/29 |
| 6,505,772 | B1 | 1/2003 | Mollett et al. | 235/379 |
| 6,508,709 | B1 | 1/2003 | Karmarkar | 463/42 |

| | | | | |
|---|---|---|---|---|
| 6,508,710 | B1 | 1/2003 | Paravia et al. | 463/42 |
| 6,514,140 | B1 | 2/2003 | Storch | 463/25 |
| 6,517,435 | B2 | 2/2003 | Soltys et al. | 463/25 |
| 6,517,436 | B2 | 2/2003 | Soltys et al. | 463/29 |
| 6,517,437 | B1 | 2/2003 | Wells et al. | 463/30 |
| 6,520,857 | B2 | 2/2003 | Soltys et al. | 463/29 |
| 6,527,271 | B2 | 3/2003 | Soltys et al. | 273/148 R |
| 6,527,638 | B1 * | 3/2003 | Walker et al. | 463/25 |
| 6,530,836 | B2 | 3/2003 | Soltys et al. | 463/29 |
| 6,530,837 | B2 | 3/2003 | Soltys et al. | 463/29 |
| 6,532,297 | B1 | 3/2003 | Lindquist | 382/100 |
| 6,533,276 | B2 | 3/2003 | Soltys et al. | 273/148 R |
| 6,533,662 | B2 | 3/2003 | Soltys et al. | 463/25 |
| 6,547,131 | B1 | 4/2003 | Foodman et al. | 235/380 |
| 6,567,159 | B1 | 5/2003 | Corech | 356/71 |
| 6,575,829 | B2 | 6/2003 | Coleman et al. | 463/20 |
| 6,575,833 | B1 | 6/2003 | Stockdale | 463/29 |
| 6,575,834 | B1 | 6/2003 | Lindo | 463/40 |
| 6,578,847 | B1 | 6/2003 | Hedrick et al. | 273/138.2 |
| 6,579,179 | B2 | 6/2003 | Poole et al. | 463/25 |
| 6,579,180 | B2 | 6/2003 | Soltys et al. | 463/25 |
| 6,579,181 | B2 | 6/2003 | Soltys et al. | 463/25 |
| 6,581,747 | B1 | 6/2003 | Charlier et al. | 194/214 |
| 6,582,301 | B2 | 6/2003 | Hill | 463/11 |
| 6,585,598 | B2 | 7/2003 | Nguyen et al. | 463/41 |
| 6,595,857 | B2 | 7/2003 | Soltys et al. | 463/29 |
| 6,607,441 | B1 | 8/2003 | Acres | 463/25 |
| 6,609,978 | B1 | 8/2003 | Paulsen | 463/42 |
| 6,620,046 | B2 | 9/2003 | Rowe | 463/25 |
| 6,628,939 | B2 | 9/2003 | Paulsen | 455/414 |
| 6,629,184 | B1 | 9/2003 | Berg et al. | 710/306 |
| 6,629,591 | B1 | 10/2003 | Griswold et al. | 194/205 |
| 6,629,889 | B2 | 10/2003 | Mothwurf | 463/25 |
| 6,638,161 | B2 | 10/2003 | Soltys et al. | 463/12 |
| 6,638,169 | B2 | 10/2003 | Wilder et al. | 463/35 |
| 6,638,170 | B1 | 10/2003 | Crumby | 463/42 |
| 6,641,484 | B2 | 11/2003 | Oles et al. | 463/47 |
| 6,645,077 | B2 | 11/2003 | Rowe | 463/42 |
| 6,652,378 | B2 | 11/2003 | Cannon et al. | 463/20 |
| 6,652,379 | B2 | 11/2003 | Soltys et al. | 463/22 |
| 6,663,490 | B2 | 12/2003 | Soltys et al. | 463/25 |
| 6,675,152 | B1 | 1/2004 | Prasad et al. | 705/64 |
| 6,676,522 | B2 | 1/2004 | Rowe et al. | 463/42 |
| 6,682,421 | B1 | 1/2004 | Rowe et al. | 463/25 |
| 6,682,423 | B2 | 1/2004 | Brosnan et al. | 463/29 |
| 6,685,564 | B2 | 2/2004 | Oliver | 463/25 |
| 6,685,567 | B2 | 2/2004 | Cockerille et al. | 463/43 |
| 6,685,568 | B2 | 2/2004 | Soltys et al. | 463/47 |
| 6,688,979 | B2 | 2/2004 | Soltys et al. | 463/25 |
| 6,699,128 | B1 | 3/2004 | Beadell et al. | 463/46 |
| 6,702,672 | B1 | 3/2004 | Angell et al. | 463/25 |
| 6,712,696 | B2 | 3/2004 | Soltys et al. | 463/25 |
| 6,726,099 | B2 | 4/2004 | Becker et al. | 235/380 |
| 6,728,740 | B2 | 4/2004 | Kelly et al. | 708/250 |
| 6,729,956 | B2 | 5/2004 | Wolf et al. | 463/25 |
| 6,739,975 | B2 | 5/2004 | Nguyen et al. | 463/39 |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,846,238 | B2 | 1/2005 | Wells | 463/39 |
| 6,848,994 | B1 | 2/2005 | Knust et al. | 463/25 |
| 6,866,581 | B2 | 3/2005 | Martinek et al. | 463/16 |
| 6,866,586 | B2 | 3/2005 | Oberberger et al. | 463/42 |
| 6,896,618 | B2 | 5/2005 | Benoy et al. | 463/25 |
| 6,899,627 | B2 | 5/2005 | Lam et al. | 463/40 |
| 6,905,411 | B2 | 6/2005 | Nguyen et al. | 463/25 |
| 6,962,530 | B2 | 11/2005 | Jackson | 463/29 |
| 6,971,956 | B2 | 12/2005 | Rowe et al. | 463/25 |
| 6,991,544 | B2 | 1/2006 | Soltys et al. | 463/42 |
| 6,997,803 | B2 | 2/2006 | LeMay et al. | 463/20 |
| 7,005,985 | B1 | 2/2006 | Steeves | 340/572.1 |
| 7,029,009 | B2 | 4/2006 | Grauzer et al. | 273/149 P |
| 7,035,626 | B1 * | 4/2006 | Luciano, Jr. | 455/414.1 |
| 7,062,470 | B2 | 6/2006 | Prasad et al. | 705/64 |
| 7,063,617 | B2 | 6/2006 | Brosnan et al. | 463/25 |

| | | | | |
|---|---|---|---|---|
| 7,077,332 | B2 | 7/2006 | Verschuur et al. | 235/492 |
| 7,112,138 | B2 | 9/2006 | Hedrick et al. | 463/29 |
| 7,114,718 | B2 | 10/2006 | Grauzer et al. | 273/149 R |
| 7,179,170 | B2 | 2/2007 | Martinek et al. | 463/29 |
| 7,198,571 | B2 | 4/2007 | LeMay et al. | 463/25 |
| RE39,644 | E * | 5/2007 | Alcorn et al. | 380/251 |
| 7,213,812 | B2 | 5/2007 | Schubert et al. | 273/149 R |
| 7,222,852 | B2 | 5/2007 | Soltys et al. | 273/148 R |
| 7,271,727 | B2 | 9/2007 | Steeves | 340/572.7 |
| 7,309,065 | B2 | 12/2007 | Yoseloff et al. | 273/292 |
| 7,311,605 | B2 | 12/2007 | Moser | 463/25 |
| 7,351,147 | B2 | 4/2008 | Stockdale et al. | 463/29 |
| 7,384,339 | B2 | 6/2008 | LeMay et al. | 463/30 |
| 7,390,256 | B2 | 6/2008 | Soltys et al. | 463/12 |
| 7,399,226 | B2 | 7/2008 | Mishra | 463/18 |
| 7,404,765 | B2 | 7/2008 | Soltys et al. | 463/25 |
| 7,407,438 | B2 | 8/2008 | Schubert et al. | 463/22 |
| 7,419,428 | B2 | 9/2008 | Rowe | 463/25 |
| 7,422,522 | B2 | 9/2008 | Fujimoto et al. | 463/16 |
| 7,434,805 | B2 | 10/2008 | Grauzer et al. | 273/149 R |
| 7,435,179 | B1 * | 10/2008 | Ford | 463/42 |
| 7,438,643 | B2 | 10/2008 | Brosnan et al. | 463/42 |
| 7,455,591 | B2 | 11/2008 | Nguyen | 463/42 |
| 7,460,863 | B2 * | 12/2008 | Steelberg et al. | 455/419 |
| 7,510,186 | B2 | 3/2009 | Fleckenstein | 273/149 R |
| 7,510,194 | B2 | 3/2009 | Soltys et al. | 273/293 |
| 7,534,169 | B2 * | 5/2009 | Amaitis et al. | 463/39 |
| 7,549,576 | B2 * | 6/2009 | Alderucci et al. | 235/380 |
| 7,577,847 | B2 * | 8/2009 | Nguyen et al. | 713/186 |
| 7,611,407 | B1 * | 11/2009 | Itkis et al. | 463/29 |
| 7,611,409 | B2 * | 11/2009 | Muir et al. | 463/29 |
| 7,637,810 | B2 * | 12/2009 | Amaitis et al. | 463/25 |
| 7,644,861 | B2 * | 1/2010 | Alderucci et al. | 235/382 |
| 7,699,703 | B2 * | 4/2010 | Muir et al. | 463/29 |
| 2001/0016515 | A1 | 8/2001 | Oliver | 463/25 |
| 2001/0034237 | A1 * | 10/2001 | Garahi | 455/456 |
| 2001/0036858 | A1 * | 11/2001 | McNutt et al. | 463/25 |
| 2001/0041612 | A1 * | 11/2001 | Garahi et al. | 463/29 |
| 2002/0025851 | A1 * | 2/2002 | Frankulin et al. | 463/29 |
| 2002/0049909 | A1 | 4/2002 | Jackson et al. | 713/188 |
| 2002/0084587 | A1 | 7/2002 | Bennett et al. | 273/309 |
| 2002/0103027 | A1 * | 8/2002 | Rowe et al. | 463/39 |
| 2002/0111213 | A1 * | 8/2002 | McEntee et al. | 463/42 |
| 2002/0116615 | A1 | 8/2002 | Nguyen et al. | 713/168 |
| 2002/0138594 | A1 | 9/2002 | Rowe | 709/219 |
| 2002/0147042 | A1 | 10/2002 | Vuong et al. | 463/40 |
| 2002/0147049 | A1 * | 10/2002 | Carter, Sr. | 463/42 |
| 2002/0187821 | A1 | 12/2002 | Soltys et al. | 463/11 |
| 2002/0187825 | A1 | 12/2002 | Tracy et al. | 463/17 |
| 2002/0187830 | A1 | 12/2002 | Stockdale et al. | 463/29 |
| 2003/0022714 | A1 | 1/2003 | Oliver | 463/25 |
| 2003/0027625 | A1 | 2/2003 | Rowe | 463/20 |
| 2003/0028480 | A1 | 2/2003 | Rowe | 705/39 |
| 2003/0032474 | A1 | 2/2003 | Kaminkow | 463/25 |
| 2003/0036425 | A1 | 2/2003 | Kaminkow et al. | 463/25 |
| 2003/0045354 | A1 * | 3/2003 | Giobbi | 463/40 |
| 2003/0054881 | A1 | 3/2003 | Hedrick et al. | 463/29 |
| 2003/0064774 | A1 | 4/2003 | Fujimoto et al. | 463/16 |
| 2003/0064798 | A1 | 4/2003 | Grauzer et al. | 463/29 |
| 2003/0064805 | A1 * | 4/2003 | Wells | 463/39 |
| 2003/0069074 | A1 | 4/2003 | Jackson | 463/43 |
| 2003/0078103 | A1 | 4/2003 | LeMay et al. | 463/43 |
| 2003/0083126 | A1 | 5/2003 | Paulsen | 463/25 |
| 2003/0104865 | A1 * | 6/2003 | Itkis et al. | 463/39 |
| 2003/0130032 | A1 | 7/2003 | Martinek et al. | 463/29 |
| 2003/0137968 | A1 | 7/2003 | Lareau et al. | 370/349 |
| 2003/0144965 | A1 | 7/2003 | Prasad et al. | 705/65 |
| 2003/0162588 | A1 | 8/2003 | Brosnan et al. | 463/25 |
| 2003/0171145 | A1 | 9/2003 | Rowe | 463/25 |
| 2003/0176218 | A1 | 9/2003 | LeMay et al. | 463/25 |
| 2003/0186733 | A1 | 10/2003 | Wolf et al. | 463/16 |
| 2003/0186739 | A1 | 10/2003 | Paulsen et al. | 463/25 |
| 2003/0195037 | A1 | 10/2003 | Vuong et al. | 463/29 |
| 2003/0199320 | A1 | 10/2003 | Nguyen et al. | 463/42 |
| 2003/0203755 | A1 | 10/2003 | Jackson | 463/42 |
| 2003/0212597 | A1 | 11/2003 | Ollins | 705/14 |
| 2003/0220136 | A1 | 11/2003 | Soltys et al. | 463/25 |
| 2003/0224858 | A1 | 12/2003 | Yoseloff et al. | 463/43 |
| 2003/0228912 | A1 | 12/2003 | Wells et al. | 463/43 |

| | | | | |
|---|---|---|---|---|
| 2003/0232647 | A1 | 12/2003 | Moser | 463/29 |
| 2003/0232651 | A1 | 12/2003 | Huard et al. | 463/42 |
| 2004/0002379 | A1 | 1/2004 | Parrott et al. | 463/29 |
| 2004/0002385 | A1 | 1/2004 | Nguyen | 463/42 |
| 2004/0005920 | A1 | 1/2004 | Soltys et al. | 463/25 |
| 2004/0029635 | A1 | 2/2004 | Giobbi | 463/30 |
| 2004/0043820 | A1 | 3/2004 | Schlottmann | 463/43 |
| 2004/0048671 | A1 | 3/2004 | Rowe | 463/42 |
| 2004/0068654 | A1 | 4/2004 | Cockerille et al. | 713/168 |
| 2004/0082385 | A1 | 4/2004 | Silva et al. | 463/40 |
| 2004/0087375 | A1 | 5/2004 | Gelinotte | 463/47 |
| 2004/0092310 | A1 | 5/2004 | Brosnan et al. | 463/42 |
| 2004/0106452 | A1 | 6/2004 | Nguyen et al. | 463/42 |
| 2004/0110557 | A1 | 6/2004 | Rowe | 463/25 |
| 2004/0132532 | A1 | 7/2004 | Brosnan et al. | 463/42 |
| 2004/0142744 | A1* | 7/2004 | Atkinson et al. | 463/29 |
| 2004/0147314 | A1 | 7/2004 | LeMay et al. | 463/30 |
| 2004/0219982 | A1 | 11/2004 | Khoo et al. | 463/42 |
| 2004/0229682 | A1 | 11/2004 | Gelinotte | 463/25 |
| 2005/0026680 | A1 | 2/2005 | Gururajan | 463/25 |
| 2005/0026682 | A1 | 2/2005 | Grauzer et al. | 463/29 |
| 2005/0051955 | A1 | 3/2005 | Schubert et al. | 273/149 R |
| 2005/0051965 | A1 | 3/2005 | Gururajan | 273/292 |
| 2005/0054408 | A1 | 3/2005 | Steil et al. | 463/11 |
| 2005/0059479 | A1 | 3/2005 | Soltys et al. | 463/29 |
| 2005/0062226 | A1 | 3/2005 | Schubert et al. | 273/149 R |
| 2005/0062227 | A1 | 3/2005 | Grauzer et al. | 273/149 R |
| 2005/0070358 | A1* | 3/2005 | Angell et al. | 463/39 |
| 2005/0073102 | A1 | 4/2005 | Yoseloff et al. | 273/292 |
| 2005/0101367 | A1 | 5/2005 | Soltys et al. | 463/12 |
| 2005/0116020 | A1 | 6/2005 | Smolucha et al. | 235/375 |
| 2005/0164761 | A1 | 7/2005 | Tain | 463/13 |
| 2005/0176507 | A1* | 8/2005 | Ephrati et al. | 463/39 |
| 2005/0227760 | A1 | 10/2005 | Vlazny et al. | 463/28 |
| 2005/0258597 | A1 | 11/2005 | Soltys et al. | 273/274 |
| 2005/0266919 | A1 | 12/2005 | Rowe et al. | 463/25 |
| 2005/0288083 | A1 | 12/2005 | Downs, III | 463/11 |
| 2005/0288084 | A1 | 12/2005 | Schubert | 463/11 |
| 2005/0288085 | A1 | 12/2005 | Schubert et al. | 463/11 |
| 2006/0019739 | A1 | 1/2006 | Soltys et al. | 273/292 |
| 2006/0019745 | A1 | 1/2006 | Benbrahim | 463/29 |
| 2006/0035707 | A1* | 2/2006 | Nguyen et al. | 463/29 |
| 2006/0046849 | A1* | 3/2006 | Kovacs | 463/39 |
| 2006/0066444 | A1 | 3/2006 | Steeves | 340/10.5 |
| 2006/0121970 | A1* | 6/2006 | Khal | 463/16 |
| 2006/0211481 | A1 | 9/2006 | Soltys et al. | 463/16 |
| 2007/0004500 | A1 | 1/2007 | Soltys et al. | 463/22 |
| 2007/0006329 | A1 | 1/2007 | Morrow et al. | 726/34 |
| 2007/0015583 | A1 | 1/2007 | Tran | 463/40 |
| 2007/0054725 | A1 | 3/2007 | Morrow et al. | 463/16 |
| 2007/0060259 | A1* | 3/2007 | Pececnik | 463/16 |
| 2007/0082737 | A1 | 4/2007 | Morrow et al. | 463/42 |
| 2007/0111775 | A1 | 5/2007 | Yoseloff | 463/16 |
| 2007/0111791 | A1 | 5/2007 | Arbogast et al. | 463/40 |
| 2007/0243927 | A1* | 10/2007 | Soltys | 463/25 |
| 2007/0243935 | A1 | 10/2007 | Huizinga | 463/42 |
| 2007/0287535 | A1 | 12/2007 | Soltys | 463/29 |
| 2007/0298868 | A1 | 12/2007 | Soltys | 463/25 |
| 2008/0076536 | A1 | 3/2008 | Shayesteh | 463/25 |
| 2008/0076572 | A1* | 3/2008 | Nguyen et al. | 463/42 |
| 2008/0096659 | A1* | 4/2008 | Kreloff et al. | 463/39 |
| 2008/0113764 | A1 | 5/2008 | Soltys | 463/22 |
| 2008/0113781 | A1 | 5/2008 | Soltys et al. | 463/28 |
| 2008/0146337 | A1 | 6/2008 | Halonen et al. | 463/42 |
| 2008/0153599 | A1 | 6/2008 | Atashband et al. | 463/42 |
| 2008/0153600 | A1 | 6/2008 | Swarna | 463/43 |
| 2008/0154916 | A1 | 6/2008 | Atashband | 707/10 |
| 2008/0155665 | A1 | 6/2008 | Ruppert et al. | 726/5 |
| 2008/0162729 | A1 | 7/2008 | Ruppert | 709/249 |
| 2008/0171588 | A1 | 7/2008 | Atashband | 463/20 |
| 2008/0171598 | A1 | 7/2008 | Deng | 463/40 |
| 2008/0182651 | A1* | 7/2008 | Marshall et al. | 463/25 |
| 2008/0200255 | A1 | 8/2008 | Eisele | 463/42 |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118006 | A1 | 5/2009 | Kelly et al. | 463/31 |
| 2009/0124392 | A1 | 5/2009 | Ruppert et al. | 463/42 |
| 2009/0124394 | A1 | 5/2009 | Swarna | 463/43 |
| 2009/0125603 | A1 | 5/2009 | Atashband et al. | 709/207 |
| 2009/0131144 | A1 | 5/2009 | Allen | 463/20 |
| 2009/0131163 | A1 | 5/2009 | Arbogast et al. | 463/29 |
| 2009/0132720 | A1 | 5/2009 | Ruppert et al. | 709/231 |
| 2009/0163279 | A1 | 6/2009 | Hermansen et al. | 463/42 |
| 2009/0170594 | A1 | 7/2009 | Delaney et al. | 463/25 |
| 2009/0181776 | A1 | 7/2009 | Deng | 463/42 |

FOREIGN PATENT DOCUMENTS

| | | | |
|---|---|---|---|
| DE | 197 48 930 | A1 | 5/1998 |
| DE | 199 40 954 | A1 | 3/2001 |
| EP | 0 327 069 | A2 | 8/1989 |
| EP | 0 790 848 | | 8/1997 |
| EP | 1 291 045 | A2 | 3/2003 |
| FR | 2 775 196 | | 8/1999 |
| GB | 2 380 143 | A | 4/2003 |
| GB | 2 382 034 | A | 5/2003 |
| WO | WO 96/03188 | | 2/1996 |
| WO | WO 96/36253 | | 11/1996 |
| WO | WO 97/13227 | | 4/1997 |
| WO | WO 00/22585 | | 4/2000 |
| WO | WO 02/05914 | A1 | 1/2002 |
| WO | WO 03/060846 | A2 | 7/2003 |
| WO | 2007/033207 | A2 | 3/2007 |

OTHER PUBLICATIONS

U.S. Appl. No. 11/337,375, filed Jan. 23, 2006, Soltys et al.
U.S. Appl. No. 11/408,862, filed Apr. 21, 2006, Soltys et al.
U.S. Appl. No. 11/428,264, filed Jun. 30, 2006, Soltys.
U.S. Appl. No. 11/437,590, filed May 19, 2006, Soltys et al.
U.S. Appl. No. 11/479,930, filed Jun. 30, 2006, Soltys et al.
U.S. Appl. No. 11/479,988, filed Jun. 30, 2006, Shayesteh.
U.S. Appl. No. 11/480,273, filed Jun. 30, 2006, Soltys.
U.S. Appl. No. 11/480,275, filed Jun. 30, 2006, Fleckenstein.
U.S. Appl. No. 11/480,321, filed Jun. 30, 2006, Soltys.
U.S. Appl. No. 11/480,345, filed Jun. 30, 2006, Fleckenstein.
U.S. Appl. No. 11/480,349, filed Jun. 30, 2006, Soltys et al.
U.S. Appl. No. 11/519,244, filed Sep. 11, 2006, Soltys et al.
U.S. Appl. No. 60/501,489, filed Sep. 8, 2003, Soltys et al.
U.S. Appl. No. 60/554,090, filed Mar. 17, 2004, Soltys et al.
U.S. Appl. No. 60/838,280, filed Aug. 17, 2006, Soltys et al.
U.S. Appl. No. 60/847,331, filed Sep. 26, 2006, Shayesteh.
Bulaysky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL = http:/bjinsider.com/newsletter_40_surveillance.shtml, 5 pages.
Snyder, A., "The High-Tech Eye."excerpt from *Blackjack Forum*, Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.

Bravo Gaming Systems, "Casino Table Wager Analysis and Player Tracking System—Table Operations/Unique Features," accessed Apr. 11, 2005, URL = http://genesisgaming.com, 4 pages.
Casino Software & Services, LLC., accessed Aug. 25, 2006, URL = http:/casinosoftware.com/home.html, 6 pages.
*Gambling Magazine*, "Gaming Company Takes RFID to the Casino," Dec. 27, 2004, accessed Aug. 25, 2006, URL = http:/www.gamblingmagazine.com/managearticle.asp?C=290&A=13186, 4 pages.
Hewlett Packard Handhelds, accessed Sep. 8, 2003, URL = http:/www.shopping.hp.com/cgi-bin/hpdirect/shopping/scripts/home/store_access.jsp?temp..., 2 pages.
International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.
Linksys WAP11 "Wireless Network Access Point," accessed Sep. 8, 2003, URL = http:/www.linksys.com/products/product.asp?prid=157&grid=, 4 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Semtek PDA & Handheld Devices, Compaq iSwipe™ Magnetic Card Reader, accessed Sep. 8, 2003, URL = http:/www.semtek.com/products/iswipe.html, 3 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents the Ultimate Player Rating System . . . Bloodhound Sniffs Out the Pros and Cons," Dec. 31, 1997, 6 pages.
English Translation of German Patent No. DE 197 48 930, publication date of May 14, 1998, inventor: Markeev.
U.S. Appl. No. 11/558,409, filed Nov. 9, 2006, Soltys.
U.S. Appl. No. 60/887,092, filed Jan. 29, 2007, Shayesteh.
U.S. Appl. No. 12/112,231, filed Apr. 30, 2008, Morrow et al.
U.S. Appl. No. 12/112,410, filed Apr. 30, 2008, McMahan et al.
U.S. Appl. No. 12/112,501, filed Apr. 30, 2008, Nelson.
U.S. Appl. No. 12/112,582, filed Apr. 30, 2008, Kelly et al.
U.S. Appl. No. 12/112,691, filed Apr. 30, 2008, Backover et al.
U.S. Appl. No. 12/112,740, filed Apr. 30, 2008, Kisenwether et al.
U.S. Appl. No. 12/112,770, filed Apr. 30, 2008, Rehm et al.
U.S. Appl. No. 12/112,928, filed Apr. 30, 2008, Young et al.
U.S. Appl. No. 12/113,005, filed Apr. 30, 2008, McAllister et al.
U.S. Appl. No. 12/113,021, filed Apr. 30, 2008, Singh et al.
U.S. Appl. No. 12/113,038, filed Apr. 30, 2008, Arbogast et al.
U.S. Appl. No. 12/269,673, filed Nov. 12, 2008, Ruppert et al.
U.S. Appl. No. 12/271,337, filed Nov. 14, 2008, Singh et al.
U.S. Appl. No. 12/271,736, filed Nov. 14, 2008, Crowder.
U.S. Appl. No. 12/473,617, filed May 28, 2009, Jones.
U.S. Appl. No. 12/500,298, filed Jul. 9, 2009, Rajaraman et al.
Bally Technologies, Inc., iVIEW, http://ballytech.com/systems/product.cfm?id=9, download date Nov. 6, 2007, 2 pages.
Richard Soltys, "Wireless Gaming Environment," Non-Final Office Action mailed Oct. 27, 2009, for U.S. Appl. No. 11/734,639, 10 pages.
Richard Soltys, "Wireless Gaming Environment," Amendment filed Jan. 19, 2010, for U.S. Appl. No. 11/734,639, 14 pages.
Richard Soltys, "Wireless Gaming Environment," Final Office Action mailed Mar. 22, 2010, for U.S. Appl. No. 11/734,639, 14 pages.
Richard Soltys, "Wireless Gaming Environment," Amendment filed Jul. 22, 2010, for U.S. Appl. No. 11/734,639, 16 pages.
US 6,599,191, 07/2003, Breeding et al. (withdrawn)

* cited by examiner

WIRELESS GAMING ENVIRONMENT

CROSS-REFERENCE TO RELATED APPLICATION

This application claims the benefit under 35 U.S.C. §119 (e) of U.S. Provisional Patent Application Ser. No. 60/791,397 filed Apr. 12, 2006.

BACKGROUND OF THE INVENTION

1. Field of the Invention

This description generally relates to the field of wagering or gaming, and more particularly to facilitating the monitoring of activities at various wagering games, and automating the gaming environment via communications devices, for example, handheld wireless communications devices.

2. Description of the Related Art

Gaming has enjoyed phenomenal growth over the recent past, with the addition of numerous forms of wager based gaming, the legalization of wagering in a large number of jurisdictions domestically and internationally, and the construction of numerous casinos to service the increasing demand for gaming opportunities.

Casinos provide a large variety of games and other forms of entertainment of its customers. For example, casinos may provide gaming machines such as slot machines, video slot machines or video poker machines. Casinos also provide table games such as blackjack, various types of poker, craps, roulette, baccarat, big wheel or wheel of fortune, to name a few. Due to the large amounts of money, particularly cash involved in gaming, casinos must carefully monitor the activities of both players and casino employees. Careful and continuous monitoring of gaming activities not only enhances security, but also permits the management to better manage the casinos' business, for example, selecting the number of mix of tables, the hours of operation of various tables, staffing, etc.

Most casinos employee a large number of individuals to manually track the gaming activities. These individuals, often referred to as "pit bosses" observe the activity at various tables and/or gaming machines, and manually record the activity. In some casinos, the manually recorded information is later manually entered into one or more computing systems. This information may include information regarding the dealer's performance, for example, the number of hands dealt during all or a portion of a dealer's shift, average house take, etc. This information may also include information regarding a player's performance, for example, time spent wagering, average wager, etc. The manual system suffers numerous drawbacks, including the delay in entry and processing of the information by the computing systems, if any, the use of disparate databases to store information, and the added opportunity to introduce errors while transferring the information from manually record sheets to the computing systems.

A number of systems have been proposed for automating certain aspects of tracking a player's performance. Many casinos employ player identification or "comp" cards to identify players and automated systems for monitoring how long a player remains at a gaming table. In such systems, the time is typically determined as the time between a first reading of the comp card when the player arrives at a gaming table and a second reading when the player leaves the gaming table. These systems typically rely on manual observations to 1) guess the average amount of a player's wagering, and 2) guess the average number of hands per unit of time, in order to estimate the amount wagered and consequently the amount of complimentary benefit to be awarded to the player. Some players have learned to take advantage of these systems to enhance the value of complimentary benefits, commonly referred to as "comps," received by increasing their bet amounts when the pit boss is watching, and reducing their bet amounts when the pit boss is not watching.

Some of the Applicants' prior patent applications have taught the full automation of data collection for both player information and casino personnel information, in the context of certain table games, for example blackjack. Such fully automated data collection may not be suitable to all wagering games. Economically, some casinos may only be able to automate a portion of its games in the short term, making fully automated data collection and integration across the entire casino floor a long-term investment.

Additionally, many of the proposed systems do not address the various non-gaming aspects of the casino's business, for example, providing guest facilities such as guest rooms, restaurants, coffee shops, souvenir or gift shops, gymnasiums, and/or childcare facilities, or providing other forms of entertainment such as shows and nightclubs.

Further, many casinos experience a wide fluctuation in the number of customers who wish to play or otherwise enjoy the various accommodations offered by the casino. These fluctuations may be periodic, for example daily, weekly, monthly or yearly, or may be non-periodic, for example during special events. The building and staffing of new casino facilities is daunting. Zoning, the cost of land, the cost of construction, and the costs associated with background checking, training and keeping casino staff available are substantial. Casino operators are thus typically presented with the unenviable decision of committing significant resources to building and staffing sufficiently to accommodate the maximum number of players during times of high demand, or risk losing business during times of high demand.

Like any business, casinos can greatly benefit by increasing the timeliness and accuracy of data capture, and by seamlessly integrating the data in its various database systems. Casinos can also greatly benefit if variations in demand can be accommodated without building and staffing new facilities.

BRIEF SUMMARY OF THE INVENTION

The manual data entry system that casino pit personnel currently employ for player tracking is replaced, at least in part, with a system employing wireless communications devices, for example, handheld personal digital assistants (PDAs), and a server computing system with an integrated database. The server computing system may also communicate with fully automated data collection systems associated with some gaming tables and/or with the casino's legacy data collection systems and databases. Further, the server computing system may communicate with various non-gaming related casino systems, such as point-of-sale (POS) terminals and/or accounting systems, related to the various guest facilities. For example, the server computing system may allow player comps to be freely exchanged for services and merchandise, for example rooms, meals, drinks, tickets to shows, and/or daycare services.

Additionally, or alternatively, a system employing wireless communications devices, for example, handheld personal digital assistants (PDAs), and a server computing system with an integrated database, may allow players to wager and access other casino facilities. The system may, for example, allow players to play wagering games without physically occupying the limited number of positions available at the casino's gaming tables, thereby allowing a casino to accommodate additional patrons without having to build and/or staff additional facilities. The server computing system may also communicate with fully automated data collection systems associated with some gaming tables and/or with the casino's legacy data collection systems and databases. Further, the server computing system may communicate with various non-gaming related casino systems, such as point-of-sale (POS) terminals and/or accounting systems, related to the various guest facilities. For example, the server computing system may allow player comps to be freely exchanged for services and merchandise, for example, rooms, meals, drinks, tickets to shows, and/or daycare services. Communications may advantageously employ wager transaction packets which may transmit intact, all information used in placing a wager.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements and angles are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with cameras, imagers, scanners, optics, computers, computer networks, data structures, databases, and networks such as the Internet or cellular networks, have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Environment

Figure 1:
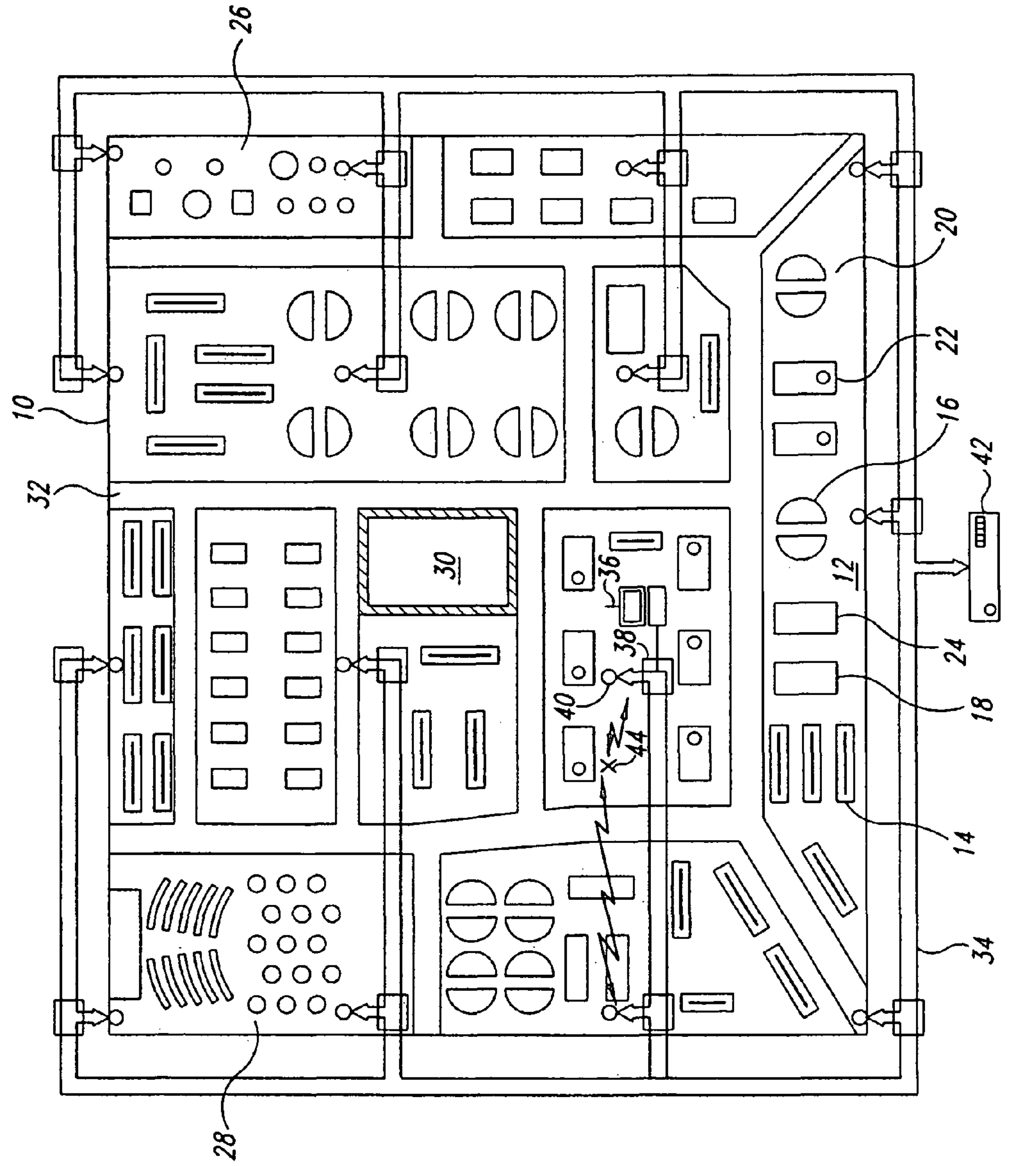
FIG. 1 is a schematic diagram of a casino communications system employing a network comprising a number of wired access points such as pit podium personal computers, a number of wireless communications devices, a number of wireless access points for providing communications with the wireless communications devices, and a server computing system, according to one illustrated embodiment.

FIG. 1 shows a gaming environment such as a casino 10, having a number of areas for performing, participating or otherwise engaging in various activities typically associated with casinos. For example, the casino 10 may include a number of gaming areas 12 devoted to gaming activities. Gaming areas 12 may include a number of games such as banks of gaming machines 14 and/or gaming tables such as blackjack 16, baccarat 18, poker 20, roulette 22, and/or big wheel 24 tables to name a few. Only one gaming area and only one of each type of table is enumerated in FIG. 1 for the sake of clarity of illustration. The games may be clustered in groups commonly referred to as pits. Also for example, the casino 10 may include one or more customer facility areas 26 devoted to customer facilities such as guest rooms, restaurants, coffee shops, souvenir or gift shops, gymnasiums, restrooms, and/or childcare facilities. Also for example, the casino 10 may include one or more entertainment areas 28 such as theaters or nightclubs or play areas. The casino may further include one or more backroom areas 30, such as counting rooms and/or cashiers' or tellers' cages. These areas 12, 26, 28 are typically connected by walkways 32.

The casino may employ a network 34. The network 34 may include a number of wired access points such as pit podium personal computers 36 linked to the network 34 by one or more network switches 38. Note only one pit podium personal computer 36 and only one network switch 38 is enumerated in FIG. 1 for the sake of clarity or presentation. In typical use, the pit podium personal computers 36 will provide information to casino personnel such as dealers or pit bosses, regarding a specific player's performance, previous history with the casino, and/or preferences. Additionally, the pit podium personal computers 36 may be manually operated by authorized casino personnel, for entering gaming information.

The network 34 may additionally or alternatively include a number of wireless access points 40 linked to the network 34 by one or more network switches 38. Note only one wireless access point 40 is enumerated in FIG. 1 for the sake of clarity of presentation. The wireless access points 40 include receivers and antennas, and may also include transmitters to allow wireless communications with one or more casino server computing systems 42 by one or more wireless communications devices 44 via the network 34. Note only one wireless communications device 44 is enumerated in FIG. 1 for the sake of clarity or presentation.

In one embodiment, the wireless communications devices 44 are distributed to authorized casino personnel, such as pit bosses, to allow the casino personnel to manually enter information regarding customers or players, and/or employees such as dealers, servers or wait staff. In another embodiment, the wireless communications devices 44 are distributed to customers or players, for example, to allow players to play, track their own comps and/or to order services and merchandise such as food, drinks, tickets, parking valet, cleaning, room service, etc.

The wireless access points 40 may be distributed about the casino 10, including one or more floors, to provide wireless coverage of all or selected portions of the casino 10. For example, the wireless access points 40 may be distributed in a grid pattern, and attached to the ceiling or walls of the casino 10. The wireless access points 40 may be attached to various equipment or structures such as the gaming tables 16-24 and/or gaming machine banks 14. The wireless access points 40 may further be distributed in guest rooms (not shown).

While illustrated as a single network 34, the network may be composed of one or more networks, interconnected via various bridges, routers and/or other network equipment, as will be readily apparent to one of skill in the art. While FIG. 1 illustrates a number of pit podium personal computers 36 and wireless access points 40 positioned within the casino 10, in some embodiments one or more wired or wireless access points may exist outside of the casino 10, as will be readily apparent to those of ordinary skill in the art.

Figure 2:
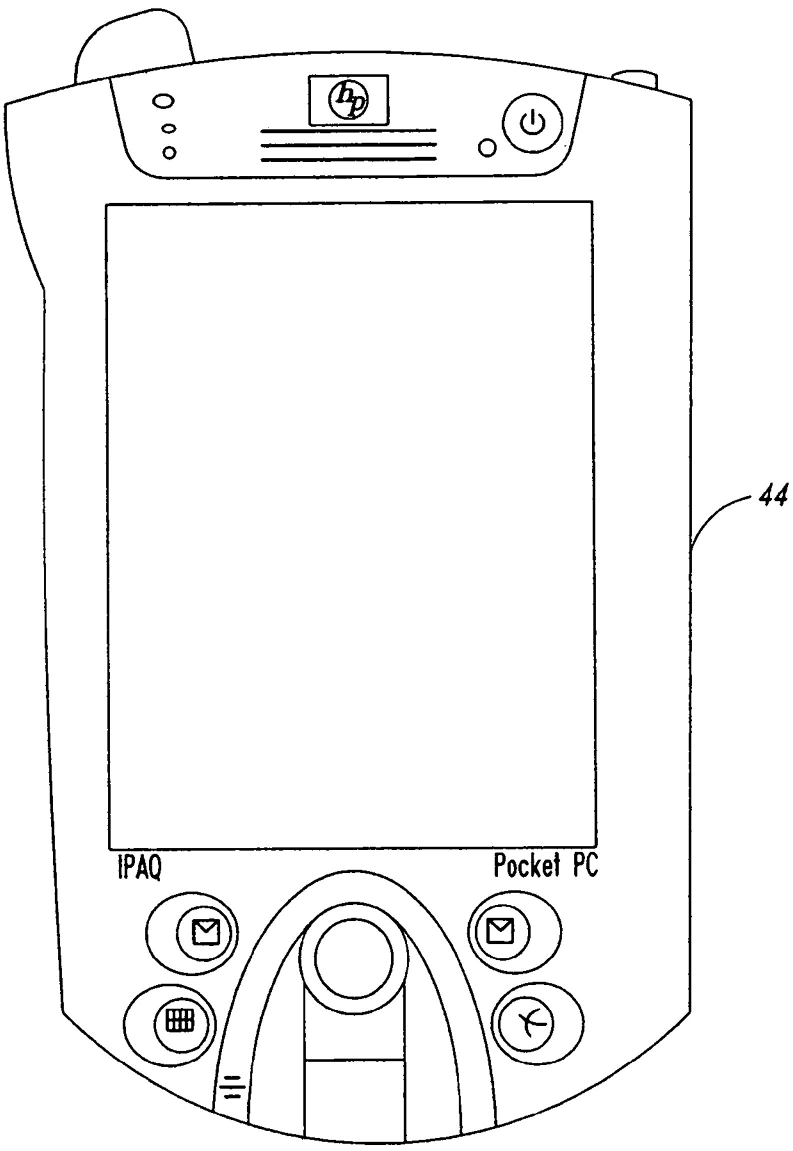
FIG. 2 is a front plan view of a wireless communications device suitable for use as part of the casino communications system of FIG. 1, according to one illustrated embodiment.
Figure 3:
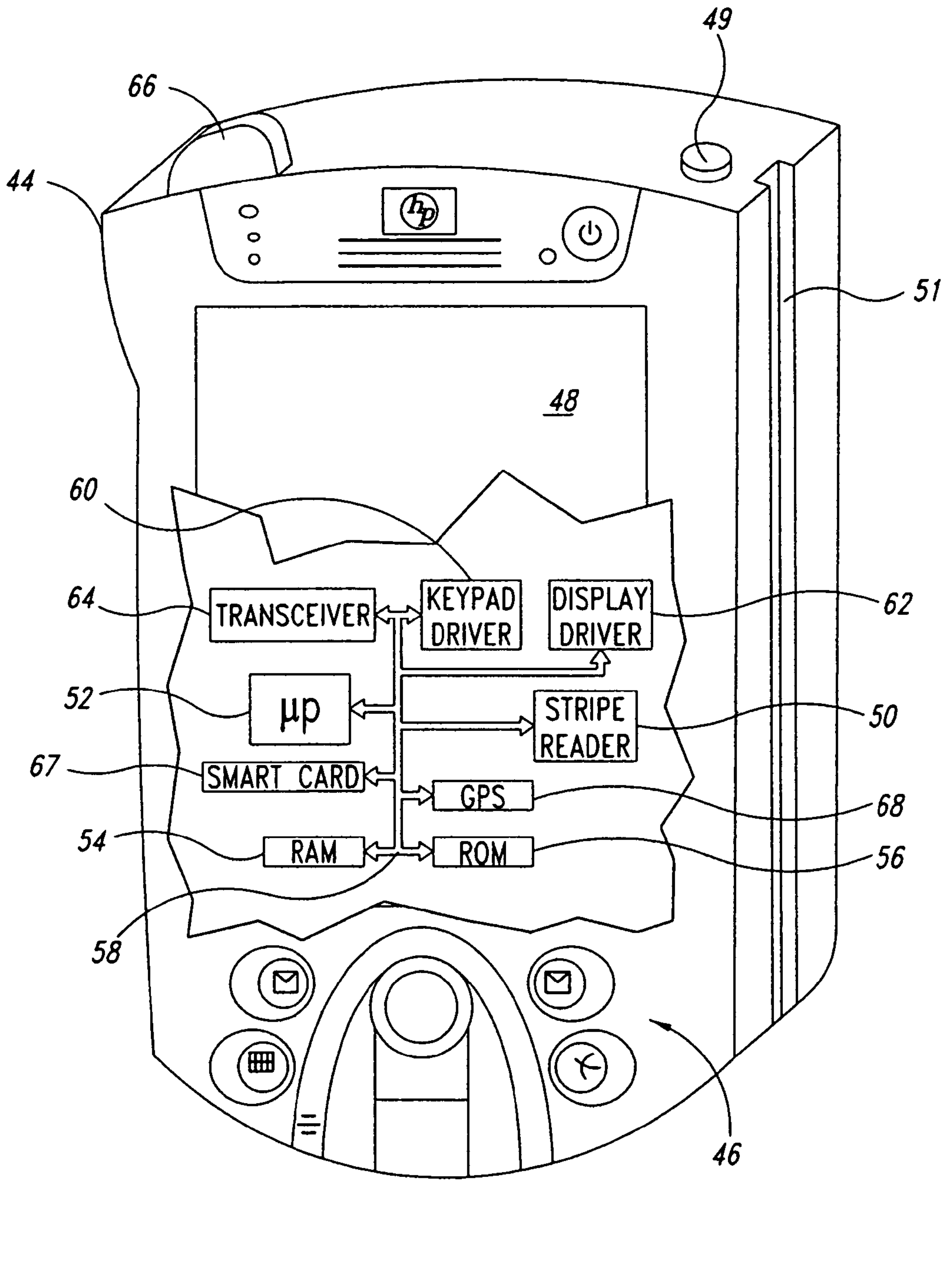
FIG. 3 is a functional block diagram of a wireless communications device suitable for use as part of the casino communications system of FIG. 1, according to one illustrated embodiment.

FIGS. 2 and 3 shows a wireless communications device 44 according to one illustrated embodiment. The wireless communications devices 44 may take the form of personal digital assistants (PDAs), handheld personal computers (PCs), appropriately configured cellular telephones, or other handheld communications devices. Suitable wireless communications devices 44 may, for example, take the form of devices with wireless local area network (WLAN) capability per IEEE specification 802.11b.

The wireless communications devices 44 may include a user interface such as a keyboard or keypad 46 and/or display 48 such as a liquid crystal display (LCD) which may, or may not, be touch-sensitive to serve as a user input device. Where the display 48 is touch-sensitive, the wireless communications devices 44 may also include a stylus 49 to enter information via the touch-sensitive display 48. The wireless communications devices 44 may also include a magnetic strip reader 50 to read identifying information from media such as player complimentary ("comp") cards, and/or credit, debit and gift cards moved through a slot 51.

The wireless communications devices 44 may include a processor 52, and memory such as random access memory (RAM) 54, Read Only Memory (ROM) 56, flash memory and/or electronically erasable programmable read only memory (EEPROM) coupled by one or more system buses 58 to store data and instructions for execution by the processor 52. The wireless communications devices 44 may also include a keypad driver to couple user entries at the keypad 46 to the processor 52, and/or a display driver 62 to couple display data from the processor 52 to the display 48.

The wireless communications devices 44 may also include a transmitter and receiver, or transceiver 64 under the control of the processor 52, and coupled to one or more antennas 66 to wirelessly transmit and/or receive information. Additionally, or alternatively, the wireless communications devices 44 may include an illuminator (not shown), for example, a laser or a light emitting diode (LED) such as an infrared LED to optically transmit information. Optical transmission requires line-of-sight between the transmitter and receiver, which is typically considered to be a disadvantage, but may be considered advantageous where security is a concern or where location determination is desirable.

The wireless communications devices 44 may optionally include a smartcard 67 or similar module. The smartcard 67 may encode a unique identifier which may be associated to a user, for example via a secure database operated by the casino. The smartcard 67 may be permanently secured in the wireless communications device 44. Alternatively, the smartcard 67 may be selectively removable therefrom and installable in another wireless communications device, allowing the user to easily upgrade wireless communications devices 44 or switch wireless communications devices 44, for example, based on the particular casino they are patronizing.

The unique identifier may advantageously be hardwired in the smartcard 67, and may not be read, copied or otherwise discernable without the destruction of the smartcard 67. For example, the unique identifier may be used to generate responses to identification queries produced by the casino system. The smartcard 67 may execute a cryptographic algorithm to generate the response using the unique identifier. In one embodiment, the cryptographic algorithm may take the form of a public/private key pair algorithm. The smart card 67 may also employ a seed or other value provided in the identification query in generating the response using the cryptographic algorithm. Consequently, the unique identifier and/or cryptographic algorithm is only known by the casino server computing system 42, and the unique identifier itself is never transmitted beyond the casino server computing system 42 or firewall associated therewith.

The identifying information may be related by the casino server computing system 42 to an equipment identifier physically associated with the wireless communication device (e.g., stored in memory 54, 56 or microprocessor 52). This may, for example, allow the casino server computing system 42 to determine whether a particular wireless communications device 44 is authorized for use, and also whether the particular user using the particular wireless communications device is the owner or authorized or registered user for the wireless communications device 44. Thus, the casino server computing system 42 may track stolen, lost or otherwise undesirable wireless communications devices 44, and deny access by such wireless communications devices 44 to the casino's automated facilities. Likewise, the casino server computing system 42 may track users who have bad debt, have been identified as cheaters or are otherwise undesirable, and deny access to the casino's automated facilities by smartcards 67 associated with such users. Further, the casino may rely on the smartcard 67 to verify the age of user attempting to place a wager. The user's age may be verified during a registration or authorization process. For example, casino personnel may verify age from a government issued identification document (e.g., drivers license, passport) as a prerequisite to receiving a smartcard 67 or to registering or otherwise authorizing the smartcard 67 for use in placing wagers. Allowing a minor to use a smartcard 67 may be considered a crime similar to lending a minor a driver's license. As a further example, a photograph of the authorized or registered smartcard user may be displayed by a wireless communications device 44 used by a casino employee, for example when suspicion exists that a minor is wagering. This approach may be enhanced with the use of biometric data captured by one or more biometric sensors, which may be a part of the wireless communications device 44 or a peripheral device. Biometric data may include iris scan, finger or thumbprints, voice samples, or other biometric measures.

The wireless communications devices 44 may optionally include a global positioning system (GPS) receiver 68 to receive GPS positioning information from one or more GPS satellites. The wireless communications device 44 may provide the global positioning data to the casino server computing system(s) 42 (FIG. 1). Additionally, or alternatively, the casino server computing system(s) 42 may optionally employ other means for determining the location of the wireless communications device 44, for example triangulation, delay between receipt of a signal by two or more wireless access points 40, determination of signal strength at two or more wireless access points 40, or other similar techniques.

Figure 4:
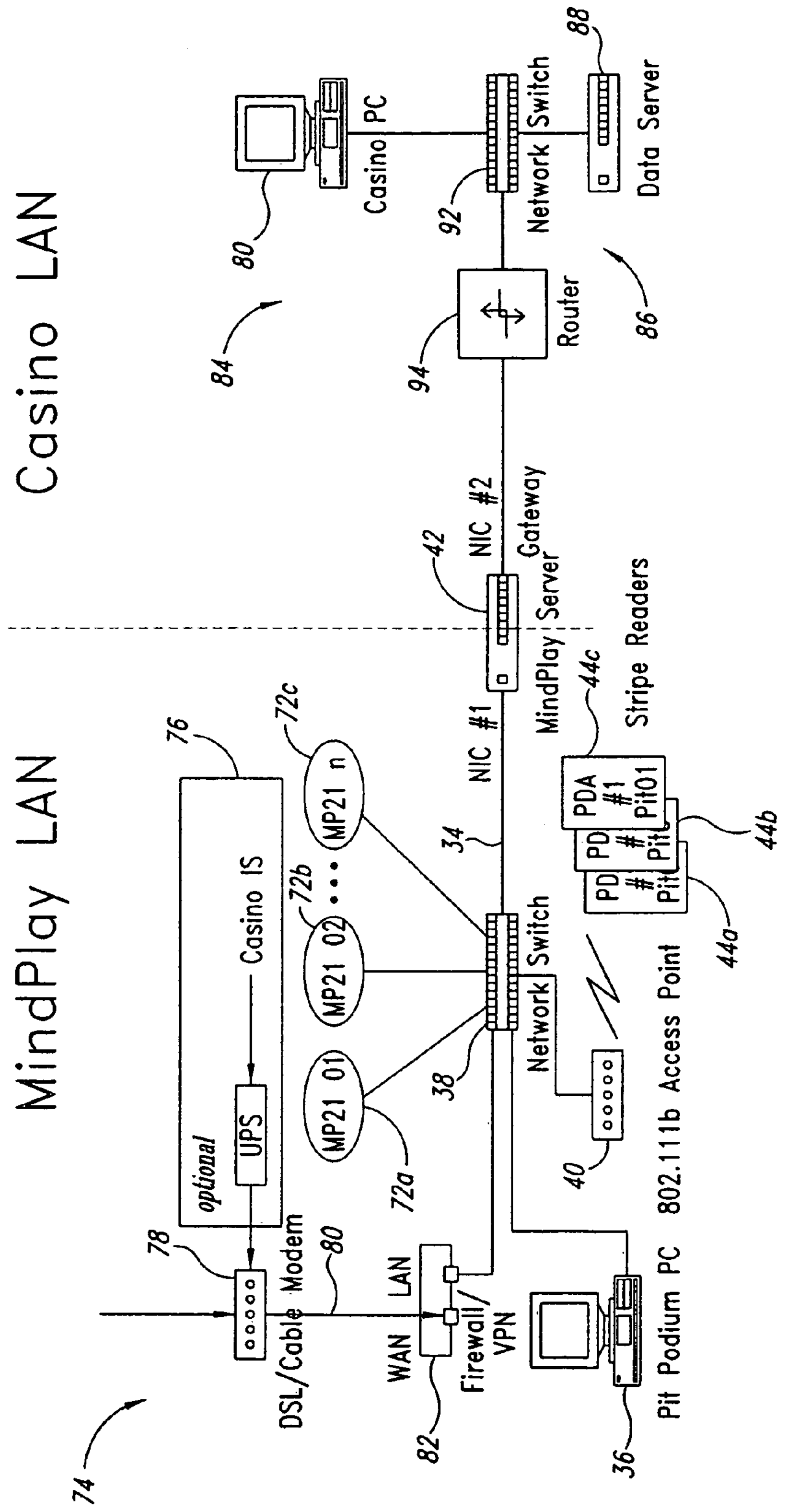
FIG. 4 is a schematic diagram of a casino communications system integrated with a legacy casino management system according to one illustrated embodiment.

FIG. 4 shows one embodiment of a casino communications system 70, employing the network 34, pit podium personal computers 36, network switches 38, wireless access points 40, the casino server computing system(s) 42, and wireless communications devices 44*a*, 44*b*, 44*c*. Additionally, the casino communications system 70 may include a variety of gaming table or gaming machine (e.g., slots, video slots, video poker) based automatic data collection systems 72*a*, 72*b*, 72*c*, such as the table game data collection system discussed in commonly assigned U.S. Pat. No. 6,460,848. These automatic data collection systems, collectively referenced as 72, may communicate over the network 34 with the casino server computing system(s) 42 via one or more of the network switches 38.

The casino communications system 70 may additionally or alternatively include an interface 74 to casino information services 76. For example, the interface 74 may include a digital subscriber line (DSL) or cable modem 78, a LAN or WAN connection 80 to a firewall or virtual private network (VPN) 82 between the modem 78 and a network switch 38.

The casino server computing system(s) 42 may serve as a proxy for the casino's legacy networked computing system(s) 84. The legacy networked computing system(s) 84 may, for example, comprise a local area network (LAN) 86 including a casino management system (CMS) 88, one or more casino personal computers 90, one or more network switches 92, and a router 94. The legacy networked computing system(s) 84 may, for example, include one or more of the following: existing player comp systems, security systems, reservation systems, room service systems, telephone billing systems, POS terminals and/or systems, accounting systems, employee tracking and monitoring systems.

Figure 5:
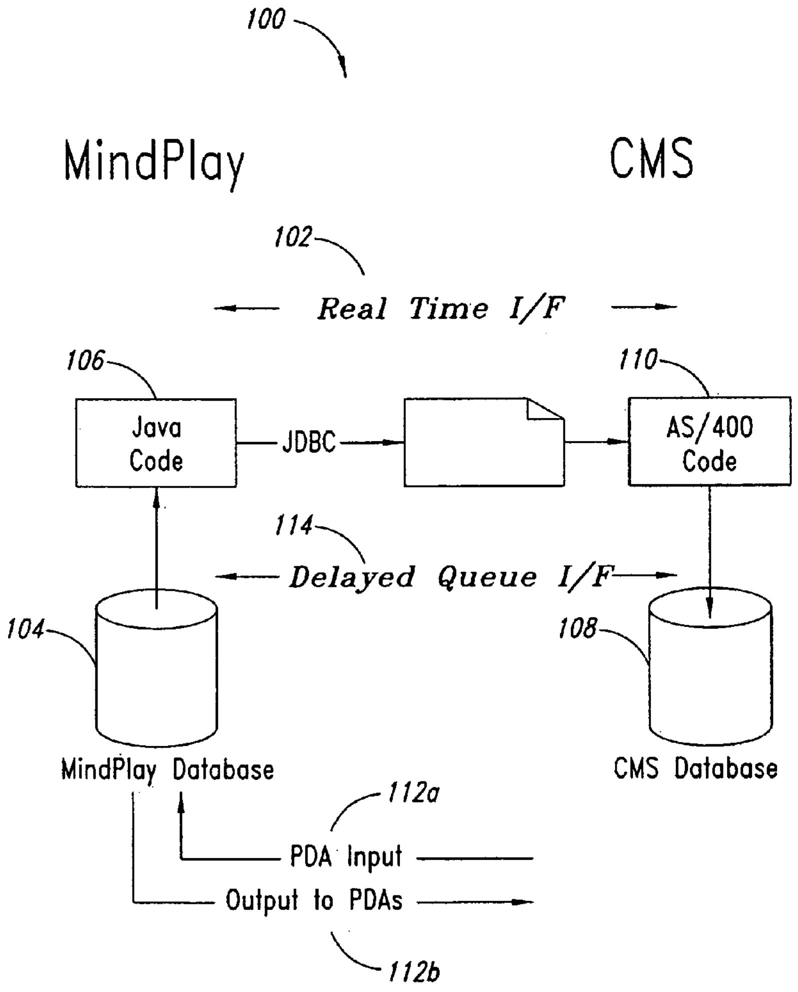
FIG. 5 is a schematic diagram of a data exchange model for the casino communications system according to one illustrated embodiment.

FIG. 5 shows a data exchange model 100 illustrating bi-directional communications between the casino communications system 70 and the CMS 88 for facilitating the integration of information between pit podium personal computers 36, wireless communications devices 44, automatic data collection systems 72, and the legacy CMS 88. In particular, a real-time interface 102 provides time sensitive bi-directional communications between a database 104 via Java system 106 and a CMS database 108 via legacy system 110 (e.g., AS/400). For example, the real-time interface 102 may transfer player rating and/or player comp information. The database may communicate with one or more of the wireless communications devices 44 via suitable communications channels 112*a*, 112*b*. Additionally, a delayed queue interface 114 provides less time sensitive bi-directional communications between the casino communications system 70 and the CMS 88.

Monitoring/Tracking by Employees

Figure 6:
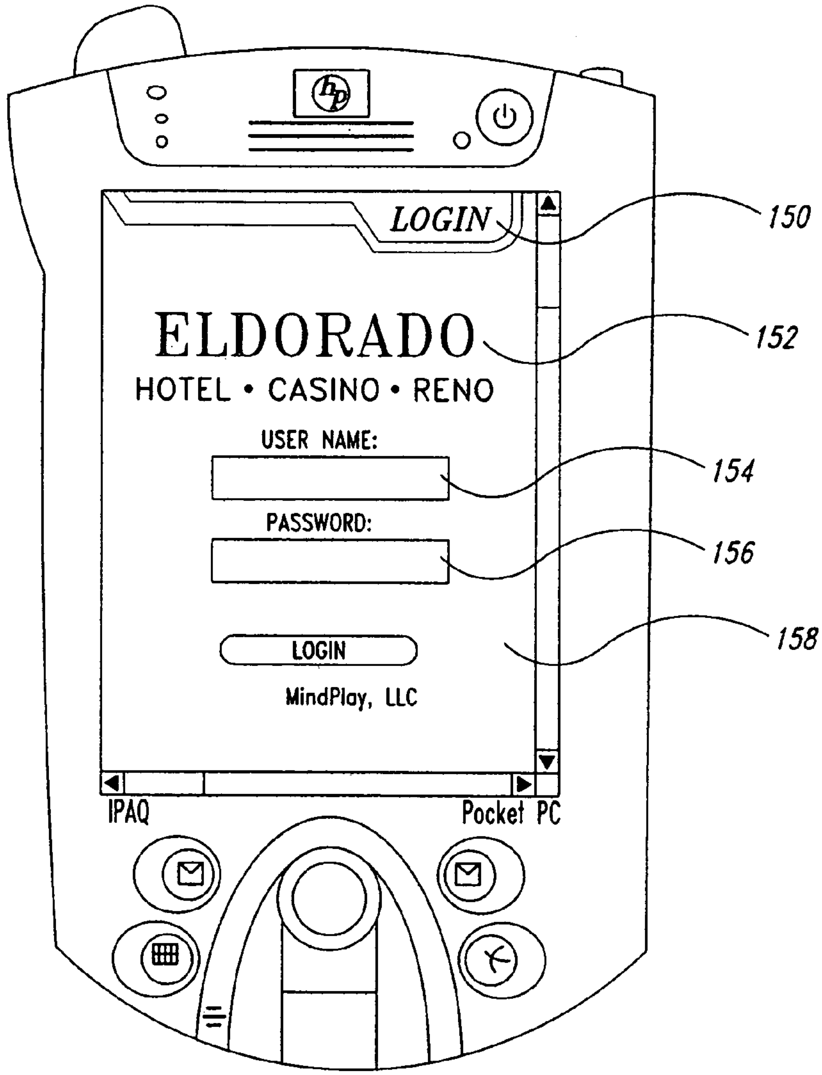
FIG. 6 is a front plan view of the wireless communications device of FIG. 1, showing a login screen of a graphical user interface, according to one illustrated embodiment.

FIG. 6 shows a login screen 150 of a graphical user interface as displayed by a wireless communications device 44, according to one illustrated embodiment.

The login screen 150 may include the name and/or advertisement 152 for the particular casino. The login screen 150 includes a user name field 154 for entry of a user name and a password field 156 for entry of a user password. Access is denied unless an authorized user name and corresponding password are entered into the appropriate fields 154, 156. A user-selectable login icon 158 allows the user to submit the user name and password for authentication/verification.

Figure 7B:
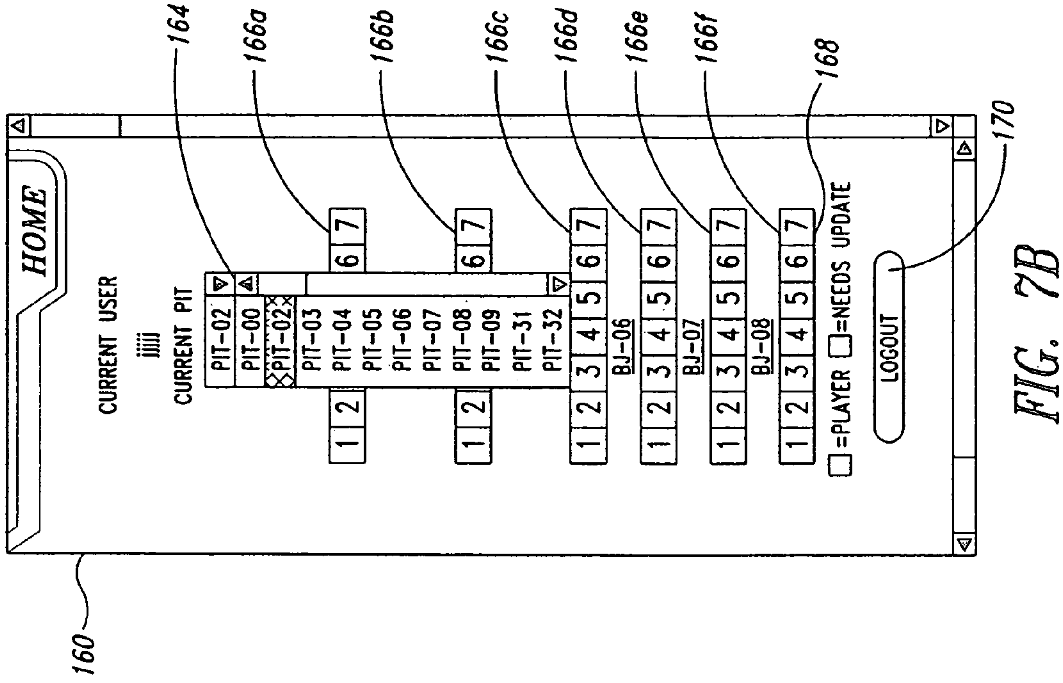
FIG. 7B is a front plan view of the tracking screen of FIG. 7A.
Figure 7A:
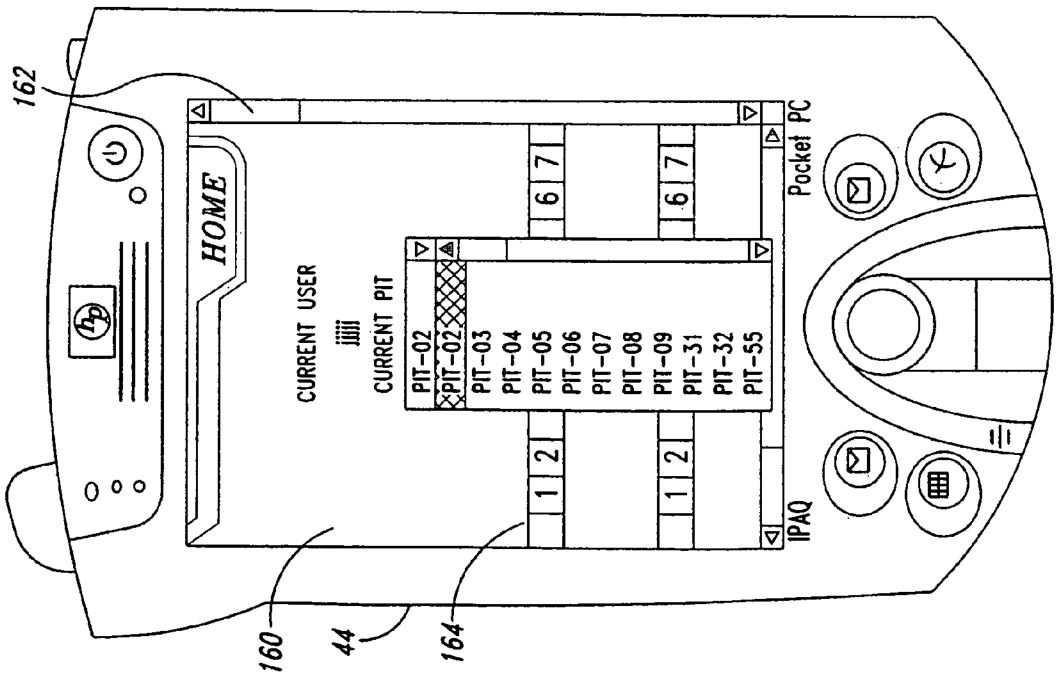
FIG. 7A is a front plan view of the wireless communications device of FIG. 1, showing a portion of a tracking screen of a graphical user interface, according to one illustrated embodiment.

FIGS. 7A and 7B show a tracking screen 160 of a graphical user interface as displayed by a wireless communications device 44, according to one illustrated embodiment. The tracking screen 160 shows the active tables and/or players that are being tracked.

The tracking screen 160 includes a user-selectable scrollable bar 162 for viewing additional portions of the tracking screen 160. The tracking screen 160 also includes a user-selectable and scrollable menu 164 for identifying and selecting among a number of pits to display. The tracking screen 160 displays each gaming table and/or gaming machine in the selected pit as a separate row 166*a*-166*f*. Each player position at the gaming table or gaming machine is also identified by a suitable icon 168 (only one called out in the figures for sake of clarity of illustration). In the illustrated example, the tracking screen 160 shows a selected pit identified as PIT-02, which includes six (6) blackjack tables, each with seven (7) player positions. The tracking screen 160 may further include a user-selectable icon 170 for logging off.

Figure 8:
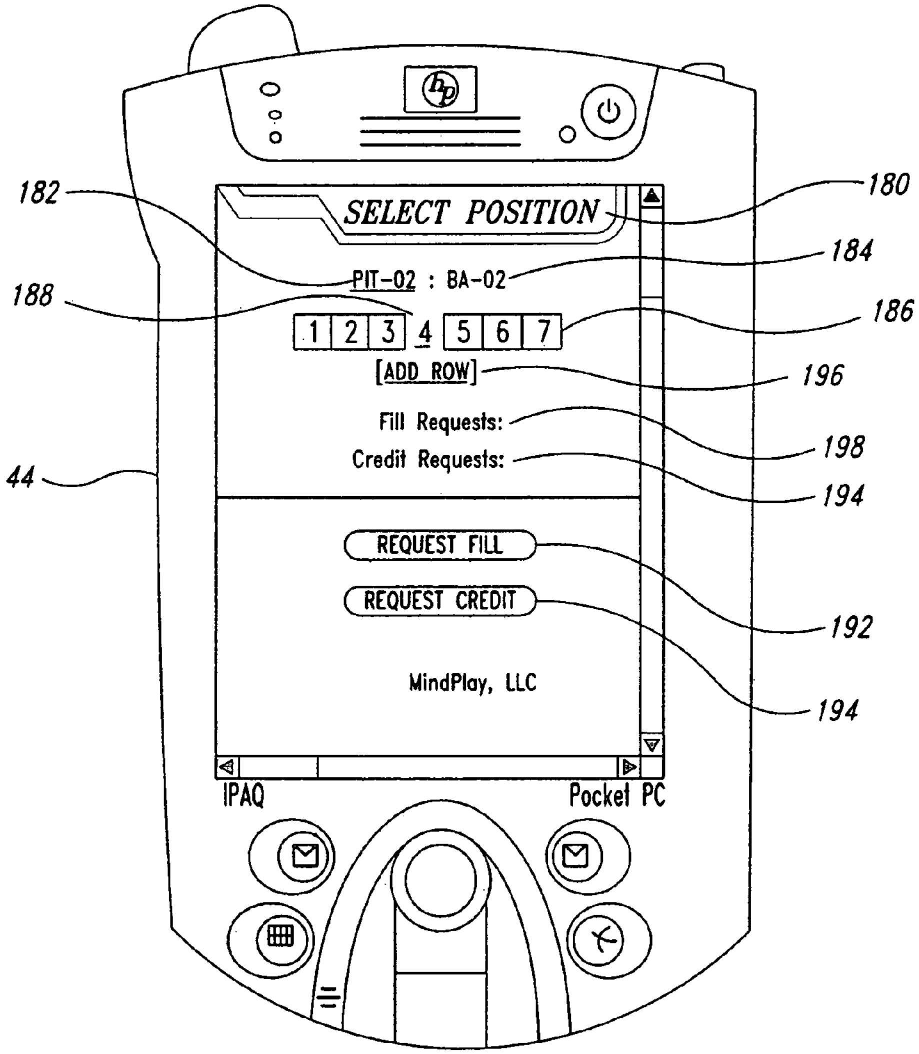
FIG. 8 is a front plan view of the wireless communications device of FIG. 1, showing a portion of a position selection screen of a graphical user interface, according to one illustrated embodiment.

FIG. 8 shows a position selection screen 180 of a graphical user interface as displayed by a wireless communications device 44, according to one illustrated embodiment.

The position selection screen 180 includes a pit identification field 182 and a table identification field 184. The table is represented as a row 186, with the various player positions 188 (only one called out in the figures for sake of clarity of illustration) represented across the row 186. A player position 188 may be identified and selected. The position selection screen 180 represents the selected player position 188 with a visual indicator, for example highlighting, different color, flashing, marqueeing, and/or enhanced size or line weight.

The position selection screen 180 also includes a user-selectable add row icon 190 to add a new gaming table or gaming machine to a pit. The position selection screen 180 further provides user-selectable request fill icon 192 and request credit icon 194 for requesting a fill or credit, and fill request field 196 and credit request field 198 to provide results or status of the requests.

Figure 9B:
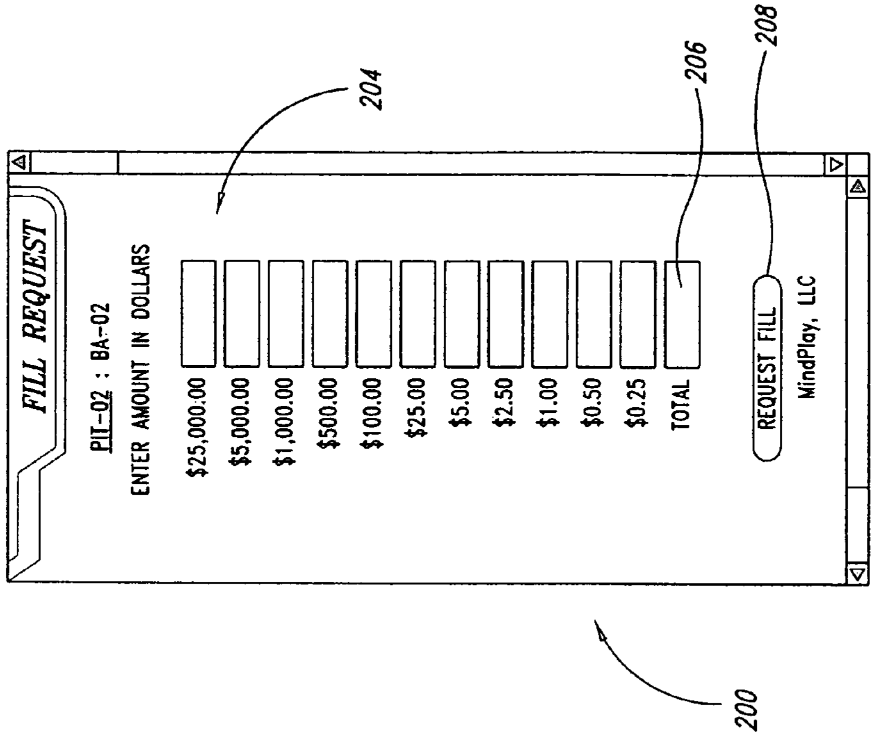
FIG. 9B is a front plan view of the fill request screen of FIG. 9A.
Figure 9A:
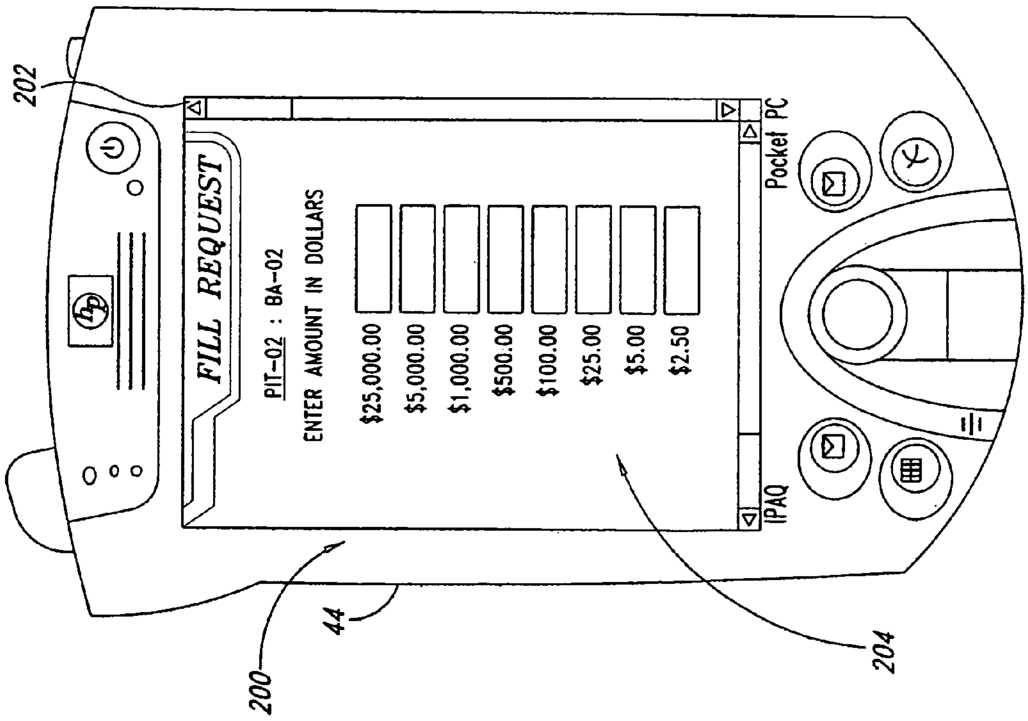
FIG. 9A is a front plan view of the wireless communications device of FIG. 1, showing a portion of a fill request screen of a graphical user interface, according to one illustrated embodiment.

FIGS. 9A and 9B show a fill request screen 200 of a graphical user interface as displayed by a wireless communications device 44, according to one illustrated embodiment. The fill request screen 200 is displayed in response to selection of the request fill icon 192 (FIG. 8). The fill request screen 200 may include a scroll bar 202 to allow a user to view all of the information on the fill request screen 200.

The fill request screen 200 has a number of fields 204 for entering a request fill amount for different denominations of chips, and a total field 206 for displaying a sum total of chips requested (e.g., sum of quantity times denomination for all requested denominations). The user can use the fill request screen 200 to request a chip tray loaded with specific quantities of chips of various denominations. The user then selects a fill request icon 208 to submit the request.

Figure 10B:
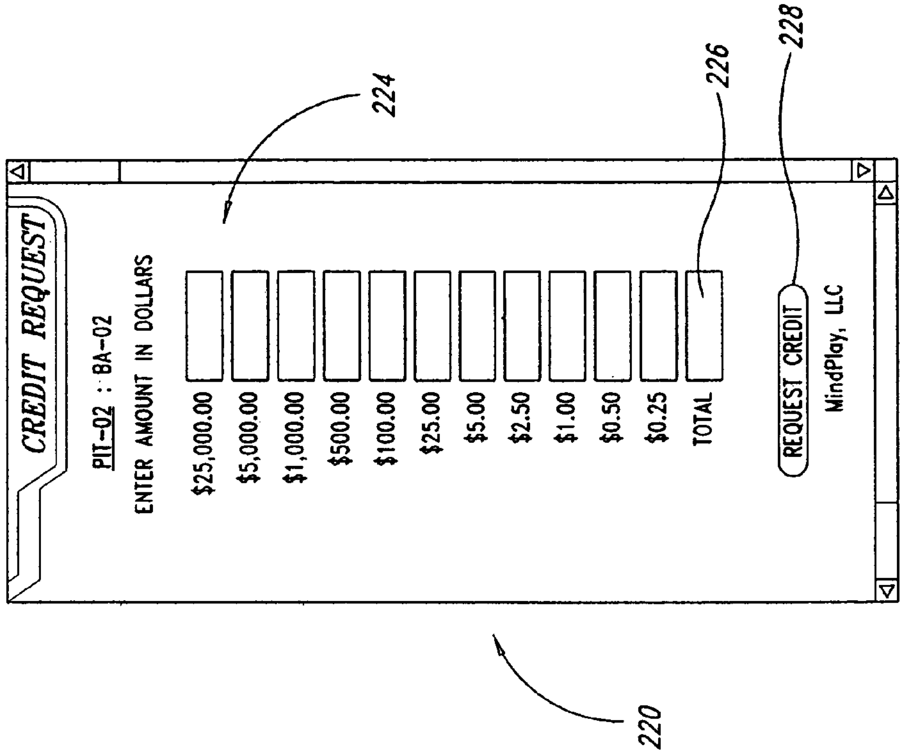
FIG. 10B is a front plan view of the credit request screen of FIG. 10A.
Figure 10A:
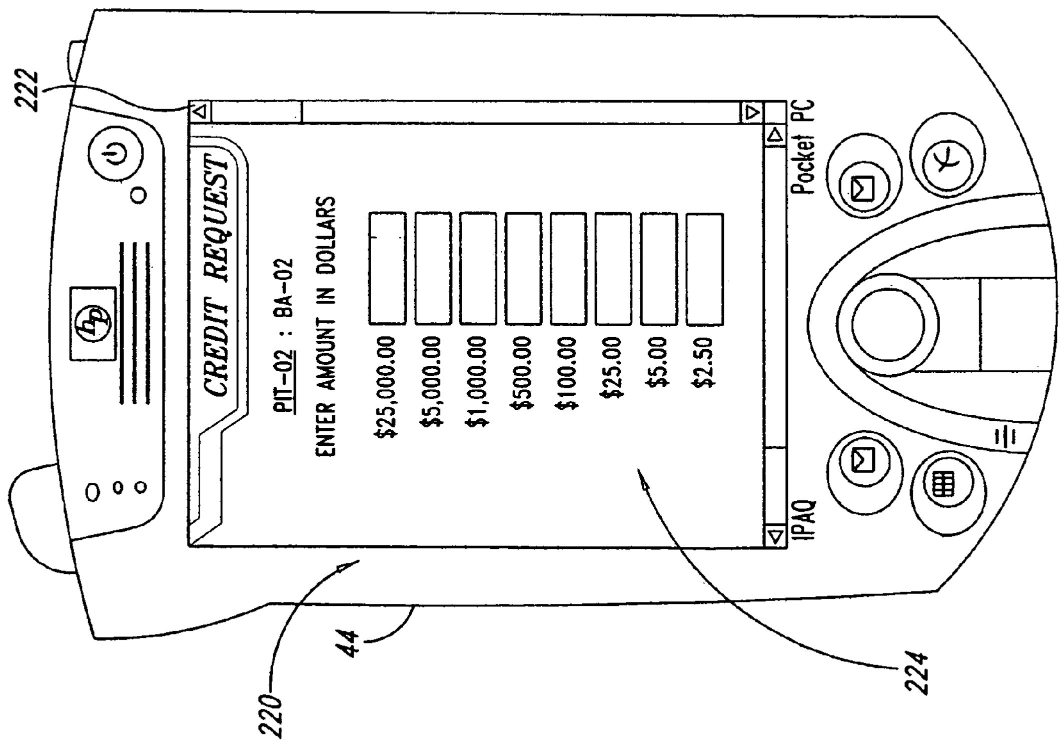
FIG. 10A is a front plan view of the wireless communications device of FIG. 1, showing a portion of a credit request screen of a graphical user interface, according to one illustrated embodiment.

FIGS. 10A and 10B show a credit request screen 220 of a graphical user interface as displayed by a wireless communications device 44, according to one illustrated embodiment. The credit request screen 220 is displayed in response to selection of the request credit icon 194 (FIG. 8). The credit request screen 220 may include a scroll bar 222 to allow a user to view all of the information on the credit request screen 220.

The credit request screen 220 has a number of fields 224 for entering a credit request amount for different denominations of chips, and a total field 226 for displaying a sum total of chips requested (e.g., sum of quantity times denomination for all requested denominations). The user can use the credit request screen 220 to request a chip tray loaded with specific quantities of chips of various denominations. The user then selects a credit request icon 228 to submit the request.

Figure 11B:
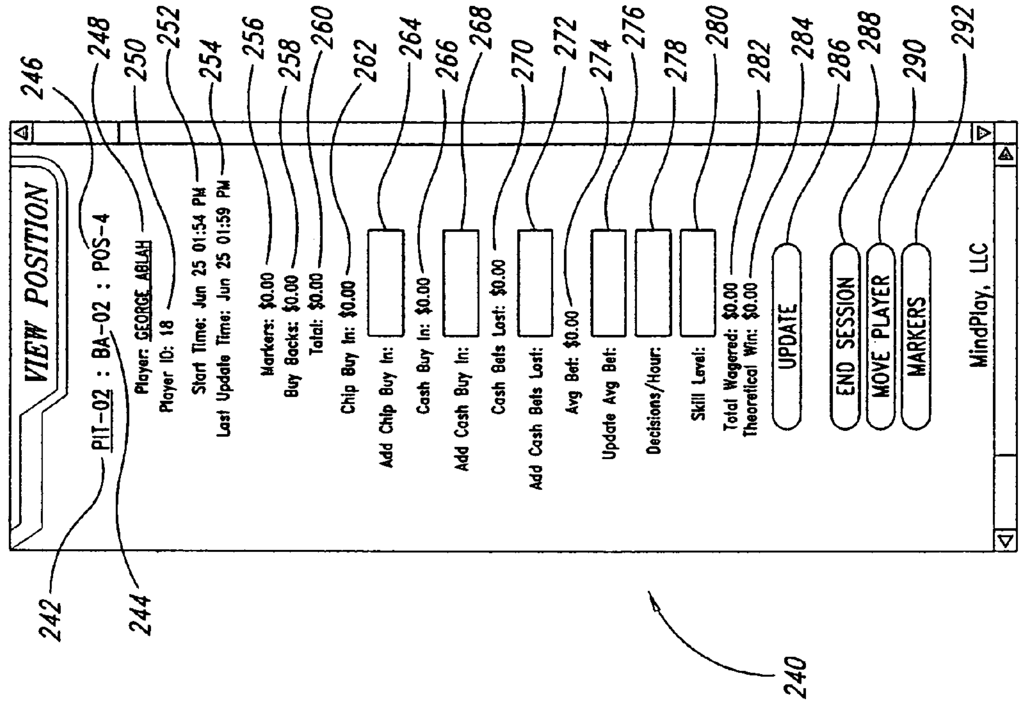
FIG. 11B is a front plan view of the view position screen of FIG. 11A.
Figure 11A:
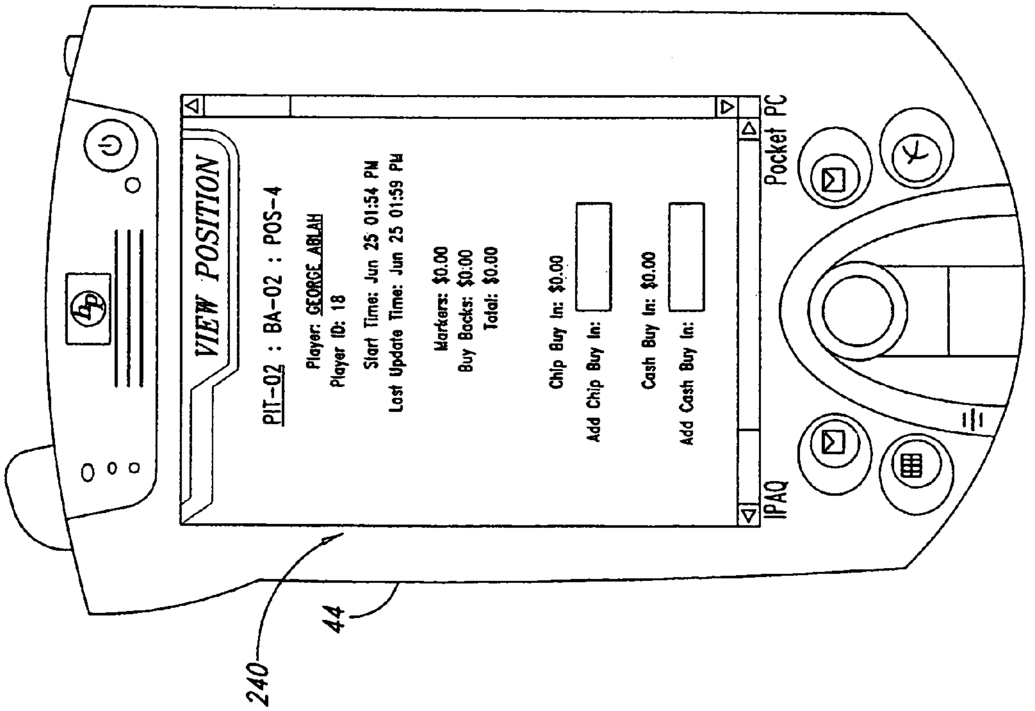
FIG. 11A is a front plan view of the wireless communications device of FIG. 1, showing a portion of a view position screen of a graphical user interface, according to one illustrated embodiment.

FIGS. 11A and 11B show a view position screen 240 of a graphical user interface as displayed by a wireless communications device 44, according to one illustrated embodiment. The view position screen 240 allows a user to view and/or enter information (e.g., tracking, comps) about a specific player position using the wireless communications device 44.

The view position screen 240 includes a pit identification field 242, a table identification field 244 and a player identification field 246 which display pit identifier, table identifier and player identifier, respectively, of a selected pit, table and player. The view position screen 240 may also include player name field 248 and a player identifier field 250, to display a player name, if known, and a unique identifier assigned to the player for tracking purposes, respectively.

The view position screen 240 may also include a start date and time field 252 and a last update date and time field 254 that display a date and time that the player tracking starts and a date and time of a most recent update for the player, respectively.

The view position screen 240 may also include markers field 256, buy back field 258 and total field 260 to display any markers advanced by the player, player buy back of the makers, and a total outstanding amount, respectively.

The view position screen 240 may also include a chip buy in field 262 to display a player's existing chip buy in amount, and an add chip buy in field 264 where the user may enter an amount of chips the player is currently buying in with. The view position screen 240 may also include a cash buy in field 266 to display a player's existing cash buy in amount, and an add cash buy in field 268 where the user may enter an amount of cash the player is currently buying in with. The view position screen 240 may also include a cash bets lost field 270 to display a player's cash loss, and an add cash lost field 272 where the user may enter an amount of cash the player is currently losing. The view position screen 240 may also include an average bet field 274 to display the player's average bet, and an update average bet field 276 where the user may enter an updated amount of average bet for the player.

The view position screen 240 may also include a decision per hour field 278 where the user may enter a number representing the actual or estimated number of decisions the player is making per hour or some other periodic interval, and a skill level field 280 where the user may enter a value representing an estimated skill level of the player. A total wagered field 282 may display a total amount wagered to date by the player, and a theoretical win field 284 may display a total amount that of a theoretical win for the player.

The view position screen 240 may further include a user-selectable update icon 286 to submit newly entered information. A user-selectable end session icon 288 allows the user to indicate that a player has ended gaming, while a user-selectable move players icon 290 allows the user to indicate that a player has moved to a new gaming table or gaming machine. A user-selectable markers icon 292 allows the user to indicate the player has offered a maker, and in response to the selection of such may pass control to a suitable screen.

Figure 12:
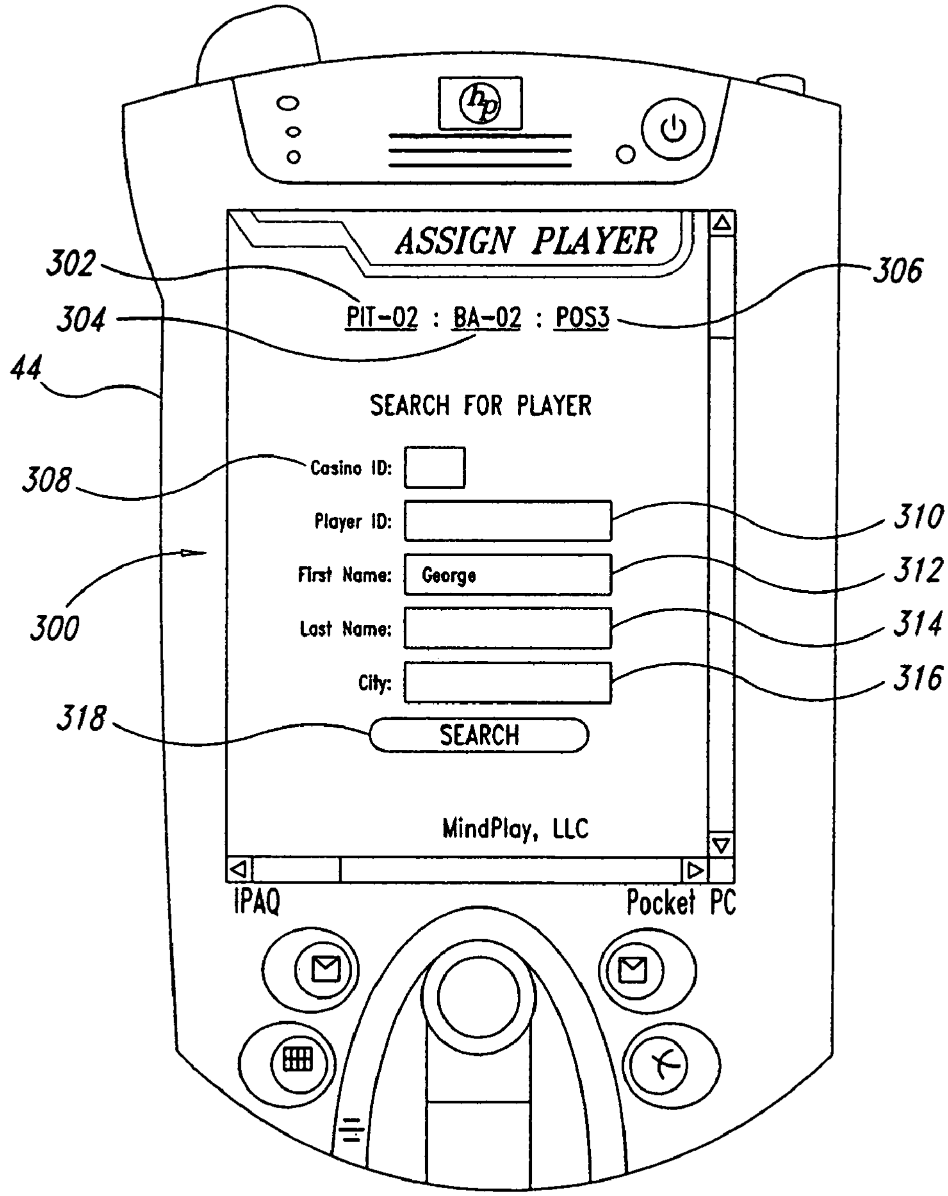
FIG. 12 is a front plan view of the wireless communications device of FIG. 1, showing a portion of an assign new player screen of a graphical user interface, according to one illustrated embodiment.

FIG. 12 shows an assign new player screen 300 of a graphical user interface as displayed by a wireless communications device 44, according to one illustrated embodiment. The assign new player screen 300 allows a user to enter a new player into the casino communications system 70 using the wireless communications device 44.

The assign new player screen 300 includes a pit identification field 302, a table identification field 304, and a player identification field 306 which display pit identifier, table identifier, and player identifier, respectively, of a selected pit, table, and player. The assign new player screen 300 may include a casino identifier field 308, where the user may enter a casino identifier. The assign new player screen 300 may also include a player identifier field 310 where the user may enter a player identifier, player first and second name fields 312, 314 where the user may enter player first and second name, respectively, and a city field 316 where the user may enter a city associated with the player such as a city of primary residence. Where known, this information helps to uniquely identify a player. The assign new player screen 300 may include a user-selectable search icon 316, which the user may use to lookup or otherwise search for a particular player based on the information entered into one or more of the fields of the assign new player screen 300.

Figure 13:
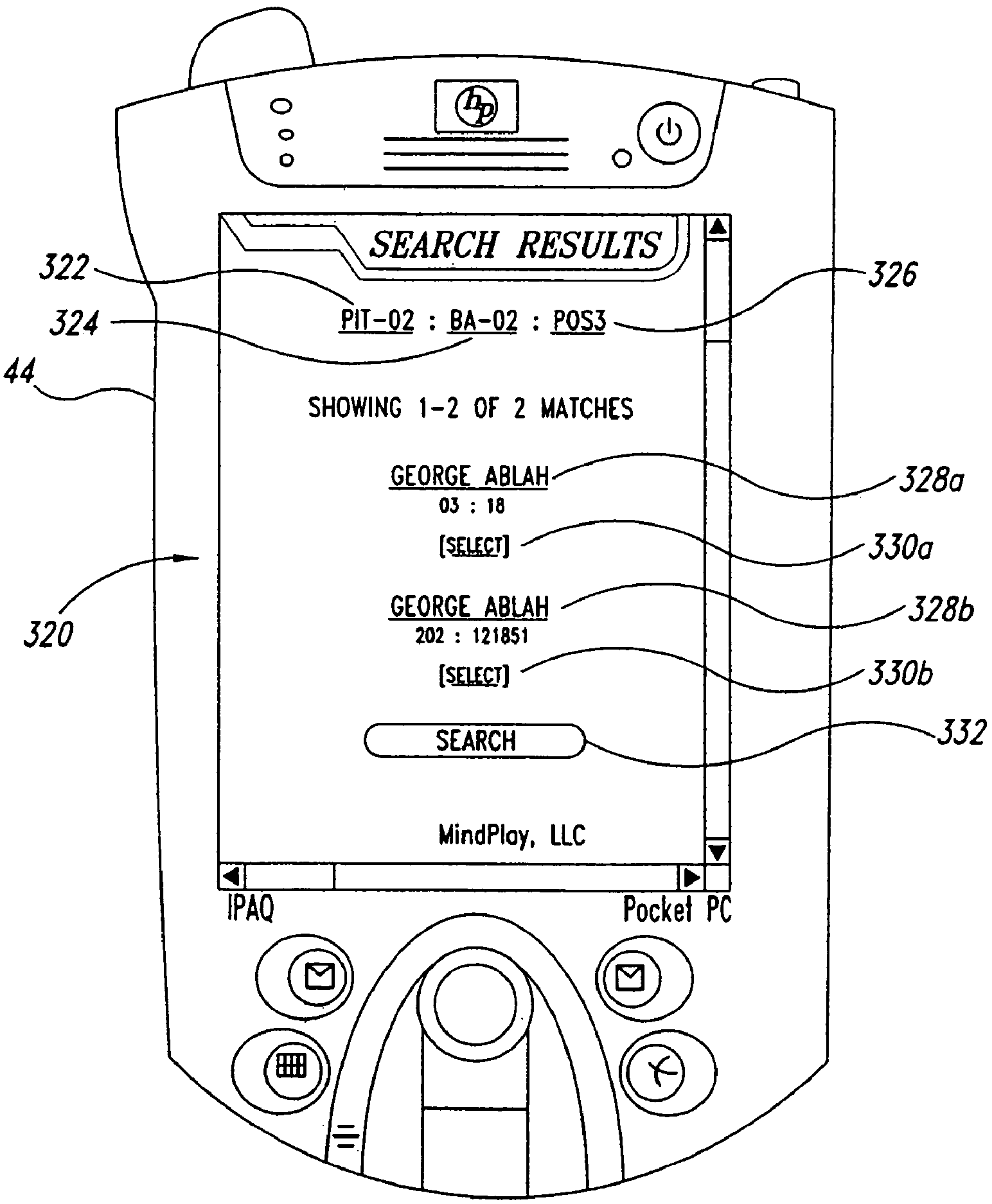
FIG. 13 is a front plan view of the wireless communications device of FIG. 1, showing a portion of a search results screen of a graphical user interface, according to one illustrated embodiment.

FIG. 13 shows a search results screen 320 of a graphical user interface as displayed by a wireless communications device 44, according to one illustrated embodiment. The search results screen 300 provides a user with results in response to selection of the search icon 316 (FIG. 12) of the assign new player screen 300.

The search results screen 320 includes a pit identification field 322, a table identification field 324 and a player identification field 326 which display pit identifier, table identifier, and player identifier, respectively, of a selected pit, table, and player. The search results screen 320 lists names 328*a*, 328*b* of each player that matches the criteria identified or entered in the fields of the assign new player screen 300 when the search icon 316 was selected, with associated user-selectable icons 330*a*, 330*b* for selecting the associated name. The search results screen 320 may include a user-selectable search icon 332, selectable to perform further searching.

Figure 14:
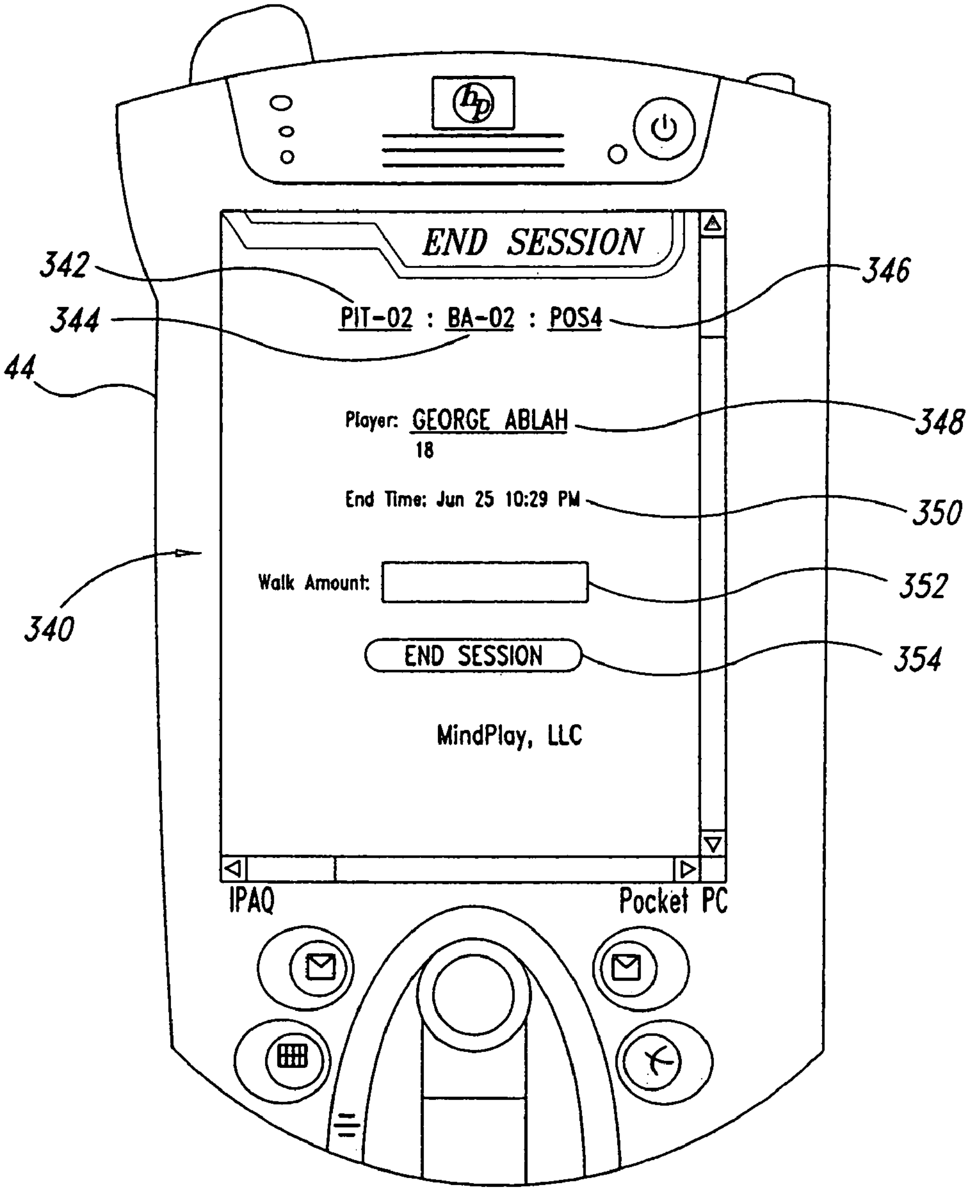
FIG. 14 is a front plan view of the wireless communications device of FIG. 1, showing a portion of an end session screen of a graphical user interface, according to one illustrated embodiment.

FIG. 14 shows an end session screen 340 of a graphical user interface as displayed by a wireless communications device 44, according to one illustrated embodiment. The end session screen 340 allows a user indicate when a player has stopped playing.

The end session screen 340 includes a pit identification field 342, a table identification field 344 and a player identification field 346 which display pit identifier, table identifier and player identifier, respectively, of a selected pit, table and player. The end session screen 340 also includes a player field 348 that identifies the player. The end session screen 340 further includes an end date and time field 350 that identifies the ending date and time and a walk amount field 352 where the user may enter an actual or estimated amount of money (cash, chips and/or vouchers) with which the player is walking away from the gaming table or piece of gaming equipment. A user-selectable end session icon 354 allows the user to provide the information into the remainder of the casino communications system 70.

Figure 15:
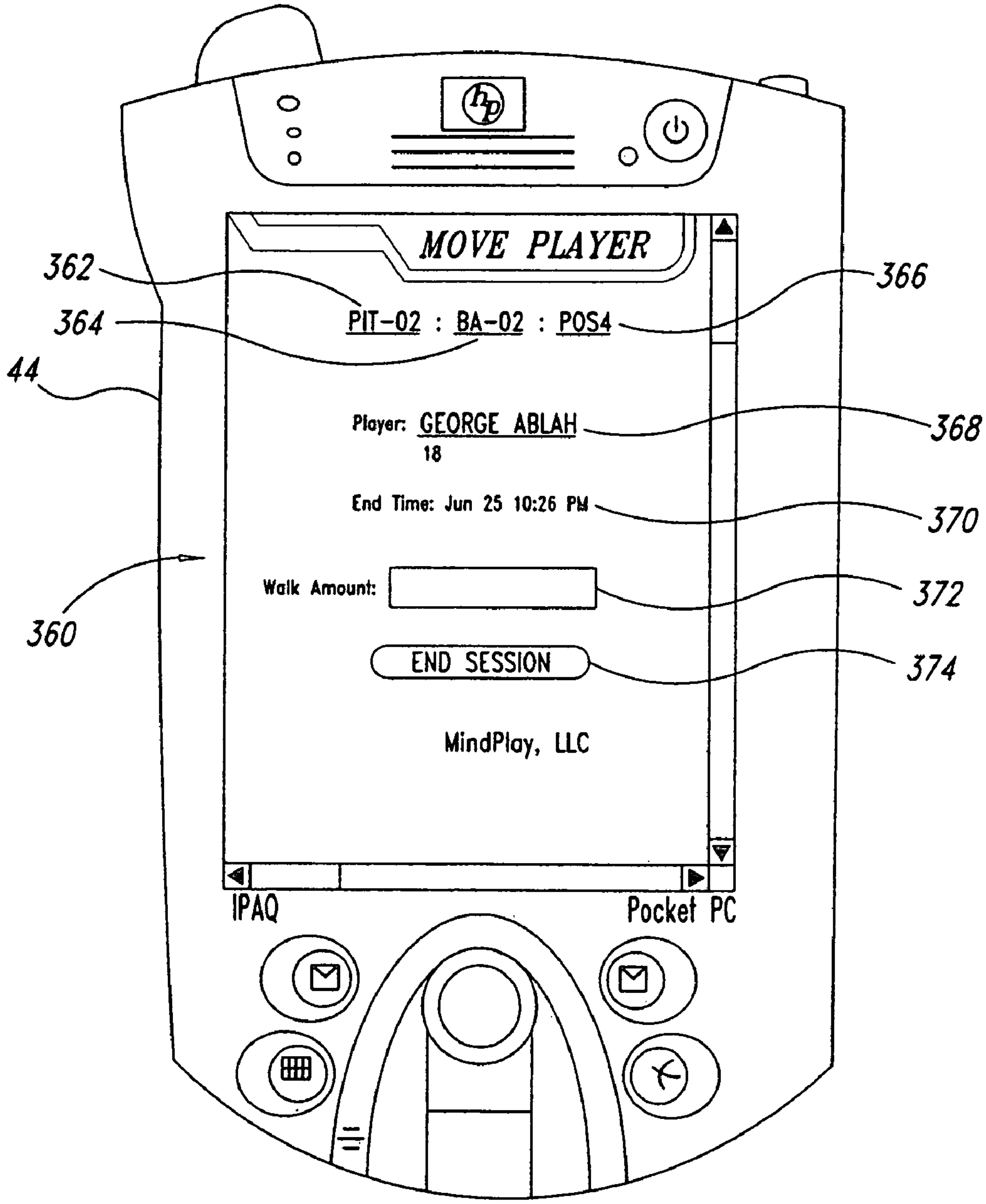
FIG. 15 is a front plan view of the wireless communications device of FIG. 1, showing a portion of a move player screen of a graphical user interface, according to one illustrated embodiment.

FIG. 15 shows a move player screen 360 of a graphical user interface as displayed by a wireless communications device 44, according to one illustrated embodiment. The move player screen 360 allows a user to indicate when a player has moved to a new gaming table or gaming machine.

The move player screen 360 includes a pit identification field 362, a table identification field 364 and a player identification field 366 which display pit identifier, table identifier and player identifier, respectively, of a selected pit, table and player. The move player screen 360 also includes a player field 368 that identifies the player. The move player screen 360 further includes an end date and time field 370 that identifies the ending date and time and a walk amount field 372 where the user may enter an actual or estimated amount of money (cash, chips and/or vouchers) with which the player is walking away from the gaming table or piece of gaming equipment. A user-selectable end session icon 374 allows the user to provide the information into the remainder of the casino communications system 70.

Figure 16:
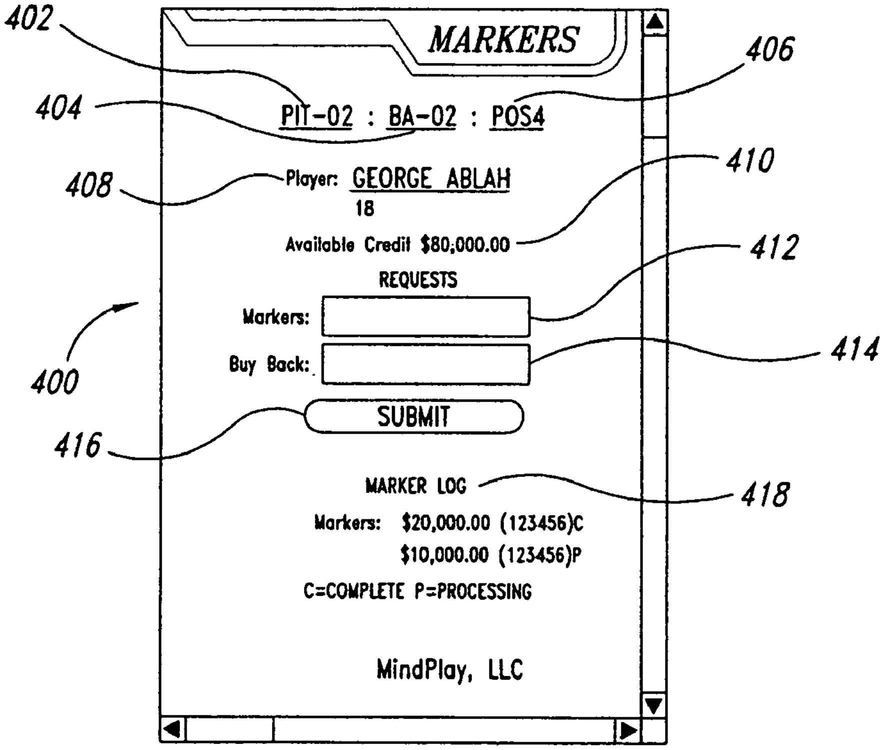
FIG. 16 is a front plan view of the wireless communications device of FIG. 1, showing a portion of a markers screen of a graphical user interface, according to one illustrated embodiment.

FIG. 16 shows a markers screen 400 of a graphical user interface as displayed by a wireless communications device 44, according to one illustrated embodiment. The markers screen 400 allows a user track markers offered or made by players and buy back of the same by players. The markers screen 400 may be displayed in response to selection of the markers icon 292 (FIG. 11B).

The markers screen 400 includes a pit identification field 402, a table identification field 404, and a player identification field 406 which display pit identifier, table identifier and player identifier, respectively, of a selected pit, table and player. The markers screen 400 also includes a player field 408 that identifies the player. The markers screen 400 further includes an available credit field 410 that displays an available credit amount for the identified player. A makers request field 412 and a buy back request field 414 allow the user to enter amounts indicative of a marker requested by the player or a buy back of a previous maker tendered by the player. The markers screen 400 includes a user-selectable submit icon 416 operable to submit the maker or buy back request to the remainder of the casino communications system 70. A marker log field 418 displays a list of outstanding markers for the player.

Figure 17:
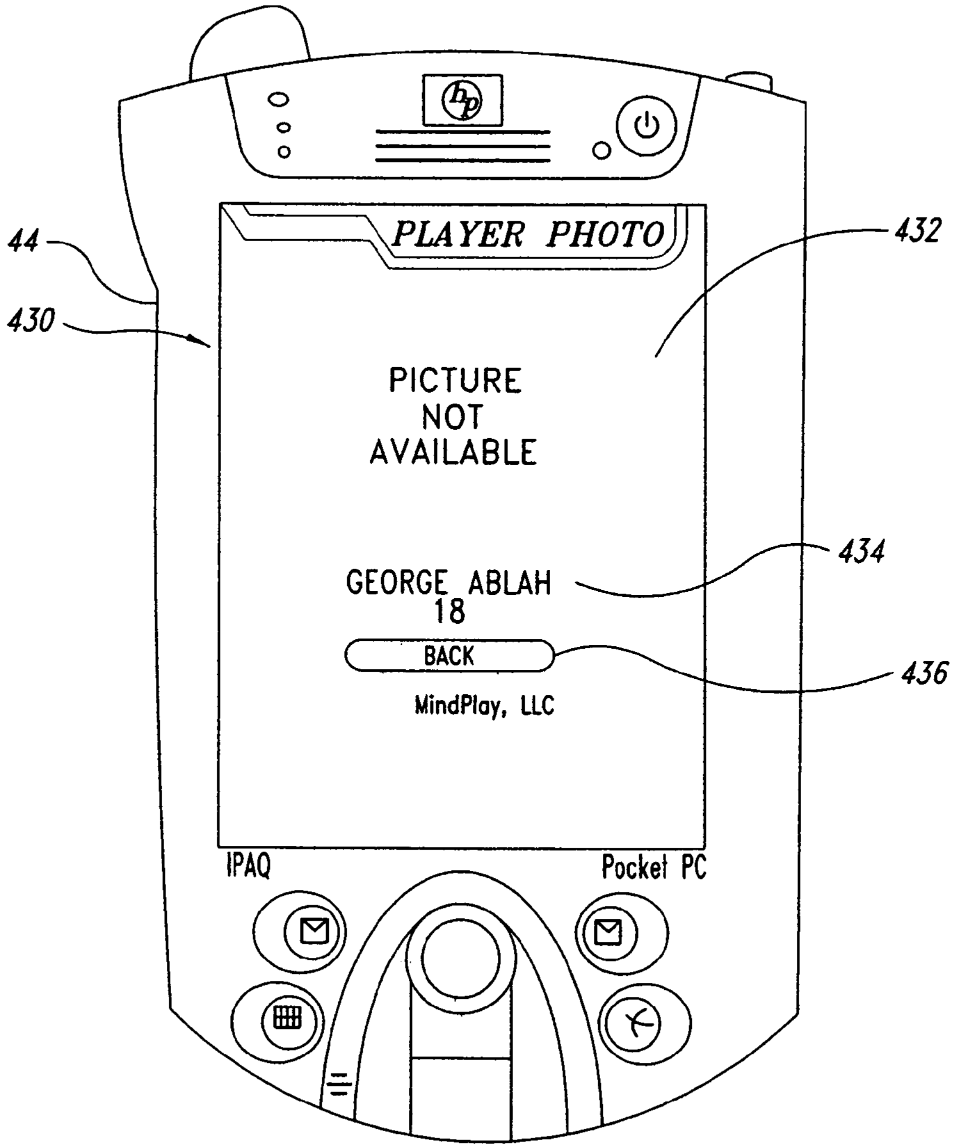
FIG. 17 is a front plan view of the wireless communications device of FIG. 1, showing a portion of a player's photo screen of a graphical user interface, according to one illustrated embodiment.

FIG. 17 shows a player's photo screen 430 of a graphical user interface as displayed by a wireless communications device 44, according to one illustrated embodiment. The player's photo screen 430 allows a user to see a photograph of a player, if any are on record and associable to the player based on entered player data (e.g., player first and/or last name, etc.).

The player's photo screen 430 include a photo field 432 in which the photograph is displayed in response to selection of the markers icon 292 (FIG. 11B). The player's photo screen 430 may also include a player name field 434 where the player's name is displayed, if known. A user-selectable back icon 436 allows the user to move back to the previous screen.

Figure 18A:
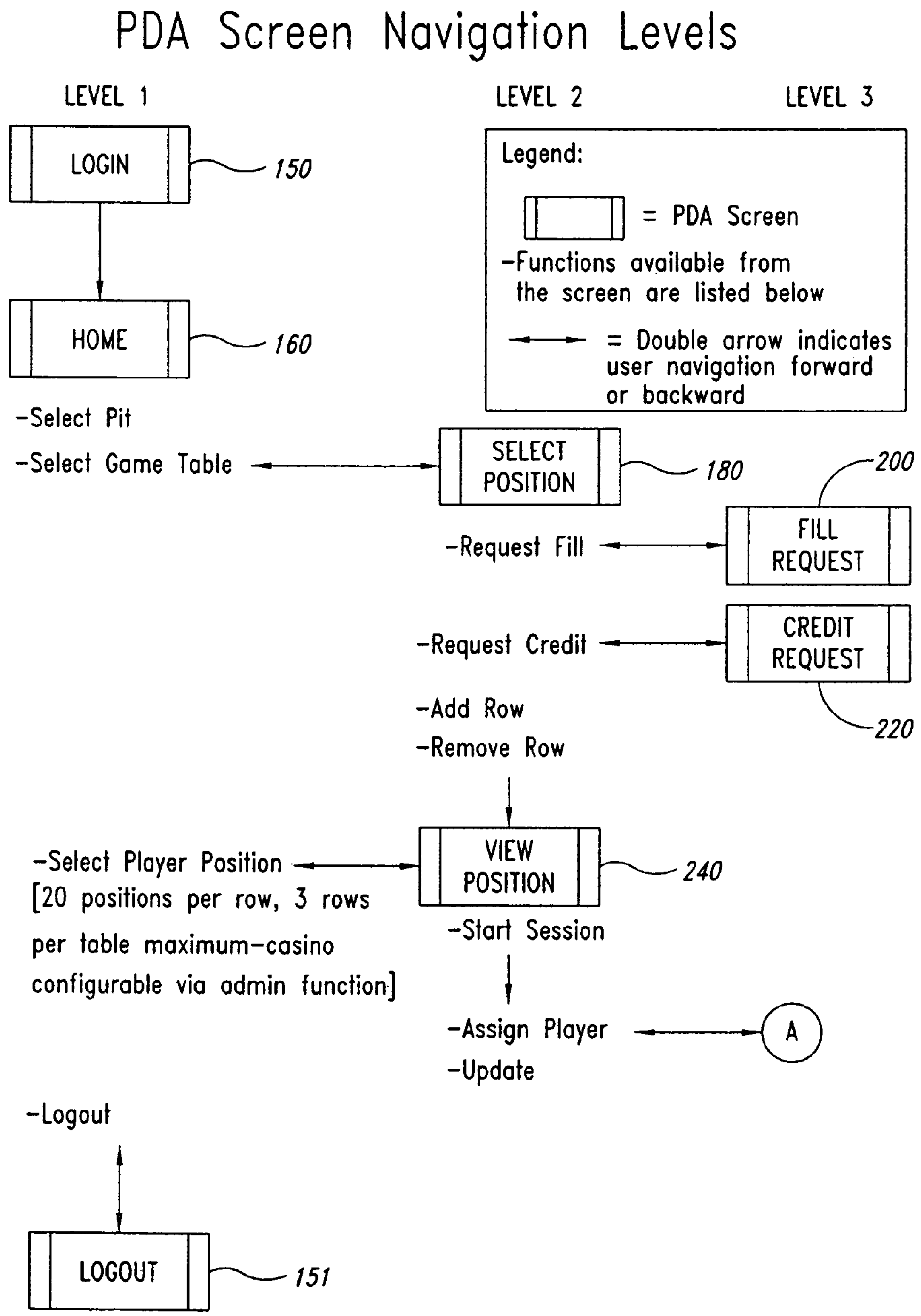
FIGS. 18A-18B are a flow diagram of a method of operating a user interface of a wireless communications device, according to one illustrated embodiment.
Figure 18B:
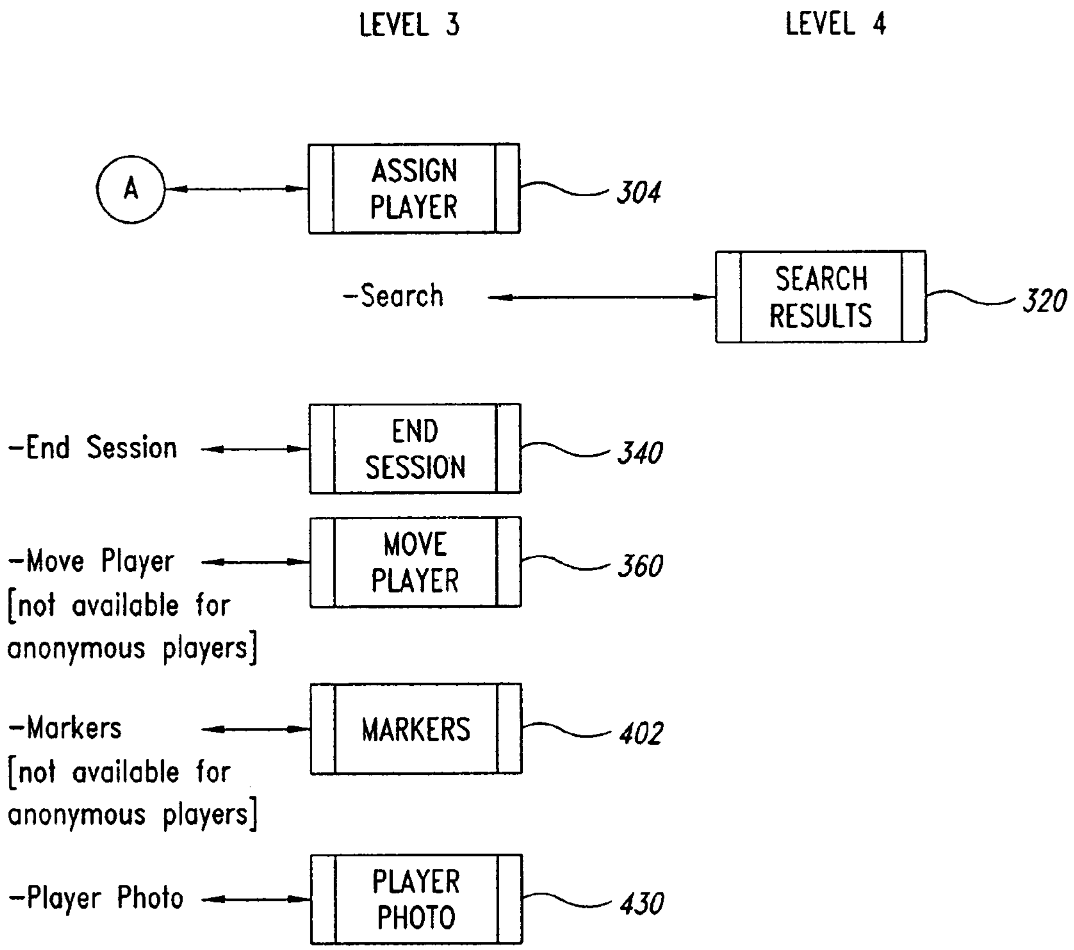

FIG. 18 shows a method of operating a user interface of wireless communications device 44, according to one illustrated embodiment, where screens navigation is performed between four distinct levels.

The user may start at the login screen 150, entering a user name and password to gain access to the wireless communications device 44. Upon successfully logging on, the wireless communications device 44 displays home screen 160, allowing the user to select a pit and/or gaming table. In response to the selection of the pit and/or gaming table, the wireless communications device 44 displays the position selection screen 180, allowing the user to select various actions or functions.

For example, if the user selects request fill icon 192 (FIG. 8), the wireless communications device 44 displays the fill request screen 200. If the user selects the request credit icon 194 (FIG. 8), the wireless communications device 44 displays the credit request screen 220. If the user selects the add row icon 190 (FIG. 8), the wireless communications device 44 displays the view position screen 240, allowing the user to select various actions or functions.

For example, if the user wishes to assign a player, the wireless communications device 44 displays the assign player screen 304 where the user may enter identifying information for a player. If the user then selects the search icon 318 (FIG. 12), then the wireless communications device 44 displays the search results screen 320 (FIG. 13) with results of a search performed using the entered identifying information. This may allow the user to uniquely identify a player based on limited information.

If the user selects the end session icon 286 (FIG. 11B), the wireless communications device 44 displays the end session screen 340 (FIG. 14), where the user can enter the actual or estimated walk amount.

If the user selects move player icon 290 (FIG. 11B), the wireless communications device 44 displays the move player screen 360 (FIG. 15), where the user can enter the actual or estimated walk amount.

If the user selects the markers icon 292 (FIG. 11B), the wireless communications device 44 displays the markers screen 402 (FIG. 16), where the user may enter a marker request amount or buy back amount. This may facilitate the issuing and buy back of markers.

If the user selects to view a photograph of the player, the wireless communications device 44 displays the player photo screen 430 (FIG. 17), with the photograph or picture, if any are available.

If the user selects the logout icon 170 (FIG. 7B) from the home screen 160, the wireless communications device 44 displays a logout screen 151, which in some embodiments may be the same as, or similar to the login screen 150 (FIG. 6).

Wagering

Players may choose to locally wager by physically occupying a player position or physically placing a wager at a gaming table or at a piece of gaming equipment such as a slot machine, video slot machine or video poker machine. Alternatively, a player may chose to remotely wager without physically occupying a player position or physically placing a wager at a gaming table or at a piece of gaming equipment, using a wireless communications device 44. Wagering via a wireless communications device 44 may be particularly advantageous during times of high demand when the casino is busy or crowded, or when it is otherwise difficult to find an available player position at a gaming table or piece of gaming equipment. Alternatively, wagering via a wireless communications device 44 may advantageously allow players to wager in a more discreet fashion, and/or in a player preferred setting, for example a hotel room, lounge, restaurant, or theater.

When remotely wagering via the wireless communications device 44, the player may be physically present at or proximate the gaming table or piece of gaming equipment, and may even be able to observe the play on the gaming table or piece of gaming equipment. However, the player will not occupy a player position or have a wager physically placed at the gaming table (e.g., seat or bet circle) or piece of gaming equipment. Alternatively, the remotely wagering player may be physically distant from the gaming table or piece of gaming equipment, and unable to directly observe the play on the gaming table or piece of gaming equipment. As described in detail below, in such a situation the wireless communications device 44 may provide the player with a display and audio of the play at the gaming table, either as a video and audio feed of the actual play or as a simulation thereof. This allows the player to enjoy the experience of the sights and sounds of the game without the inconvenience of being physically present at the gaming table or piece of gaming equipment.

As used herein and in the claims, the terms "local wager," "local wagering," "locally wagering" or similar terms mean that the player is physically occupying a player position or has physically placed a wager at the gaming table or gaming machine. As used herein and in the claims, the terms "remote wager," "remote wagering," "remotely wagering" or similar terms mean that the player is not physically occupying a player position and has not physically placed a wager at the gaming table or gaming machine, even if the player is proximate the gaming table or gaming machine.

The player may choose to remotely wager directly, placing wagers directly on the outcome of the game using the wireless communications device 44. Alternatively, or additionally, the player may choose to remotely wager indirectly using the wireless communications device 44. For example, the player may place a "backline" wager on an outcome of play by another player who may occupy a position at the gaming table or piece of gaming equipment. A form of backline wagering is discussed in U.S. Pat. No. 6,991,544 issued Jan. 31, 2006. In such situations, the player directly playing the game may be denominated as the primary player and the player indirectly playing may be denominated as the secondary player. Such a situation may accommodate further orders of players, for example tertiary players.

Some games do not require or employ intermediary decisions after placing the wager (e.g., no decision on whether to take additional playing cards, increasing, decreasing, adding or removing wagers). Such games may, for example, include baccarat, roulette, wheel of fortune, craps, bingo, and/or keno. Other games typically include intermediary decisions by a player after placing the wager (e.g., whether to take additional playing cards, increasing, decreasing, adding or removing wagers). Such games may, for example, include blackjack, poker, and/or LET IT RIDE®.

Pieces of gaming equipment are typically configured to be played by individual players. Thus, the pieces of gaming equipment are typically "on demand" systems in that they are responsive to a single player, and the player may enter or exit play at any time, for example by placing a currency or a gaming chip in the gaming machine. In contrast, gaming tables are typically set up to handle multiple players at a time and typically have seven or more player positions and/or betting circles. Thus, anywhere from one to seven or more players may be playing a given gaming table. Players typically may enter or exit play at a gaming table only at completion of a game or round of a game.

In order to prevent players from obtaining an advantage over the casino and/or each other, it is important to exercise control over the timing of wager placement and/or removal of wagers. The dealer or other personnel typically perform this function, limiting the placement or removal of wagers to acceptable times or events. For example, in roulette a croupier may pass their hand over the table and announce no more bets while the wheel is spinning. Also for example, a stickman in craps may hold the dice until all wagers are placed, or a dealer in blackjack will wait until the wagers are placed before dealing the playing cards.

Controlling the timing of wager placement in remote wagering is a significant problem. The casino communications system should ensure that wagers are only placed at specified times or instances during the gaming. For example, the casino communications system may only allow wagers to be placed via the wireless communications devices 44 before playing cards are dealt, or 10 before a roulette wheel or wheel of fortune is spun. For some games, the casino communications system may allow wagers to be placed during the game, either at specific periods or in response to the occurrence of defined events. Thus, for example, the casino communications system may allow a split hand wager, an insurance wager or a double down wager to be placed after the initial playing cards have been dealt if the player is initially dealt a pair, if the dealer shows an Ace, or if the total for the player's initial two cards is ten or eleven, respectively. Alternatively, the casino communications system may allow wagers to be removed after each playing card is turned over, for example in the game known as LET IT RIDE®.

At set out herein, the particular approach used to control the timing of wagering will depend on a variety of factors, such as: 1) whether the remote wagering is in the gaming table environment or the gaming machine environment; 2) whether the game is intended for play by an individual player (e.g., on demand) or by multiple players; 3) whether the remote wagering is direct or indirect (i.e., backline); and/or 4) whether the game includes intermediary decisions (e.g., hitting, additional wagers, and/or removal of wagers during play) or not.

Figure 19:
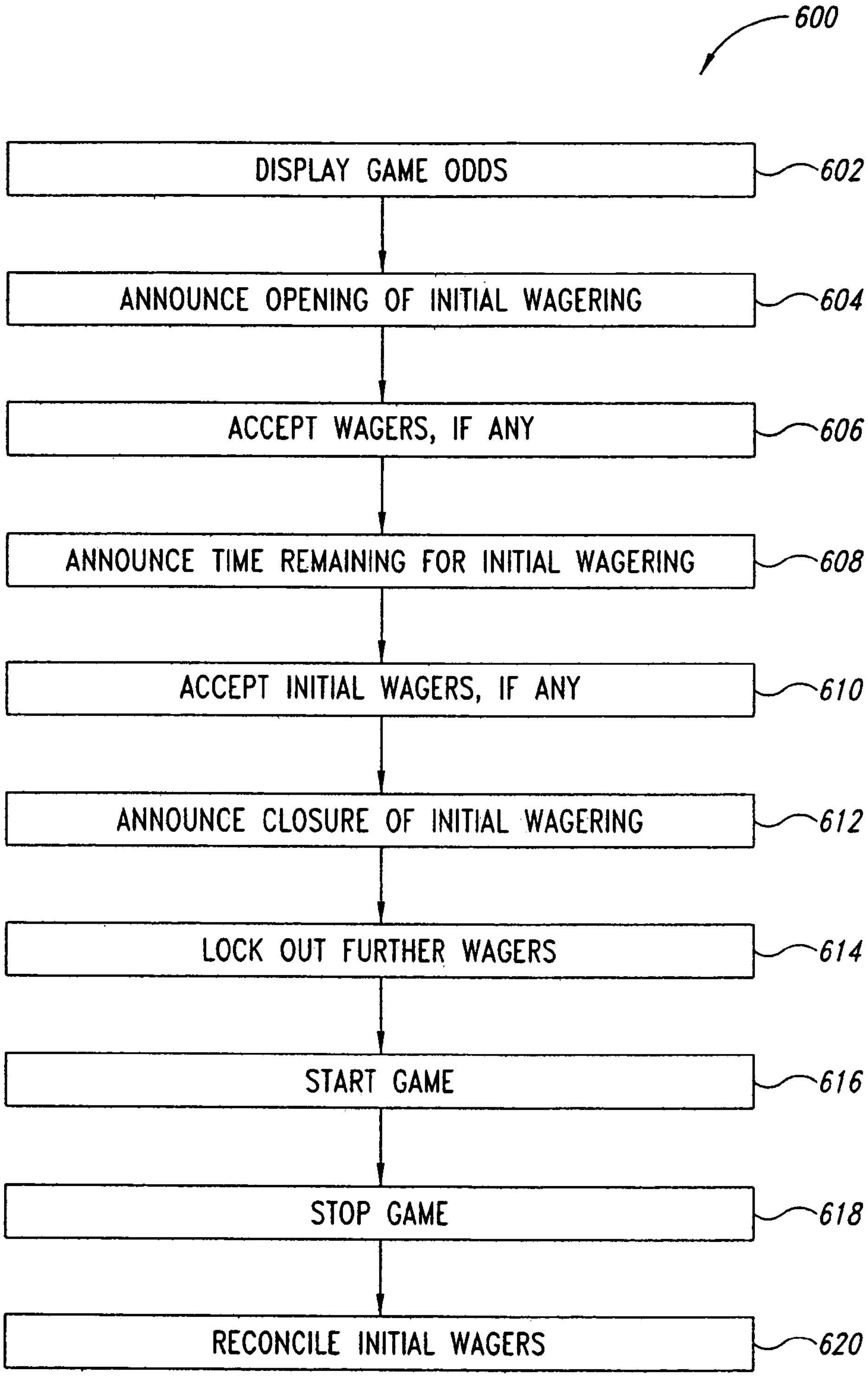
FIG. 19 is a flow diagram of a method useful for controlling remote wagering directly on a game occurring at a gaming table, without intermediary decisions or actions by the player(s), according to one illustrated embodiment.

FIG. 19 shows a method 600, that is useful for controlling remote wagering directly on a game occurring, at a gaming table, without intermediary decisions or actions by the player(s).

Optionally at 602, the wireless communications device 44 and/or some other device provides the game odds, for example providing a visual and/or audio prompt to a player or potential player where the odds are fixed for certain types of games or for certain games and hence may be stored in the wireless communications device 44 or may be provided to the wireless communications device 44 from or by the casino server computing system(s) 42 via the casino communications system 70. Alternatively, or additionally, the odds may be game or gaming table specific, and hence would typically be provided to the wireless communications device 44 from or by the casino server computing system(s) 42 via the casino communications system 70.

At 604, the wireless communications device 44 and/or some other device announces the opening of initial wagering, for example providing a visual and/or audio prompt to a player or potential player. The announcement may be provided in response to a signal provided to the wireless communications device 44 from or by the casino server computing system(s) 42 via the casino communications system 70, which is generated when the particular gaming table is ready to accept initial wagers, typically between the end of one game or round and the start of a next game or round.

At 606, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 608, the wireless communications device 44 and/or some other device announces the time remaining for initial wagering, for example providing a visual and/or audio prompt to a player or potential player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which initial wagers are accepted.

At 610, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 612, the wireless communications device 44 and/or some other device announces the closure of initial wagering, for example providing a visual and/or audio prompt to a player or potential player, and locks out further wagers at 614. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 616, the game starts. For example, the game may start with the dealing of cards, rolling of dice, spinning of a wheel, or drawing of a number. At 618, the game stops. For example, the game may stop when hands of playing cards are resolved against each other or against a standard, when a dice comes to a stop, a wheel stops spinning or a set of numbers have been drawn. At 620, the initial wagers are reconciled based on the outcome of the game event(s), the wagers placed, and the odds. In some embodiments reconciliation may take place on the wireless communications device 44, advantageously reducing the computational burden on the casino server computing system(s) 42. In some embodiments reconciliation may take place on the casino server computing system(s) 42, advantageously providing enhanced security.

Figure 20A:
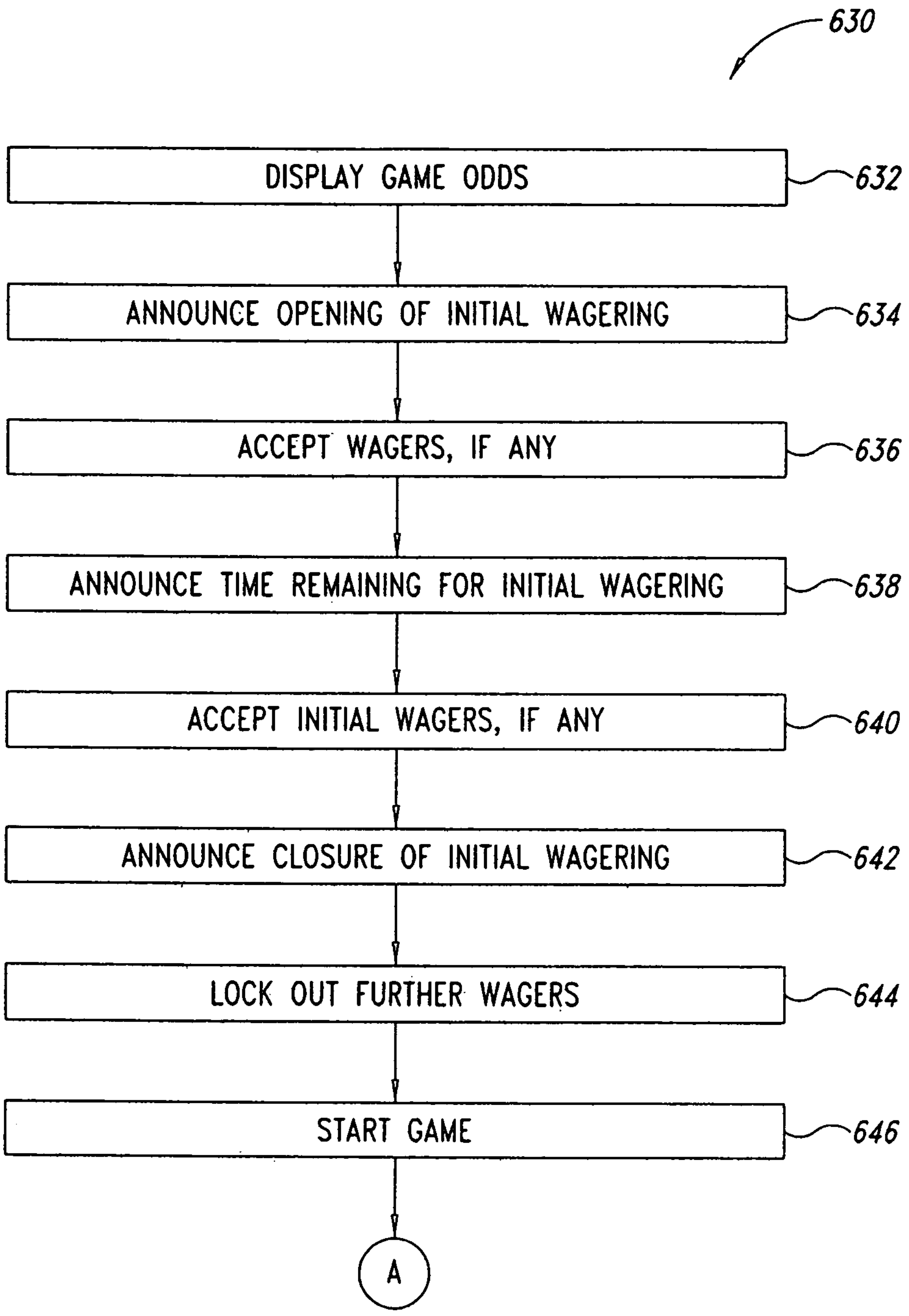
FIGS. 20A-20B are a flow diagram of a method useful for controlling remote wagering directly on a game occurring at a gaming table, with intermediary decisions or actions by the player(s), according to one illustrated embodiment.
Figure 20B:
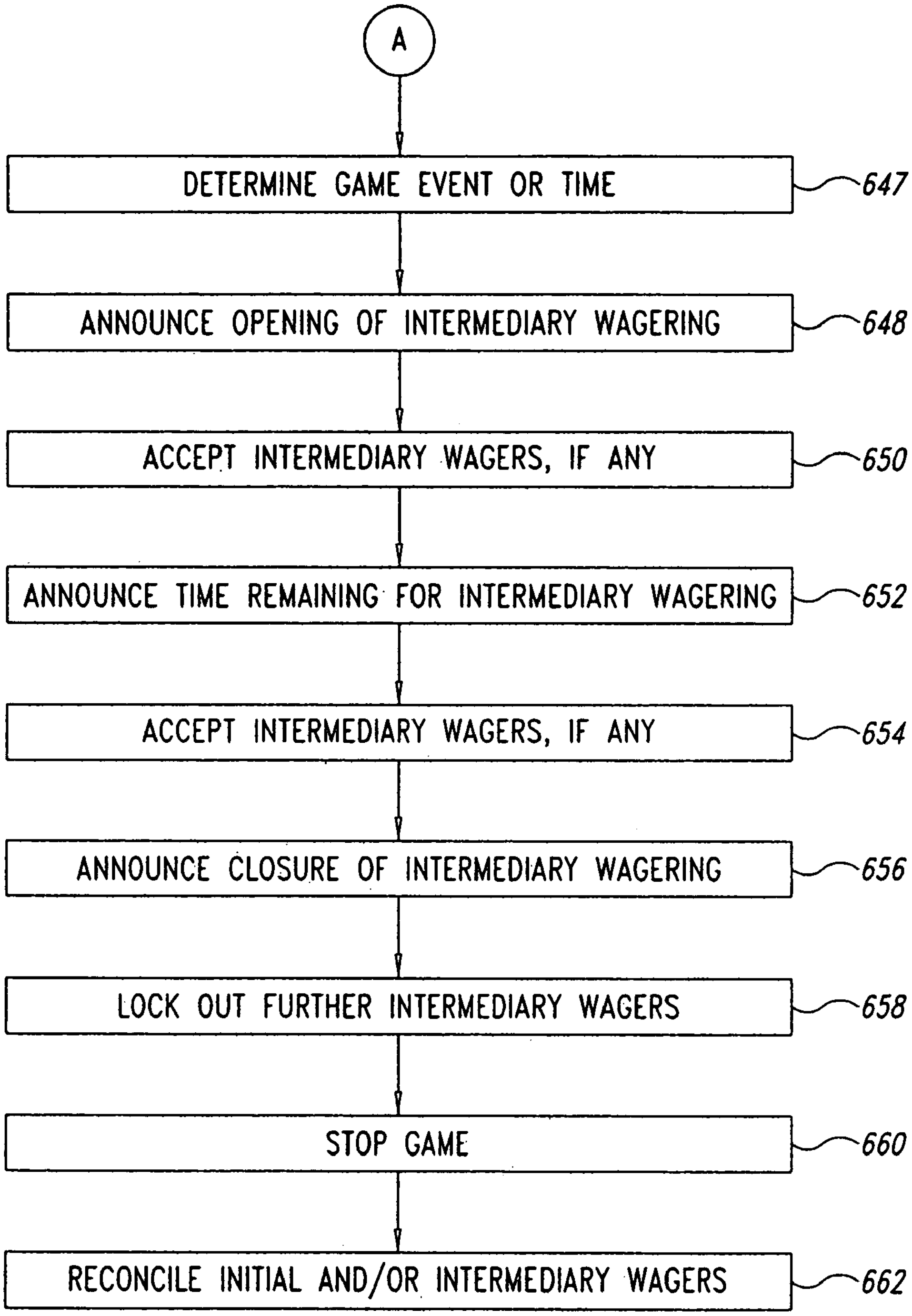

FIGS. 20A-20B show a method 630 that is useful for controlling remote wagering directly on a game occurring a gaming table, with intermediary decisions or actions by the player(s).

Optionally at 632, the wireless communications device 44 and/or some other device provides the game odds, for example providing a visual and/or audio prompt to a player or potential player where the odds are fixed for certain types of games or for certain games and hence may be stored in the wireless communications device 44 or may be provided to the wireless communications device 44 from or by the casino server computing system(s) 42 via the casino communications system 70. Alternatively, or additionally, the odds may be game or gaming table specific, and hence would typically be provided to the wireless communications device 44 from or by the casino server computing system(s) 42 via the casino communications system 70.

At 634, the wireless communications device 44 and/or some other device announces the opening of initial wagering, for example providing a visual and/or audio prompt to a player or potential player. The announcement may be provided in response to a signal provided to the wireless communications device 44 from or by the casino server computing system(s) 42 via the casino communications system 70, which is generated when the particular gaming table is ready to accept initial wagers, typically between the end of one game or round and the start of a next game or round.

At 636, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 638, the wireless communications device 44 and/or some other device announces the time remaining for initial wagering, for example providing a visual and/or audio prompt to a player or potential player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which initial wagers are accepted.

At 640, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 642, the wireless communications device 44 and/or some other device announces the closure of initial wagering, for example providing a visual and/or audio prompt to a player or potential player, and at 644 further wagers are locked out. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 646, the game starts. For example, the game may start with the dealing of cards, rolling of dice, spinning of a wheel, or drawing of a number.

At 647, the occurrence of a game event or a time is determined. For example, a game event may be the dealing of a first playing card, last playing card or other playing card, the spin of a wheel, a spinning wheel coming to a stop, roll of dice, an action by a player, dealer, other participant, or other casino personnel. The determination may be performed using sensors at the gaming table, or based on information from such sensors. Also for example, time may be a period based on a time of day, week or year or on a period after or before the occurrence of an action or event occurring at the gaming table or elsewhere.

At 648, the wireless communications device 44 and/or some other device announces the opening of intermediary wagering, for example providing a visual and/or audio prompt to a player or potential player. The announcement may be provided in response to a signal provided to the wireless communications device 44 from or by the casino server computing system(s) 42 via the casino communications system 70, which is generated when the particular gaming table is ready to accept intermediary wagers, typically between the end of one game or round and the start of a next game or round.

At 650, intermediary wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 652, the wireless communications device 44 and/or some other device announces the time remaining for intermediary wagering, for example providing a visual and/or audio prompt to a player or potential player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which intermediary wagers are accepted.

At 654, intermediary wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 656, the wireless communications device 44 and/or some other device announces the closure of intermediary wagering, for example providing a visual and/or audio prompt to a player or potential player, and locks out further wagers at 658. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 660, the game stops. For example, the game may stop when hands of playing cards are resolved against each other or against a standard, when a dice comes to a stop, a wheel stops spinning or a set of numbers have been drawn. At 662, the initial wagers are reconciled based on the outcome of the game event(s), the wagers placed, and the odds. In some embodiments reconciliation may take place on the wireless communications device 44, advantageously reducing the computational burden on the casino server computing system(s) 42. In some embodiments reconciliation may take place on the casino server computing system(s) 42, advantageously providing enhanced security.

Figure 21:
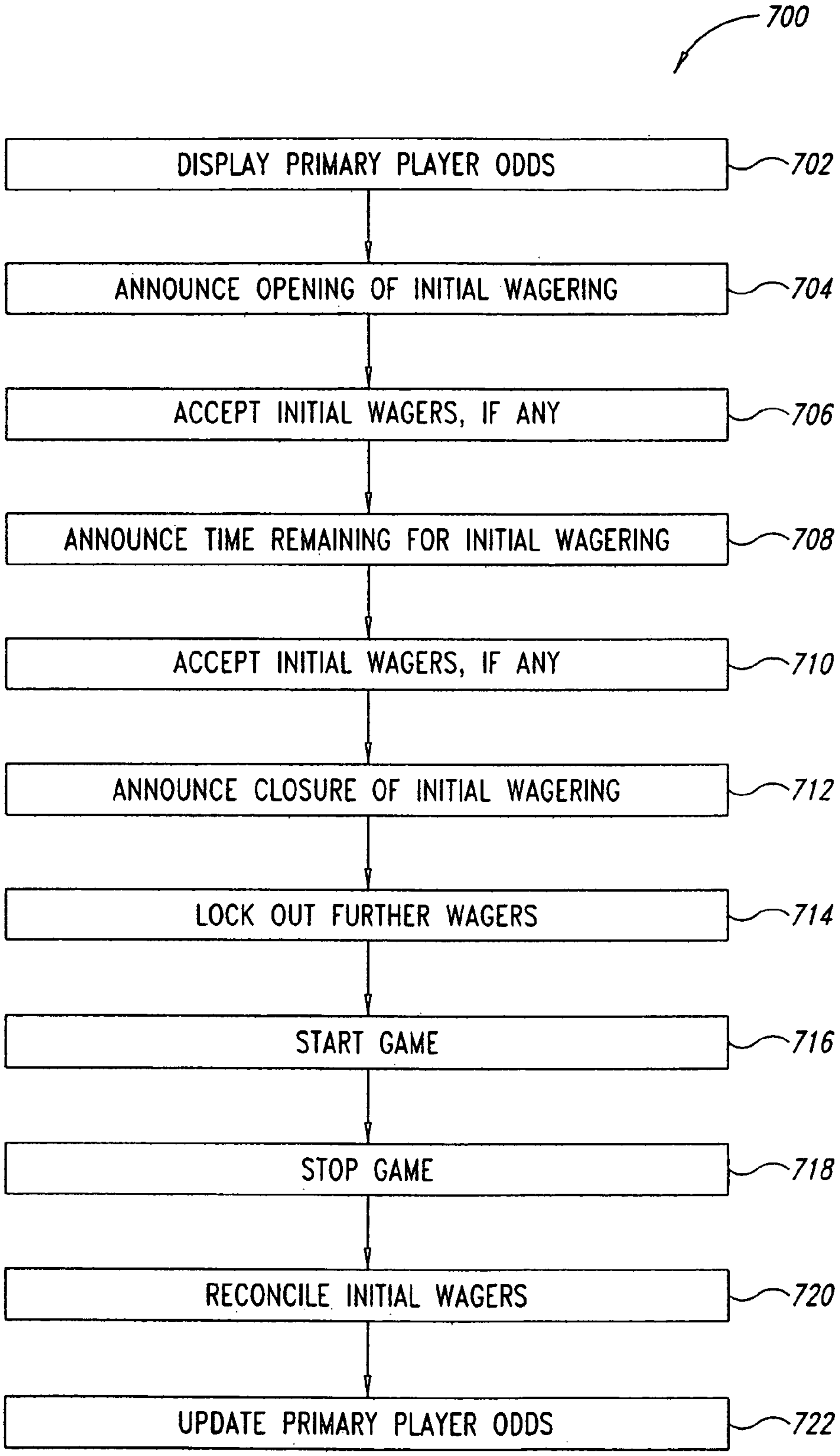
FIG. 21 is a flow diagram of a method useful for controlling remote wagering indirectly on a game occurring at a table game or on a gaming machine by a secondary player, without intermediary actions or decisions by the secondary players, according to one illustrated embodiment.

FIG. 21 shows a method 700 that is useful for controlling remote wagering indirectly on a game occurring at a table game or on a gaming machine by a secondary player, without intermediary actions or decisions by the secondary players.

Optionally at 702, the wireless communications device 44 and/or some other device provides the primary player odds, for example providing a visual and/or audio prompt to a secondary player or potential secondary player. The primary player odds will typically vary over time, thus the primary player odds may be provided to the wireless communications device 44 from or by the casino server computing system(s) 42 via the casino communications system 70.

At 704, the wireless communications device 44 and/or some other device announces the opening of initial wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated when the particular gaming table is ready to accept initial wagers by the secondary player(s), typically between the end of one game or round and the start of a next game or round.

At 706, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 708, the wireless communications device 44 and/or some other device announces the time remaining for initial wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which initial wagers are accepted.

At 710, initial wagers from the secondary player(s), if any, are accepted. As discussed in more detail below, in one embodiment the wagers are accepted at the wireless communications device, while in another embodiment the wagers are accepted at the casino server computing system(s) 42 that is part of the casino communications system 70.

At 712, the wireless communications device 44 and/or some other device announces the closure of initial wagering, for example providing a visual and/or audio prompt to a secondary player or potential secondary player, and locks out further wagers at 714. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 716, the game starts. For example, the game may start with the dealing of cards, rolling of dice, spinning of a wheel, or drawing of a number. At 718, the game stops. For example, the game may stop when hands of playing cards are resolved against each other or against a standard, when a dice comes to a stop, a wheel stops spinning or a set of numbers have been drawn. At 720, the initial primary and secondary wagers are reconciled based at least in part on the outcome of the game event(s), the primary and secondary wagers placed, and the primary odds (i.e., game odds) and secondary odds (i.e., odds for particular primary player). In some embodiments reconciliation may take place on the wireless communications device 44, advantageously reducing the computational burden on the casino server computing system(s) 42. In some embodiments reconciliation may take place on the casino server computing system(s) 42, advantageously providing enhanced security.

At 722, the casino server computer updates the primary player odds based at least in part on the outcome of the game.

Figure 22A:
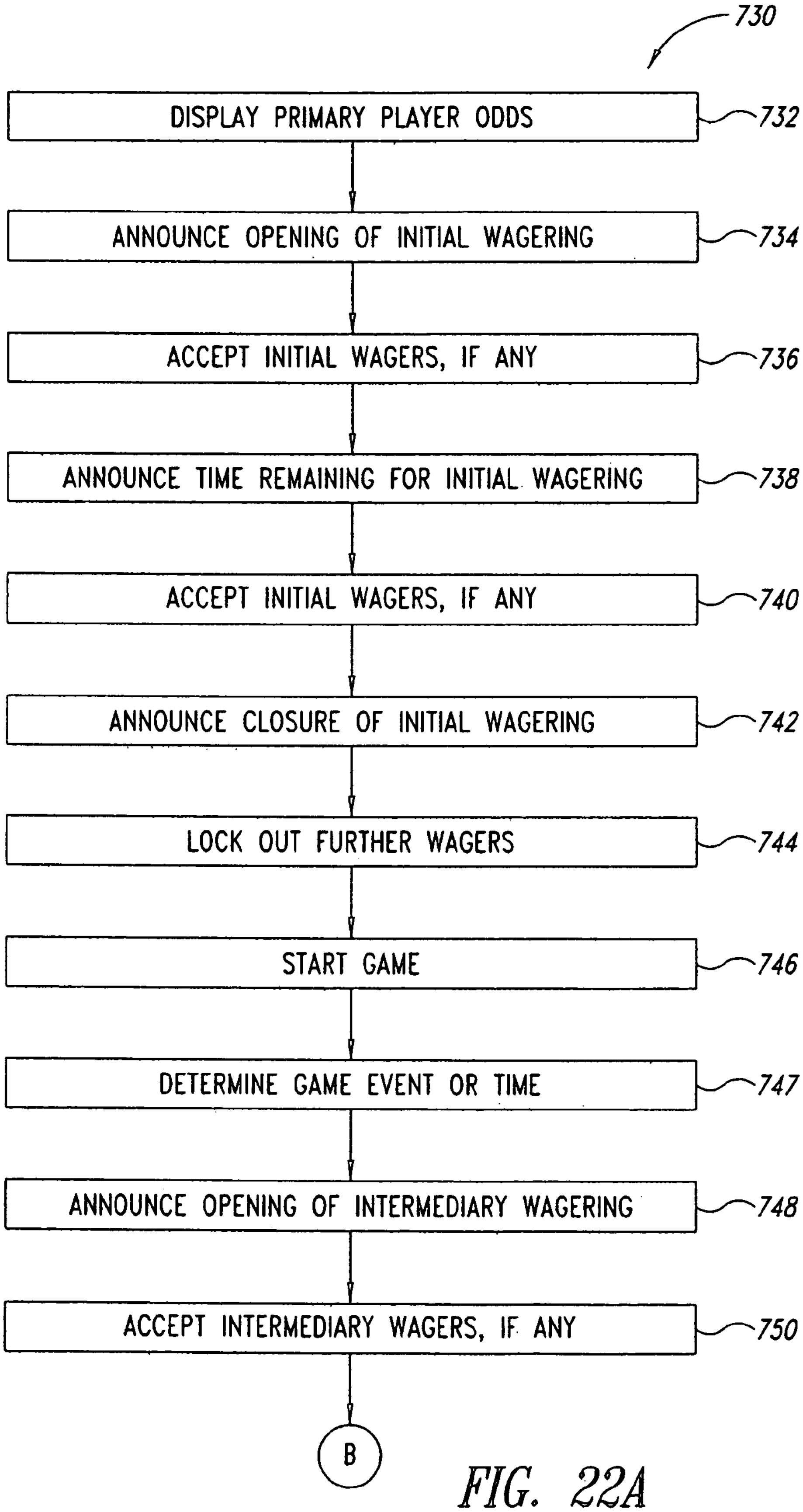
FIGS. 22A-22B are a flow diagram of a method useful for controlling remote wagering indirectly on a game occurring at a table game or on a gaming machine with intermediary actions of decisions by the primary player(s), according to one illustrated embodiment.
Figure 22B:
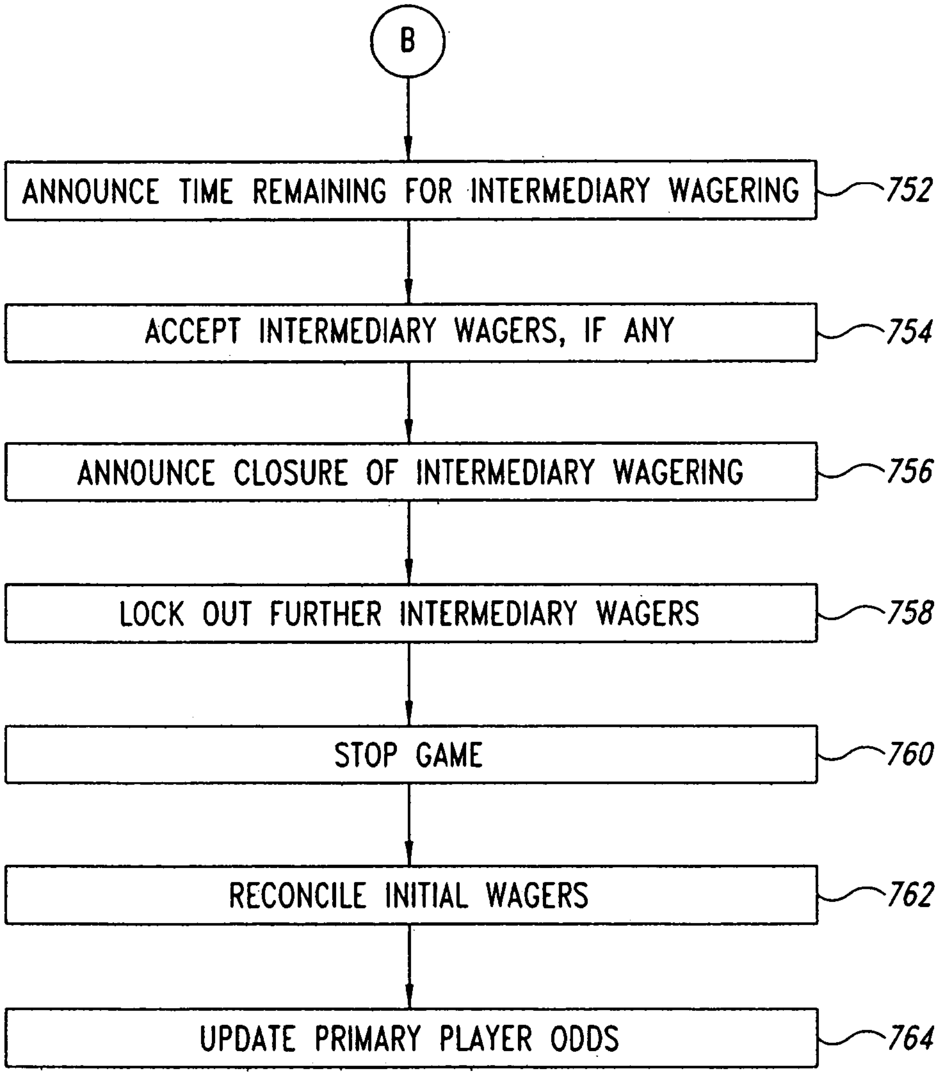

FIGS. 22A-22B show a method 730 that is useful for controlling remote wagering indirectly on a game occurring at a table game or on a gaming machine with intermediary actions of decisions by the primary player(s).

Optionally at 732, the wireless communications device 44 and/or some other device provides the primary player odds, for example providing a visual and/or audio prompt to a secondary player or potential secondary player. The primary-player odds will typically vary over time, thus the primary player odds may be provided to the wireless communications device 44 from or by the casino server computing system(s) 42 via the casino communications system 70.

At 734, the wireless communications device 44 and/or some other device announces the opening of initial wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated when the particular gaming table is ready to accept initial wagers, typically between the end of one game or round and the start of a next game or round.

At 736, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 738, the wireless communications device 44 and/or some other device announces the time remaining for initial wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which initial secondary wagers are accepted.

At 740, initial wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 742, the wireless communications device 44 and/or some other device announces the closure of initial wagering, for example providing a visual and/or audio prompt to a secondary player or potential secondary player, and at 744 further wagers are locked out. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 746, the game starts. For example, the game may start with the dealing of cards, rolling of dice, spinning of a wheel, or drawing of a number.

At 747, the occurrence of a game event or a time is determined. For example, a game event may be the dealing of a first playing card, last playing card or other playing card, the spin of a wheel, a spinning wheel coming to a stop, a roll of dice, an action by a player, dealer, other participant, or other casino personnel. The determination may be performed using sensors at the gaming table, or based on information from such sensors. Also for example, time may be a period based on a time of day, week or year or on a period after or before the occurrence of an action or event occurring at the gaming table or elsewhere.

At 748, the wireless communications device 44 and/or some other device announces the opening of intermediary wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated when the particular gaming table is ready to accept intermediary wagers, typically between the end of one game or round and the start of a next game or round.

At 750, intermediary wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 752, the wireless communications device 44 and/or some other device announces the time remaining for intermediary wagering, for example providing a visual and/or audio prompt to a secondary player or potential secondary player. The announcement may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device. The announcement may be repeated from time to time, updating the amount of time remaining. Alternatively or additionally, a countdown of the remaining time may be visually and/or aurally provided for all or some portion of the period during which intermediary wagers are accepted.

At 754, intermediary wagers, if any, are accepted. As discussed in more detail below, in one embodiment the wagers are accepted at the wireless communications device, while in another embodiment the wagers are accepted at the casino server computing system(s) 42 that is part of the casino communications system 70.

At 756, the wireless communications device 44 and/or some other device announces the closure of intermediary wagering, for example providing a visual and/or audio prompt to a secondary player or potential secondary player, and locks out further wagers at 758. The announcement and/or lockout may be provided in response to a signal provided to the wireless communications device 44 from or by the casino server computing system(s) 42 via the casino communications system 70, which is generated by or in response to events on or a timer associated with the particular gaming table, or may be provided in response to a timer or other clock signal generated by the wireless communications device.

At 760, the game stops. For example, the game may stop when hands of playing cards are resolved against each other or against a standard, when a dice comes to a stop, a wheel stops spinning or a set of numbers have been drawn. At 762, the initial and intermediary primary and/or secondary wagers are reconciled based at least in part on the outcome of the game event(s), the primary and secondary wagers placed, and the primary odds (i.e., game odds) and secondary odds (i.e., odds for particular primary player). In some embodiments reconciliation may take place on the wireless communications device 44 advantageously reducing the computational burden on the casino server computing system(s) 42. In some embodiments reconciliation may take place on the casino server computing system(s) 42, advantageously providing enhanced security.

At 764, the casino server computer updates the primary player odds based at least in part on the outcome of the game.

As discussed in detail below, in one embodiment wagers may be accepted if entered into the wireless communications device 44 before initial and/or intermediary wagers are locked out. Also as discussed in detail below, in another embodiment wagers may be accepted if received by a casino server computing system before initial and/or intermediary wagers are locked out. Also, while not necessary, either embodiment may advantageously employ a packet transaction concept to ensure security and reliability. These embodiments are discussed immediately below.

Figure 23:
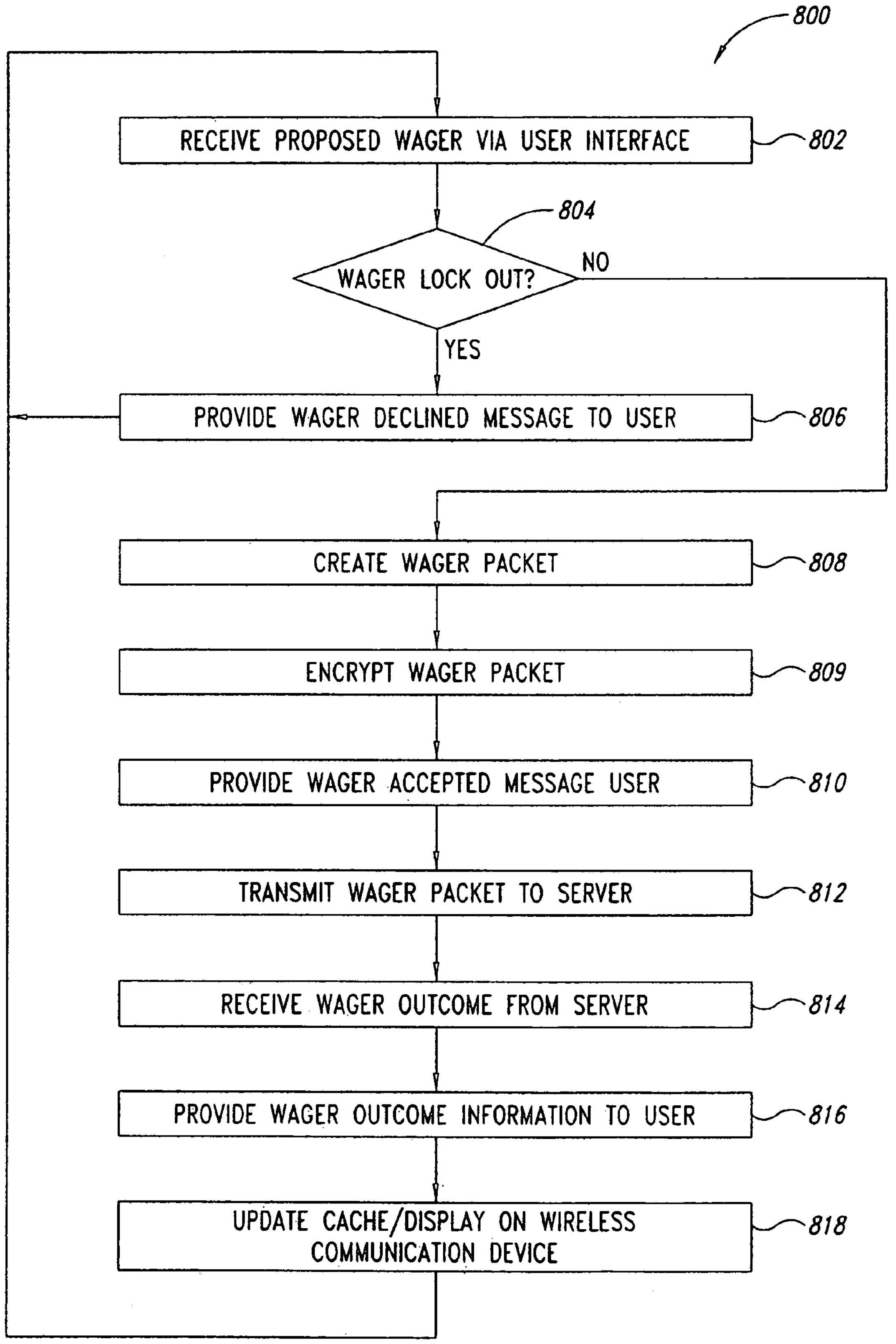
FIG. 23 is a flow diagram of a method in which wagers are accepted if entered into the wireless communications device before initial and/or intermediary wagers are locked out, according to one illustrated embodiment.

FIG. 23 shows a method 800 in which wagers are accepted if entered into the wireless communications device 44 before initial and/or intermediary wagers are locked out, according to one illustrated embodiment.

At 802, the wireless communications device 44 receives a proposed wager entered via a user interface (e.g., keys, joy or thumb stick, track pad, trackball, graphical icons or menus, voice recognition). At 804, the wireless communications device 44 determines whether the proposed wager is being made during a period when wagers are not locked out. If the proposed wager is occurring during a wager lockout period, at 806 the wireless communications device 44 provides an appropriate message to the user via the user interface, declining the proposed wager and/or suggesting placing a wager at a later time. Control then may return to 802, or the method 800 can terminate, relying on separate threads or instances of the method 800 to handle further proposed wagers.

If the proposed wager is occurring outside of a wager lockout period, at 808 the wireless communications device 44 creates a wager transaction packet. As discussed in more detail below, creation of the wager transaction packet may include the generation of error detection and/or error correction information. The wireless communications device 44 may employ any suitable known or later developed error detection and/or error correction algorithms.

Optionally, at 809, the wireless communications device 44 encrypts the wager transaction packet. The wireless communications device 44 may employ any suitable known or later developed encryption algorithm.

At 810, the wireless communications device provides a suitable wager accepted message (e.g., visual, aural, and/or tactile) to the user via the user interface. At 812, the wireless communications device 44 transmits a wager transaction packet to the casino server computing system 42. The wager transaction packet may be transmitted intact (i.e., all the information remains in a single packet), to help ensure that wager transactions are only completed if all required information is present in the packet, and to help ensure that an interruption on communications does not produce or provide an opportunity for a breach in security.

At 814, the wireless communications device 44 receives a wager outcome from the casino server computing system 42. In response, the wireless communications device 44 provides wager outcome information to the user via the user interface at 816. At 818, the wireless communications device 44 updates any cached information and/or display on the wireless communications device 44. The method 800 may then return to 802 to handle the next proposed wager. Alternatively, a separate thread or instance of the method 800 may be invoked for each proposed wager.

Figure 24:
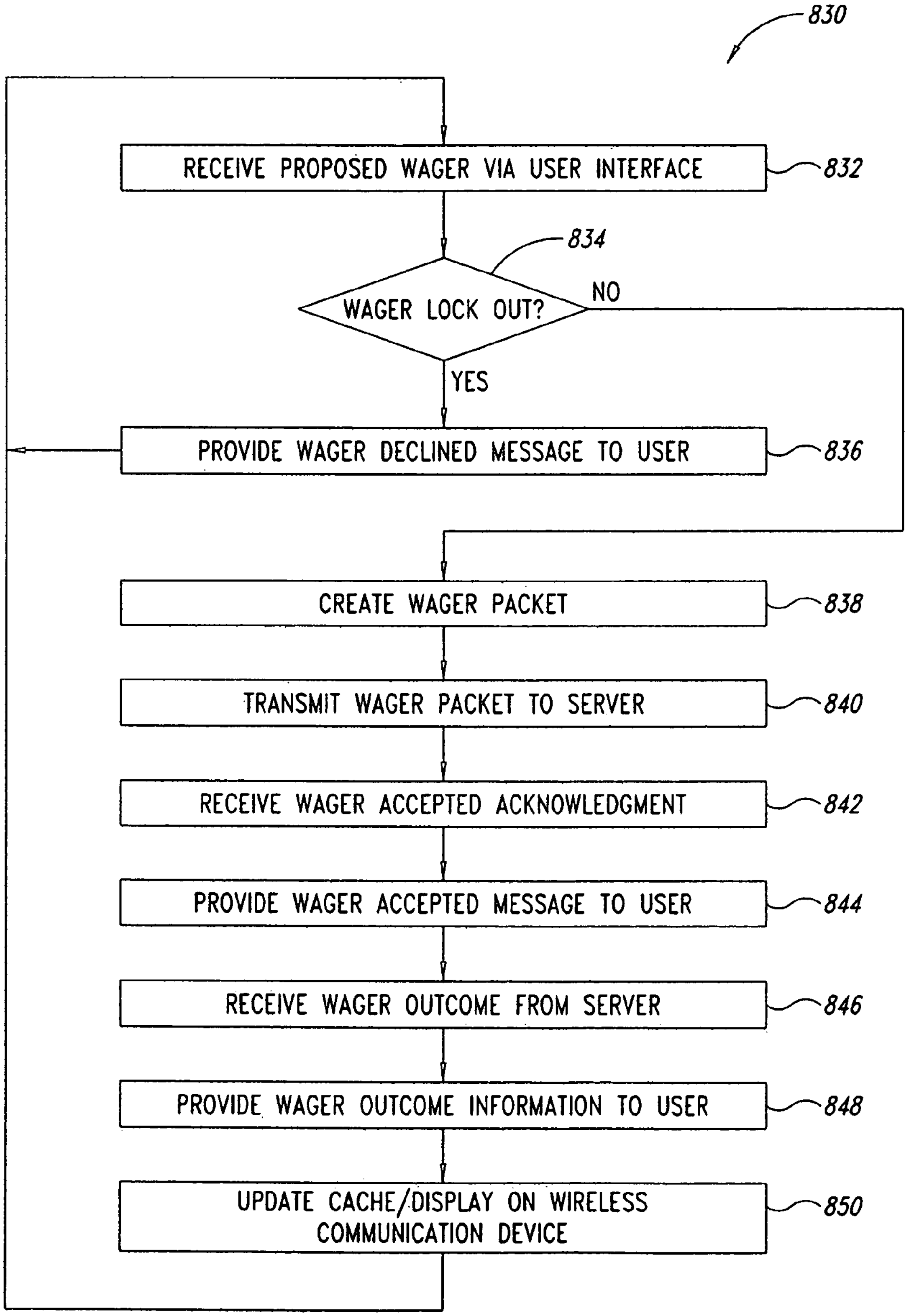
FIG. 24 is a flow diagram of a method in which wagers are accepted if received by a casino server computing system before initial and/or intermediary wagers are locked out, according to one illustrated embodiment.

FIG. 24 shows a method 830 in which wagers are accept if received by a casino server computing system 42 before initial and/or intermediary wagers are locked out, according to one illustrated embodiment.

At 832, the wireless communications device 44 receives a proposed wager entered via a user interface (e.g., keys, joy or thumb stick, track pad, trackball, graphical icons or menus, voice recognition). At 834, the wireless communications device 44 determines whether the proposed wager is being made during a period when wagers are not locked out. If the proposed wager is occurring during a wager lockout period, at 836 the wireless communications device 44 provides an appropriate message to the user via the user interface, declining the proposed wager and/or suggesting placing a wager at a later time. Control then may return to 832, or the method 830 can terminate, relying on separate threads or instances of the method 830 to handle further proposed wagers.

If the proposed wager is occurring outside of a wager lockout period, at 838 the wireless communications device 44 creates a wager transaction packet. At 840, the wireless communications device 44 transmits the wager transaction packet to the casino server computing system 42.

At 842, the wireless communications device 44 receives a wager accepted acknowledgement from the casino server computing system 42. At 844, the wireless communications device provides a suitable wager accepted message (e.g., visual, aural, and/or tactile) to the user via the user interface.

At 846, the wireless communications device 44 receives a wager outcome from the casino server computing system 42. In response, the wireless communications device 44 provides wager outcome information to the user via the user interface at 848. At 850, the wireless communications device 44 updates any cached information and/or display on the wireless communications device 44. The method 830 may then return to 832 to handle the next proposed wager. Alternatively, a separate thread or instance of the method 830 may be invoked for each proposed wager.

Figure 25:
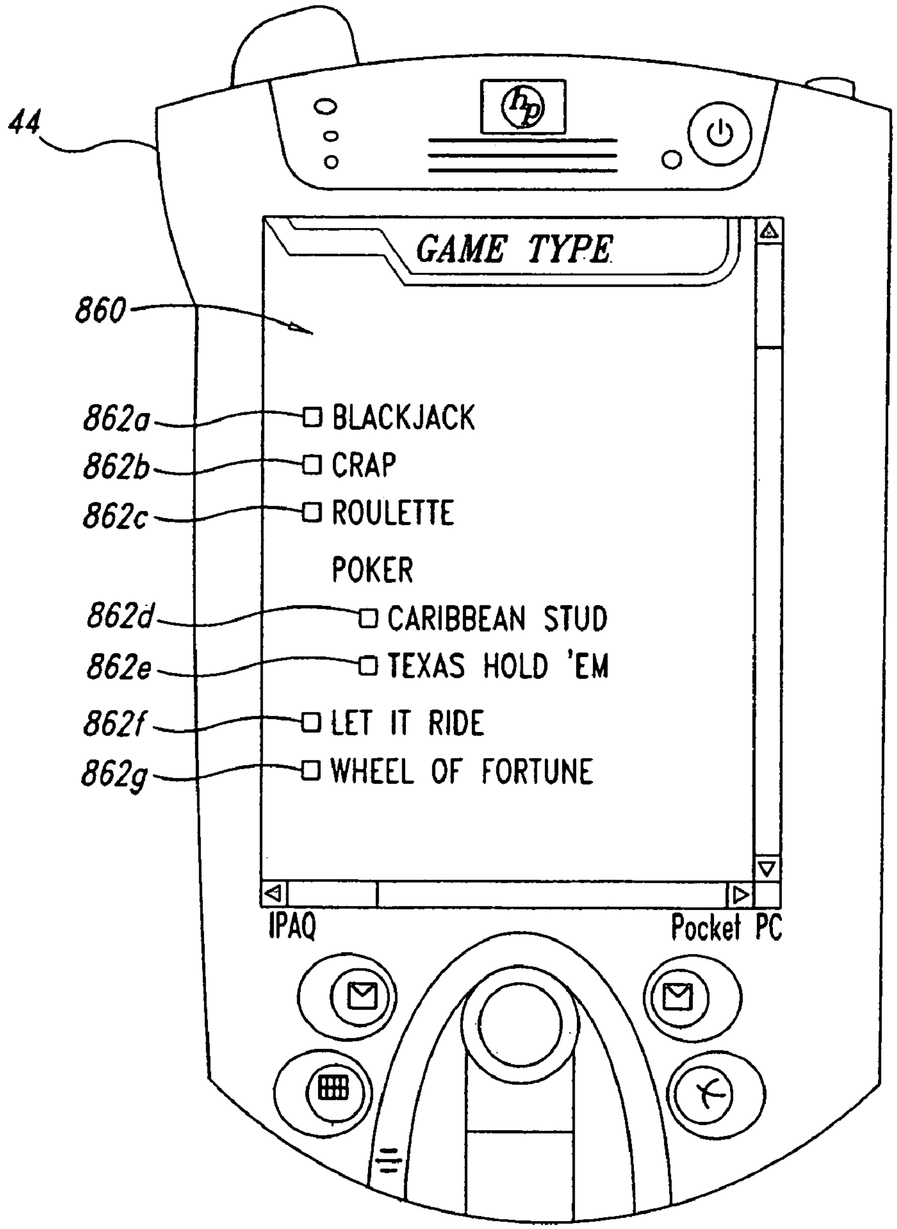
FIG. 25 is a front plan view of the wireless communications device of FIG. 1, showing a portion of a game type selection screen of a graphical user interface, according to one illustrated embodiment.

FIG. 25 shows a game type selection screen 860 of a graphical user interface as displayed by a wireless communications device 44, according to one illustrated embodiment. The game type selection screen 860 allows a user to select a type of game for placing wagers.

The game type selection screen 860 includes a set of user-selectable game type identification icons 862*a*-862*g* which identify different types of games offered by the casino. The user may select one of the game type identification icons 862*a*-862*g* to navigate to the next screen.

Figure 26:
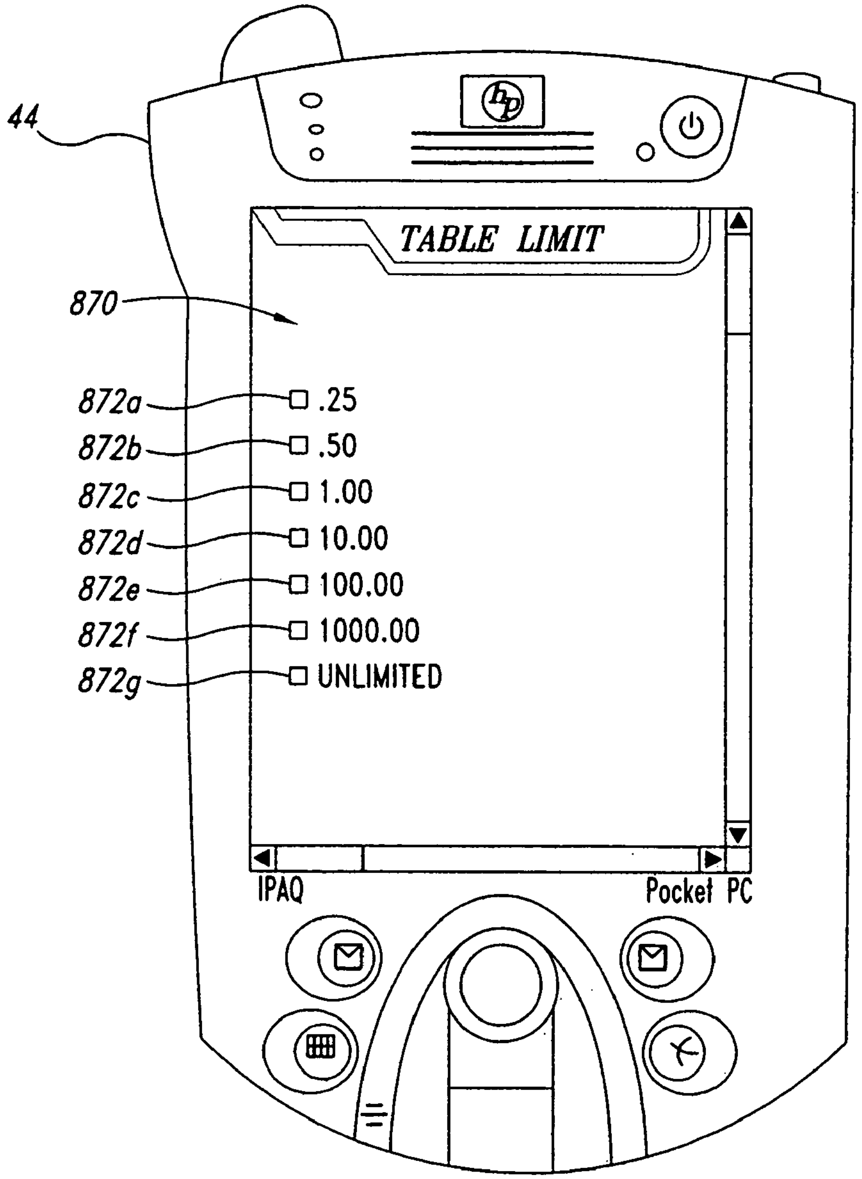
FIG. 26 is a front plan view of the wireless communications device of FIG. 1, showing a portion of a table limit screen of a graphical user interface, according to one illustrated embodiment.

FIG. 26 shows a table limit screen 870 of a graphical user interface as displayed by a wireless communications device 44, according to one illustrated embodiment. The table limit screen may be displayed in response to the selection of one of the game type identification icons 862*a*-862*g* (FIG. 25) if the selected game has associated table limits. The table limit screen 870 allows a user to select from gaming tables or machines having wagering limits with which the player is comfortable.

The table limit screen 870 includes a number of user-selectable table limit icons 872*a*-872*g*. The user may select one of the table limit icons 872*a*-872*g* to view available tables with the appropriate table limits.

Figure 27:
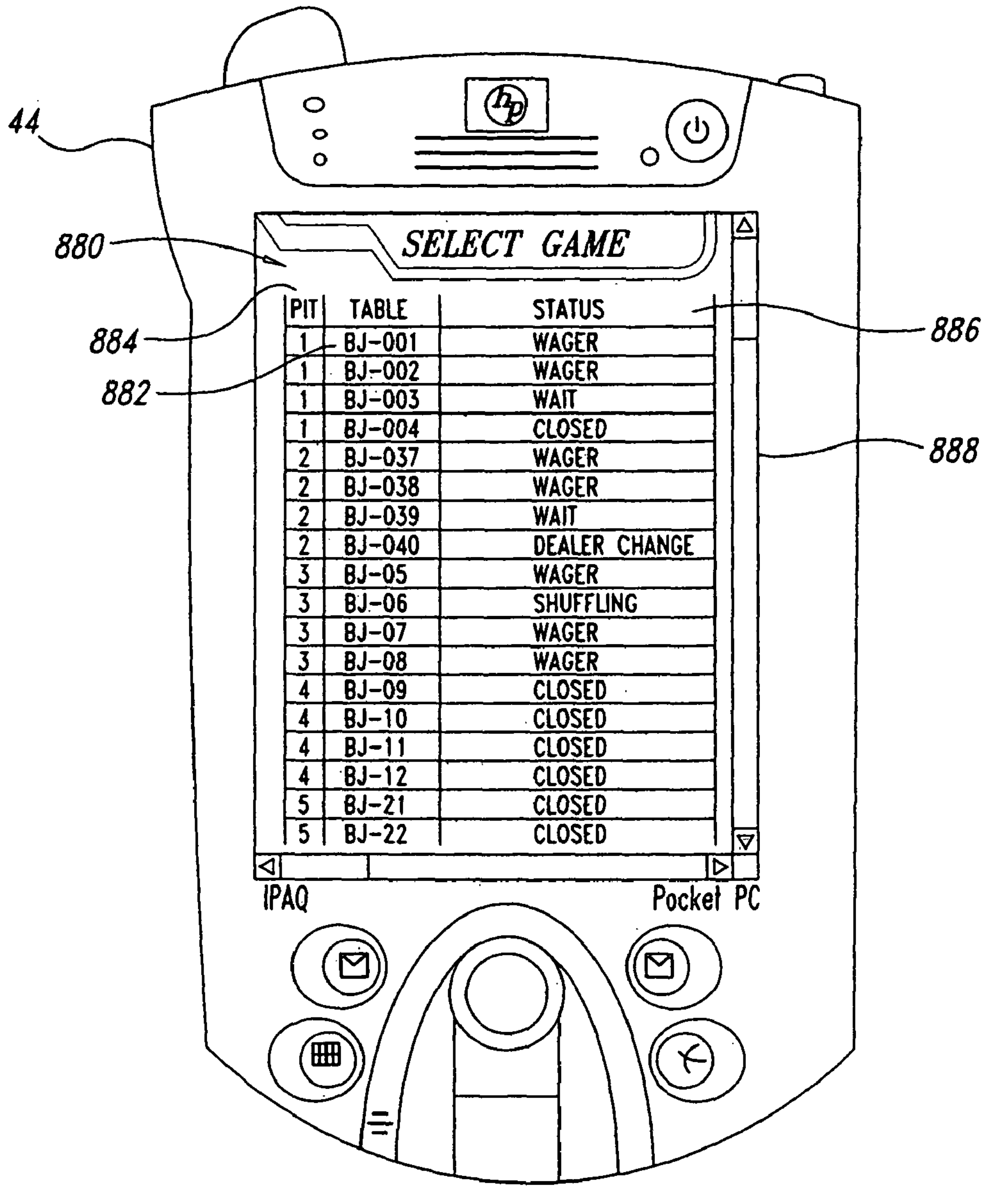
FIG. 27 is a front plan view of the wireless communications device of FIG. 1, showing a portion of a select game screen of a graphical user interface, according to one illustrated embodiment.

FIG. 27 shows a select game screen 880 of a graphical user interface as displayed by a wireless communications device 44, according to one illustrated embodiment. The select game screen 880 may be displayed in response to selection of one of the table limit icons 872*a*-872*g* (FIG. 26). The select game screen 880 allows a user to select from one or more gaming table or gaming machines.

The select game screen 880 includes a number of user-selectable game identifier icons 882 (only one called out in Figure), which identify specific gaming tables or gaming machines from which the user may select. The select game screen 880 may additionally provide a pit identifier 884 that identifies a pit in which the gaming table or machine is located, as well as a status identifier 886 that identifies a current status of the respective games. For example, the select table screen 880 may indicate that wagers are currently being accepted (e.g., WAGER), that wagers are currently not being accepted (e.g., WAIT), that the gaming table or machine is closed (e.g., CLOSED), that the dealer is being changed (e.g., DEALER CHANGE) and hence the wait may be long, that playing cards are being shuffled (e.g., SHUFFLING) and hence the wait may be long, and/or other status. The select table screen 880 may include a scroll bar 888, for reviewing long lists of gaming tables and/or machines.

Figure 28:
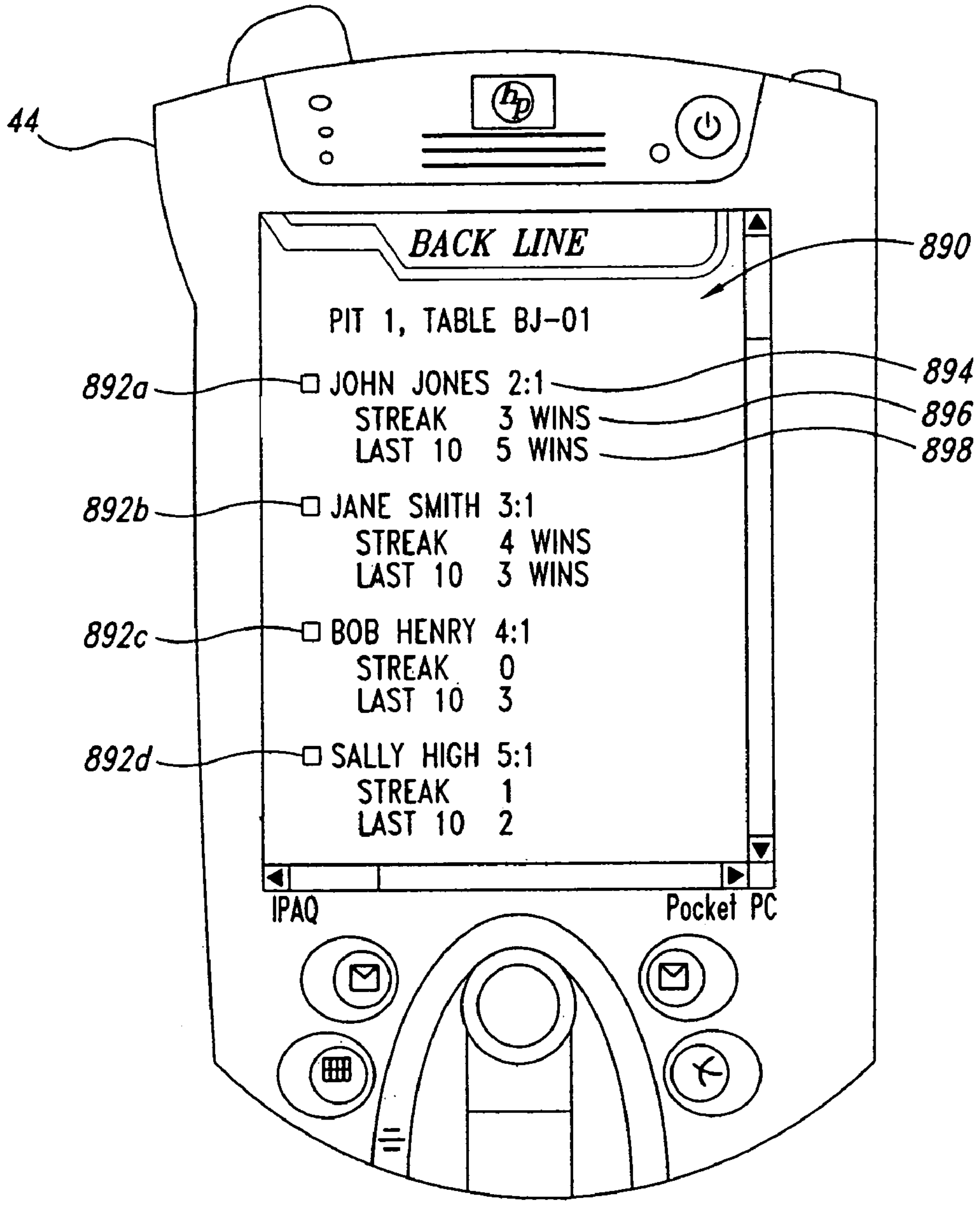
FIG. 28 is a front plan view of the wireless communications device of FIG. 1, showing a portion of a backline wagering screen of a graphical user interface, according to one illustrated embodiment.

FIG. 28 shows a backline wagering screen 890 of a graphical user interface as displayed by a wireless communications device 44, according to one illustrated embodiment. The backline wagering screen 890 may be optional, limited to environments where and/or times when backline wagering is offered. The backline wagering screen 890 allows a user to review the odds and performance of various primary players, and to select primary players to place secondary wagers on.

The backline wagering screen 890 includes user-selectable icons 892*a*-892*d* each associated with a respective primary player. The backline wagering screen 890 also provides an odds indication 894 (only one called out in Figure) of the respective odds that are being paid on a win by each of the primary players. The backline wagering screen 890 may provide additional information such as a streak indication 896 (only one called out in Figure) indicative of a current streak the primary player is running and/or a last ten games indication 898 (only one called out in Figure) indicative of the number of wins out of the last 10 games or rounds played by the primary player.

Figure 29:
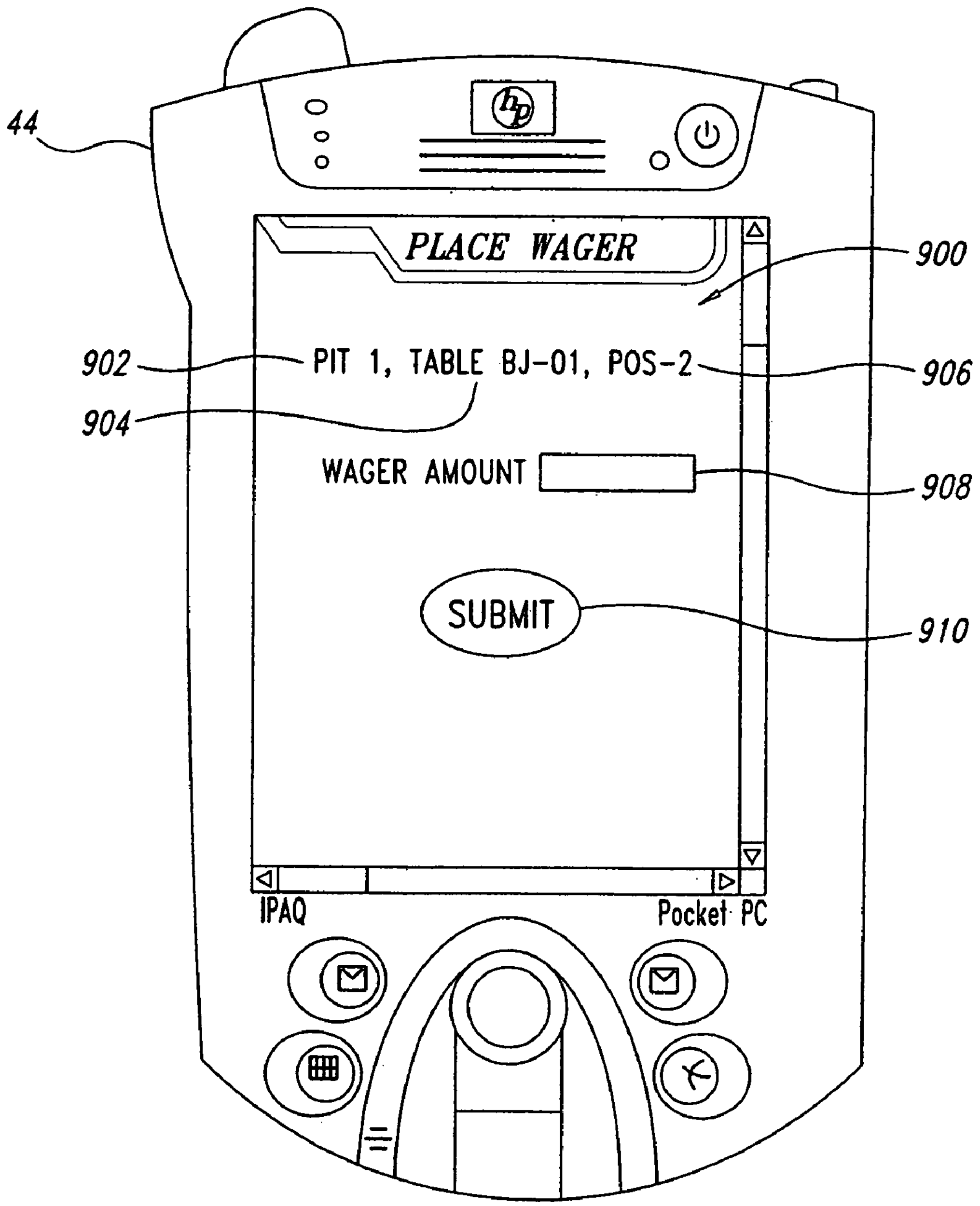
FIG. 29 is a front plan view of the wireless communications device of FIG. 1, showing a portion of a place wager screen of a graphical user interface, according to one illustrated embodiment.

FIG. 29 shows a place wager screen 900 of a graphical user interface as displayed by a wireless communications device 44, according to one illustrated embodiment. The place wager screen 900 allows a user to place wagers on selected games and/or primary players.

The place wager screen 900 provides a pit indication 902, a game indication 904 and/or a position indication 906, indicative of the selected pit, gaming table or machine, and position at the gaming table or machine, respectively. Where a backline wager is involved, the place wager screen 900 may additionally or alternatively provide a primary player indication, indicative of the identity of a selected primary player. The place wager screen 900 includes a wager amount field 908 that allows the user to enter an amount to wager, and a user-selectable submit icon 910 which the user may select to submit the wager.

Figure 30:
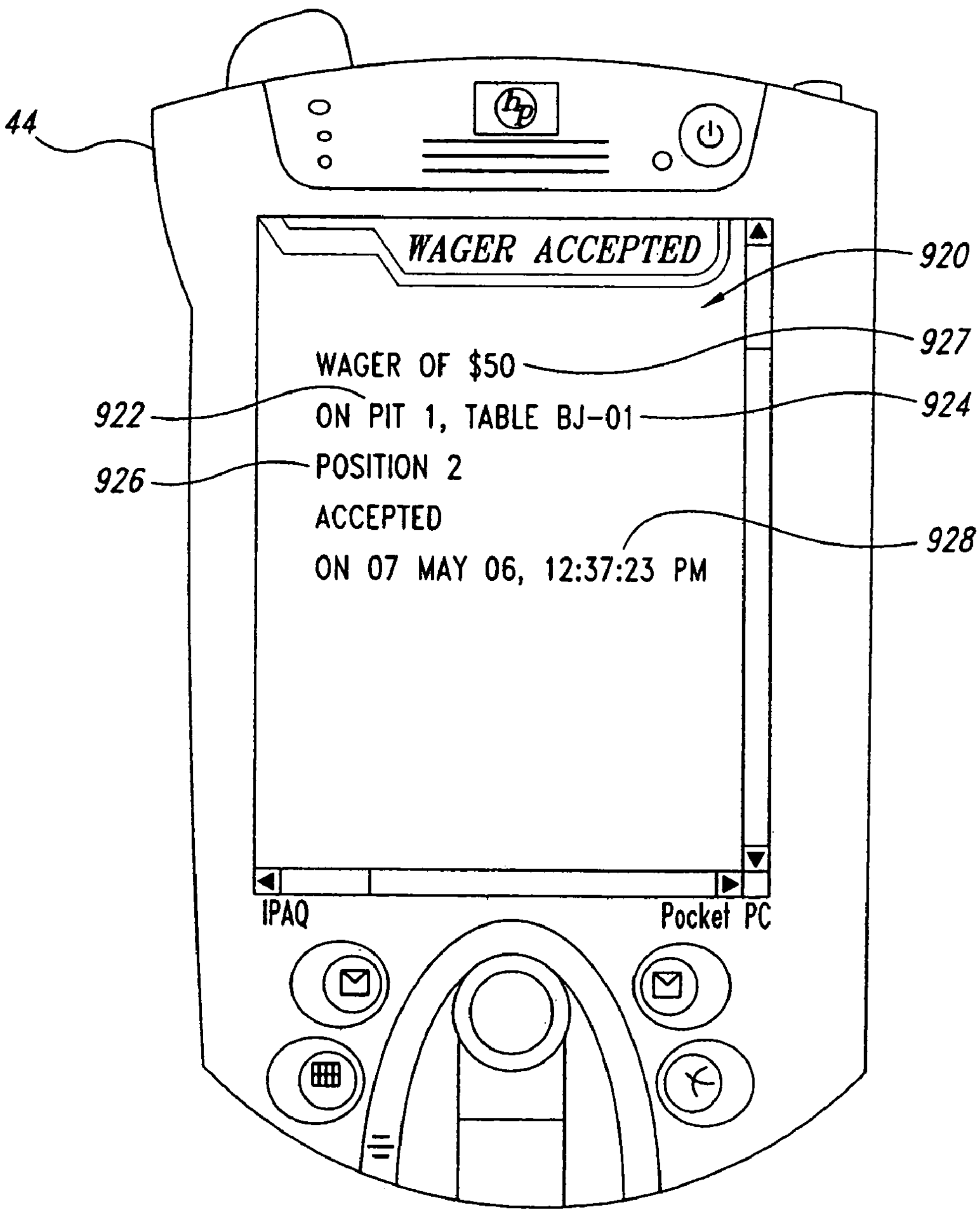
FIG. 30 is a front plan view of the wireless communications device of FIG. 1, showing a portion of a wager accepted screen of a graphical user interface, according to one illustrated embodiment.

FIG. 30 shows a wager accepted screen 920 of a graphical user interface as displayed by a wireless communications device 44, according to one illustrated embodiment. The wager accepted screen 920 is displayed to indicate that a wager has been successful submitted. The wager accepted screen 920 may include suitable information such as pit identification 922, game identification 924 and/or position identification 926 identifying the pit, table, and position, respectively. The wager accepted screen 920 may also include an identification of the amount of wagered 927 and/or date and time of wager 928.

Figure 31:
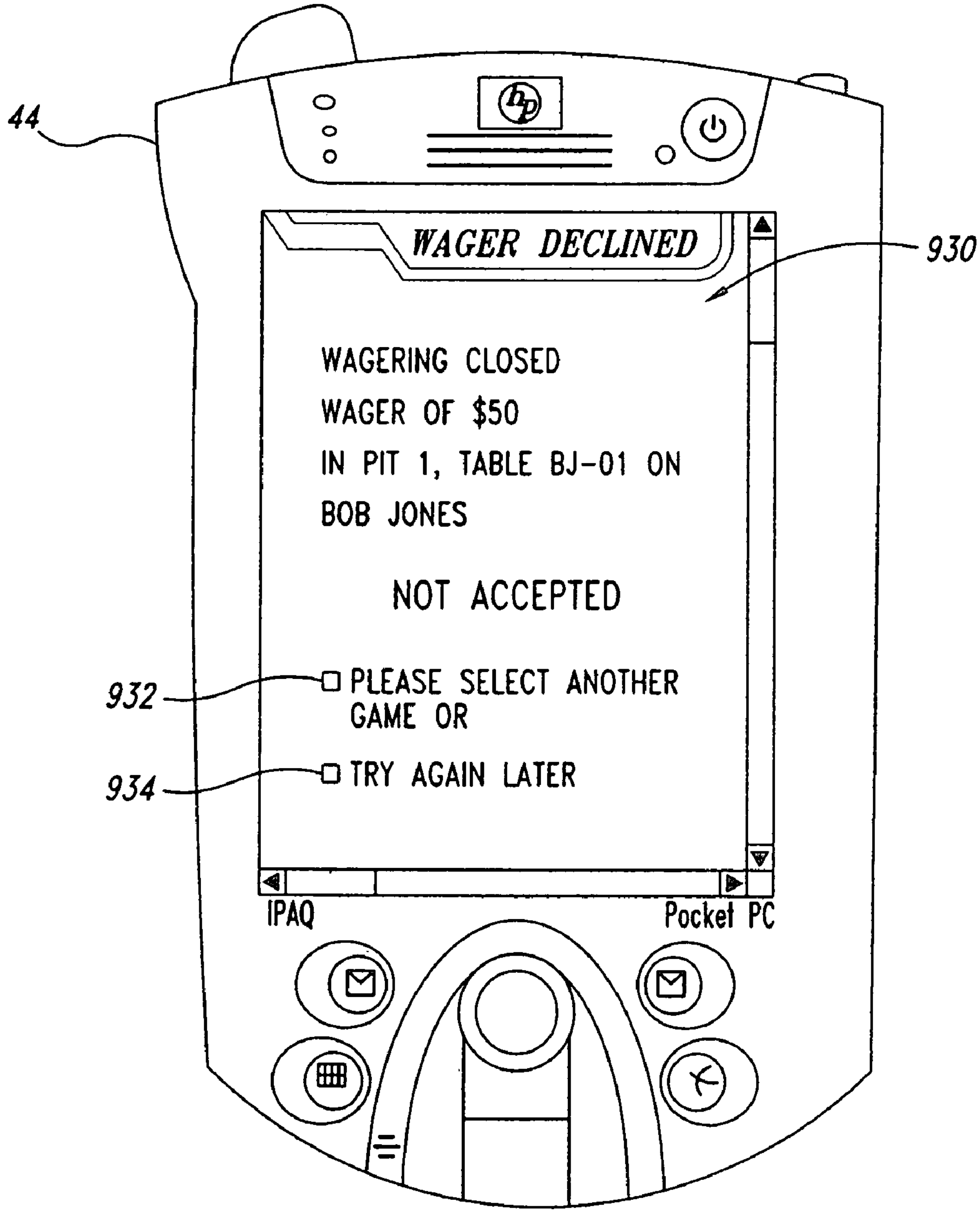
FIG. 31 is a front plan view of the wireless communications device of FIG. 1, showing a portion of a wager declined screen of a graphical user interface, according to one illustrated embodiment.

FIG. 31 shows a wager declined screen 930 of a graphical user interface as displayed by a wireless communications device 44, according to one illustrated embodiment. The wager declined screen 930 is displayed to indicate that a wager has not been successful submitted, and may include suitable information such as a user-selectable option 932 to select another game or user-selectable option 934 to wait and try to place the wager again.

Figure 32:
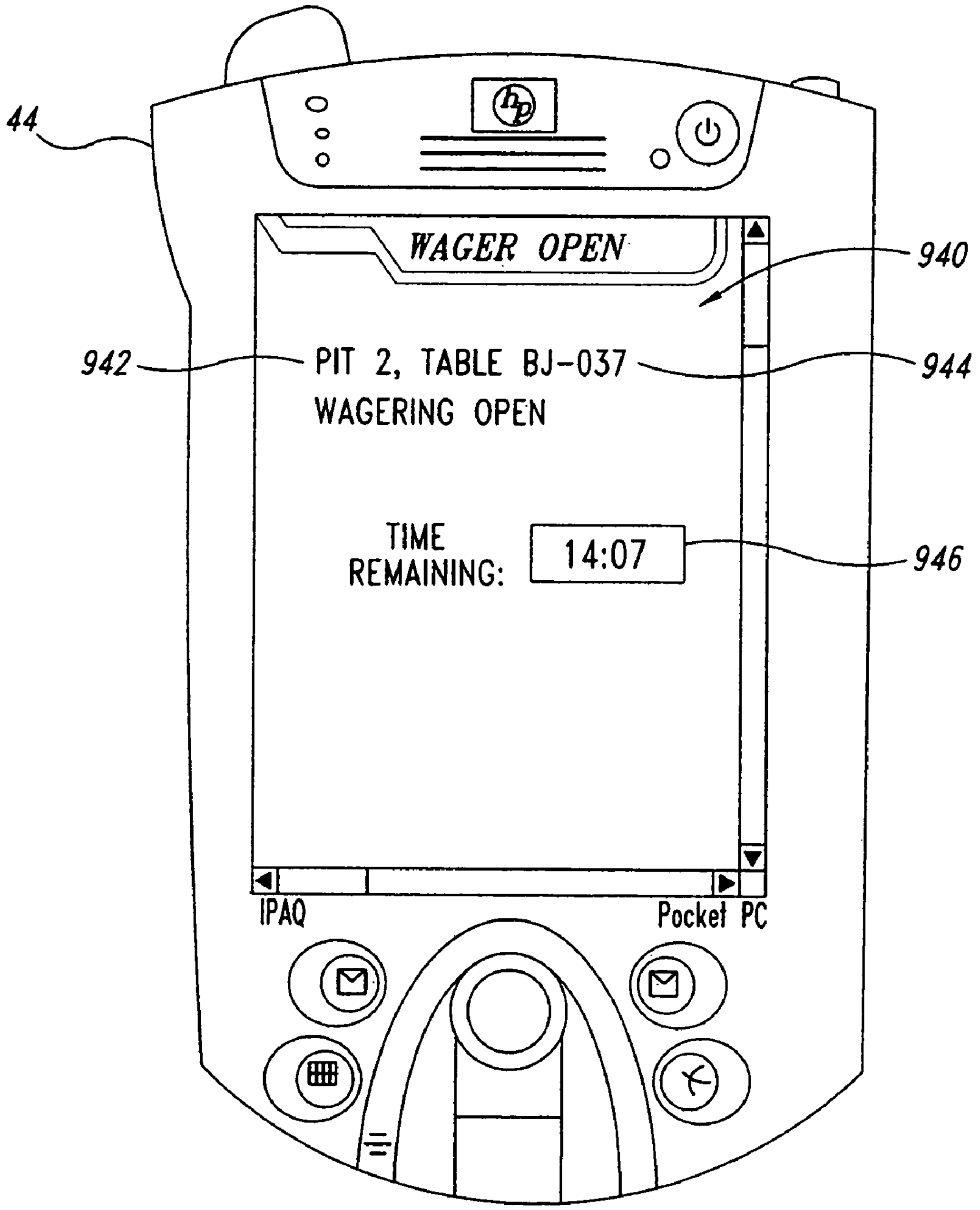
FIG. 32 is a front plan view of the wireless communications device of FIG. 1, showing a portion of a wager open screen of a graphical user interface, according to one illustrated embodiment.

FIG. 32 shows a wager open screen 940 of a graphical user interface as displayed by a wireless communications device 44, according to one illustrated embodiment. The wager open screen 940 is displayed to indicate that a wagering period for a selected game is opened, and wagers may be submitted. The wager open screen 940 may include suitable information such as pit identification 942, game identification 944 identifying the pit, and the gaming table or machine, respectively. The wager open screen 940 may also include a display 946 of the amount of time remaining for wagering. The entire wager open screen 940 may be updated from time to time to update the amount of time remaining, or the amount of time remaining may be displayed as a running clock or countdown clock.

Figure 33:
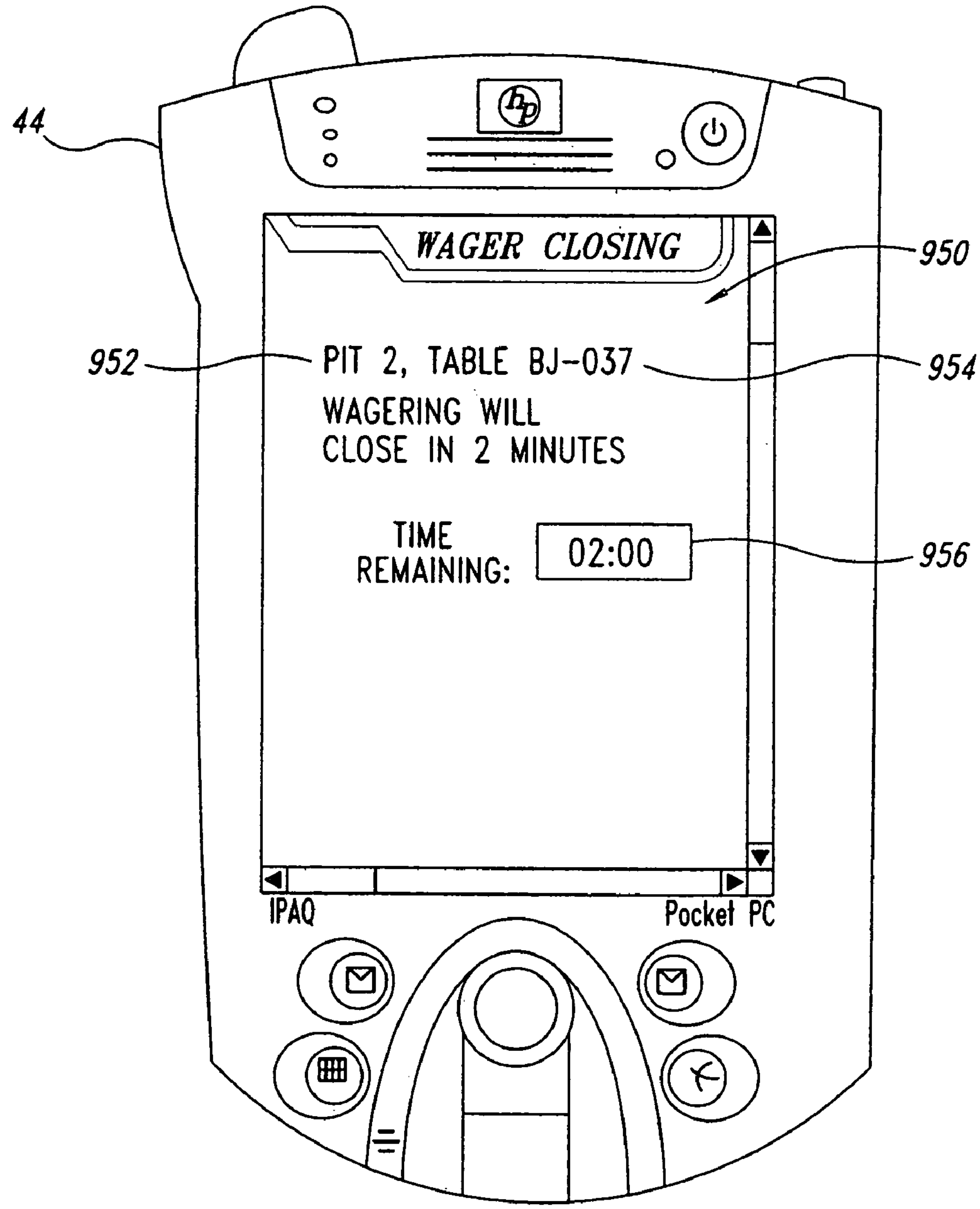
FIG. 33 is a front plan view of the wireless communications device of FIG. 1, showing a portion of a wager closing screen of a graphical user interface, according to one illustrated embodiment.

FIG. 33 shows a wager closing screen 950 of a graphical user interface as displayed by a wireless communications device 44, according to one illustrated embodiment. The wager closing screen 950 is displayed to indicate that a wagering period for a selected game will be closing shortly, and wagers may be still be submitted. The wager closing screen 950 may include suitable information such as pit identification 952 and game identification 954, identifying the pit, and the gaming table or machine, respectively. The wager closing screen 950 may additionally include a display 956 of the amount of time remaining for wagering. The entire wager closing screen 950 may be updated from time to time to update the amount of time remaining, or the amount of time remaining may be displayed as a running clock or countdown clock.

Figure 34:
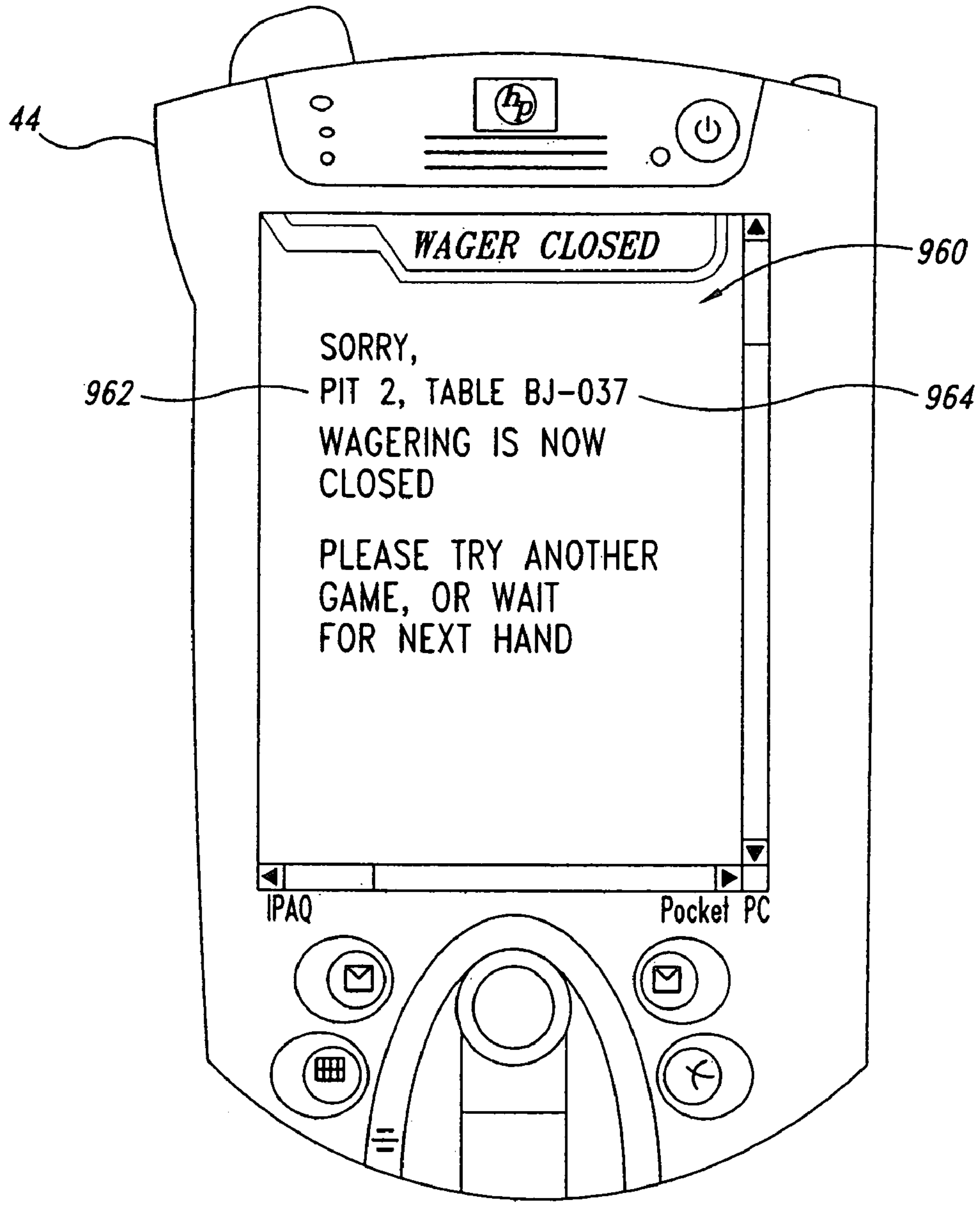
FIG. 34 is a front plan view of the wireless communications device of FIG. 1, showing a portion of a wager closed screen of a graphical user interface, according to one illustrated embodiment.

FIG. 34 shows a wager closed screen 960 of a graphical user interface as displayed by a wireless communications device 44, according to one illustrated embodiment. The wager closed screen 960 is displayed to indicate that a wagering period for a selected game is closed, and wagers may no longer be submitted. The wager closed screen 960 may provide a suitable message indicating that wagering is closed. The wager closed screen 960 may include suitable information such as pit identification 962 and game identification 964, identifying the pit, and the gaming table or machine, respectively. The message may further provide an indication of the time or estimated time at which wagering on the game will open.

Figure 35:
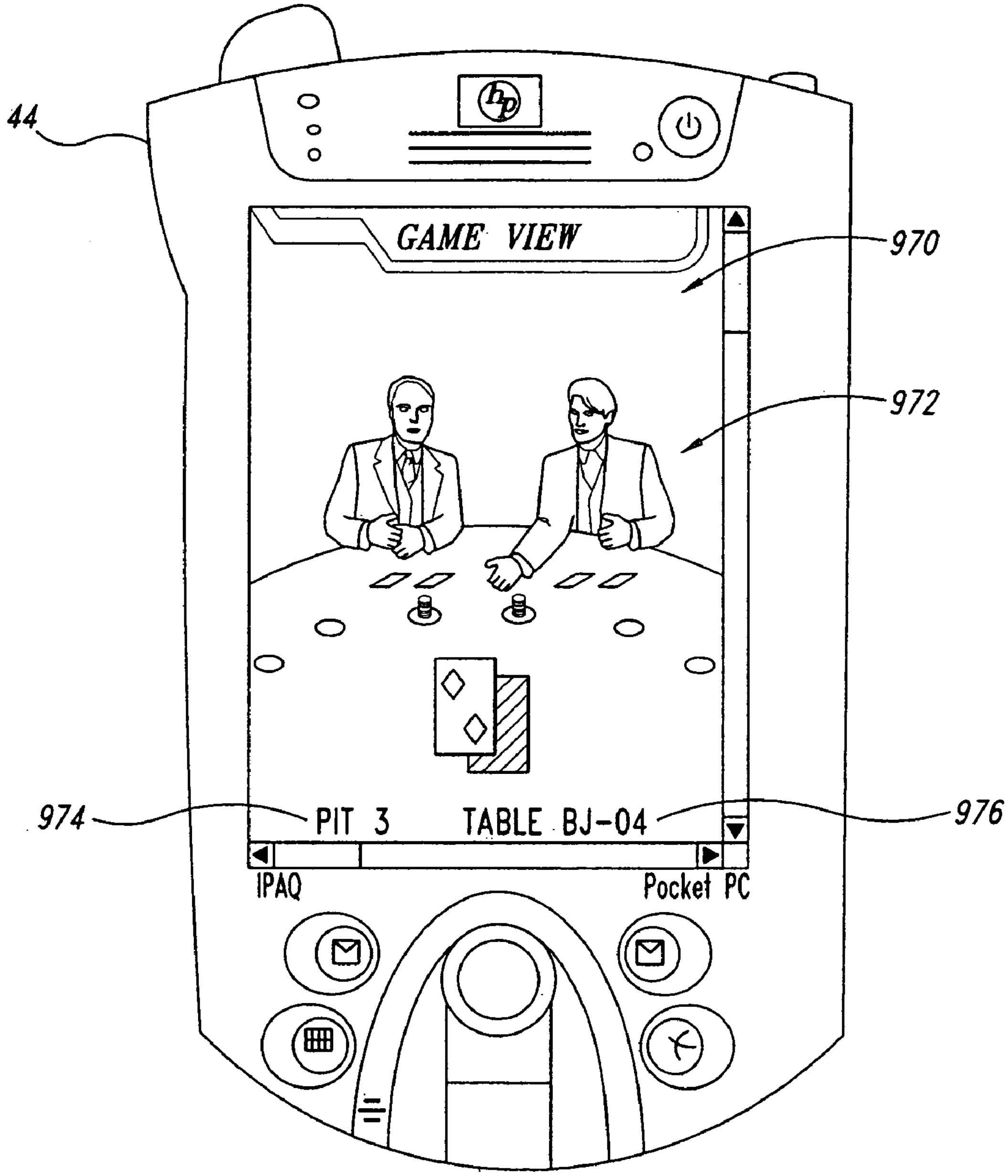
FIG. 35 is a front plan view of the wireless communications device of FIG. 1, showing a portion of a game view screen of a graphical user interface, according to one illustrated embodiment.

FIG. 35 shows a game view screen 970 of a graphical user interface as displayed by a wireless communications device 44, according to one illustrated embodiment. The game view screen 970 displays a view 972 of a game being played at a selected gaming table or machine. The view 972 may be video images of the game, simulated images created based on information gathered about the game, and/or still photographs. The game view screen 970 may include suitable information such as pit identification 974 and table identification 976 identifying the pit and table, respectively. The game view screen 970 allows the user to remotely share in the experience of the game.

Wager Transaction Packets

Figure 36:
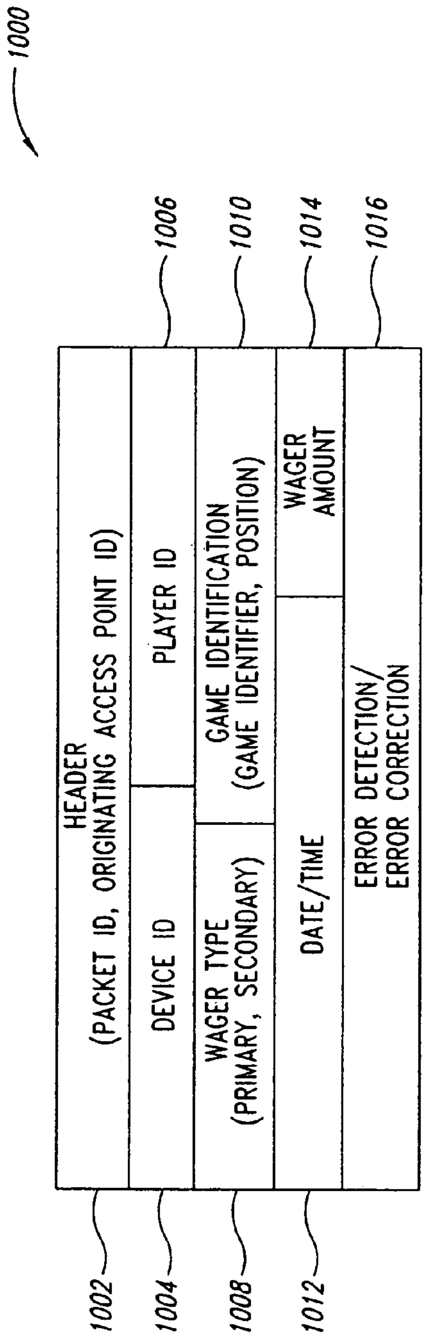
FIG. 36 is a schematic diagram of a data structure suitable to implement the wager transaction packet structure, according to one illustrated embodiment.

FIG. 36 shows a data structure 1000 suitable to implement the wager transaction packet structure according to one illustrated embodiment. The data structure may temporarily or permanently reside in a memory of the wireless communications device 44, a memory of the casino server computing system 42, memory of wireless or wired access points (e.g., pit podium personal computers 36) or other medium such as the wired or wireless communications links of the network 34. In some embodiments, the data structure 1000 will be created by the wireless communications devices 44, in other embodiments the data structure 1000 is created by the wireless or wired access points.

The data structure 1000 includes a header field 1002 which in addition to typical header information associated with communications such as packet length, may include a packet identifier that uniquely identifies the wager transaction packet, and may also include an origin identifier that uniquely identifies the originating access point for the wager transaction packet (e.g., unique identifier of a wireless access point). The data structure 1000 may include a device identifier field 1004 that stores a device identifier that uniquely identifies the wireless communications device 44 originating the wager. The data structure 1000 may optionally include a player identifier field 1006, which stores a player identifier, if known, that uniquely identifies the player placing the wager. The player identifier may be based on a prior assignment of the wireless communications device 44 to a specific player. Alternatively, the player identifier may be based on one or more inputs by the player. Such inputs may, for example, include a user name and password, biometric information, and/or swipe of a credit card, debit card, drivers license or other identification card. Such information would allow sharing of wireless communications devices 44 among two or more users, and eliminate the need to track assignment of such wireless communications devices 44. Alternatively, such information can permit the comparison of the wireless communications device identifier against the player identifier to a detect misappropriation of the wireless communications device 44, for example using a database that stores relationships or assignments between the wireless communications device identifiers and the player identifiers.

The data structure 1000 may optionally include a wager type field 1008, which stores a wager type value that identifies a type of wager being placed, for example a primary wager or a secondary wager. The data structure 1000 includes a game identification field 1010. The game identification field 1010 includes information that identifies the game on which the wager is being placed. The game identification field 1010 may, for example include a game identifier that uniquely identifies a gaming table or machine, and/or a position identifier that uniquely identifies a position at the gaming table or machine.

The data structure 1000 includes a date and time field 1012 that stores a value indicative of a date and time that the wager is being placed. Such a value may advantageously be used to associate the wager with a specific round or hand of a game being played at a particular gaming table or machine identified by the game identifier and/or position identifier. Such a value may additionally, or alternatively, advantageously be used to determine whether the wager was placed before a wager lockout period. This approach may address issues that may be raised where communications are slow or not instantaneous, to ensure that players who place wagers during the allotted wagering times are given appropriate credit, and wagers are not unfairly denied due to delays in communications. In some embodiments, the date and time field 1012 may be considered part of the game identification field 1010 or subsumed therein.

The data structure 1000 includes an amount wagered field 1014 that identifies the amount being wagered.

The data structure 1000 may include an error detection/error correction field 1016. The error detection/error correction field 1016 includes error detection and/or error correction values that allows the determination of whether an error occurred during transmission of the wager transaction packet, and in some embodiments allows the correction of some or all of those errors. Error correction may, for, example, employ Reed/Solomon error correction techniques or other known error detection or error correction techniques.

Figure 37:
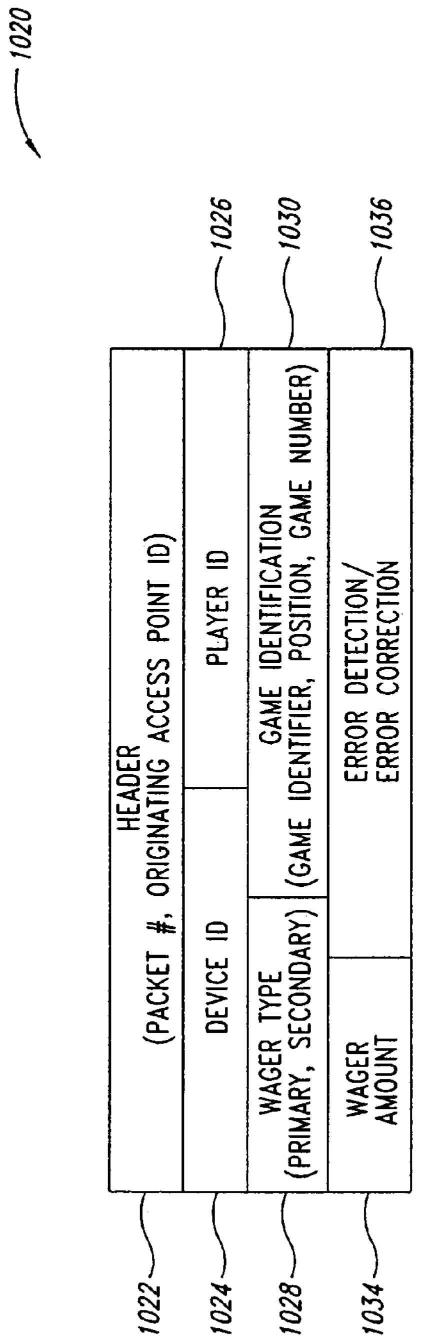
FIG. 37 is a schematic diagram of a data structure suitable to implement the wager transaction packet structure, according to another illustrated embodiment.

FIG. 37 shows a data structure 1020 suitable to implement the wager transaction packet structure according to another illustrated embodiment. The data structure may temporarily or permanently reside in a memory of the wireless communications device 44, a memory of the casino server computing system 42, memory of wireless or wired access points (e.g., pit podium personal computers 36) or other medium such as the wired or wireless communications links of the network 34. In some embodiments, the data structure 1020 will be created by the wireless communications devices 44, in other embodiments the data structure 1020 is created by the wireless or wired access points.

The data structure 1020 includes a header field 1022 which in addition to typical header information associated with communications such as packet length, may include a packet identifier that unique identifies the wager transaction packet, and may also include an origin identifier that uniquely identifies the originating access point for the wager transaction packet (e.g., unique identifier of a wireless access point). The data structure 1020 may include a device identifier field 1024 that stores a device identifier that uniquely identifies the wireless communications device 44 originating the wager. The data structure 1020 may optionally include a player identifier field 1026, which stores a player identifier, if known, that uniquely identifies the player placing the wager. The player identifier may be based on a prior assignment of the wireless communications device 44 to a specific player. Alternatively, the player identifier may be based on one or more inputs by the player. Such inputs may, for example, include a user name and password, biometric information, and/or swipe of a credit card, debit card, drivers license or other identification card. Such information would allow sharing of wireless communications devices 44 among two or more users, and eliminate the need to track assignment of such wireless communications devices 44. Alternatively, such information can permit the comparison of the wireless communications device identifier against the player identifier to a detect misappropriate of the wireless communications device 44, for example using a database that stores relationships or assignments between the wireless communications device identifiers and the player identifiers.

The data structure 1020 may optionally include a wager type field 1028, which stores a wager type value that identifies a type of wager being placed, for example a primary wager or a secondary wager. The data structure 1020 includes a game identification field 1030. The game identification field 1030 includes information that identifies the game on which the wager is being placed. The game identification field 1030 may, for example include a game identifier that uniquely identifies a gaming table or machine, and/or a position identifier that uniquely identifies a position at the gaming table or machine, and a game number that uniquely identifiers a round or hand of the game being played at the gaming table or machine. Thus, for example, the game number may be incremented for each round of a blackjack game that is dealt during a gaming session (e.g., time while table is in use; dealer sessions, etc). The game number may advantageously be used to associate the wager with a specific round or hand of a game being played at a particular gaming table or machine identified by the game identifier and/or position identifier. By comparing the time of receipt of the wager transaction packet with a start time for a round or hand identified by the game number, it may be determined whether the wager was placed before a wager lockout period. This approach may provide enhanced security since date and time information is controlled by the casino server computing system 42 rather than the wireless communications device 44 or one or the access points.

The data structure 1020 includes an amount wagered field 1034, that identifies the amount being wagered.

The data structure 1020 may include an error detection/error correction field 1036. The error detection/error correction field 1036 includes error detection and/or error correction values that allows the determination of whether an error occurred during transmission of the wager transaction packet, and in some embodiments allows the correction of some or all of those errors. Error correction may, for, example, employ Reed/Solomon error correction techniques or other known error detection or error correction techniques.

Figure 38:
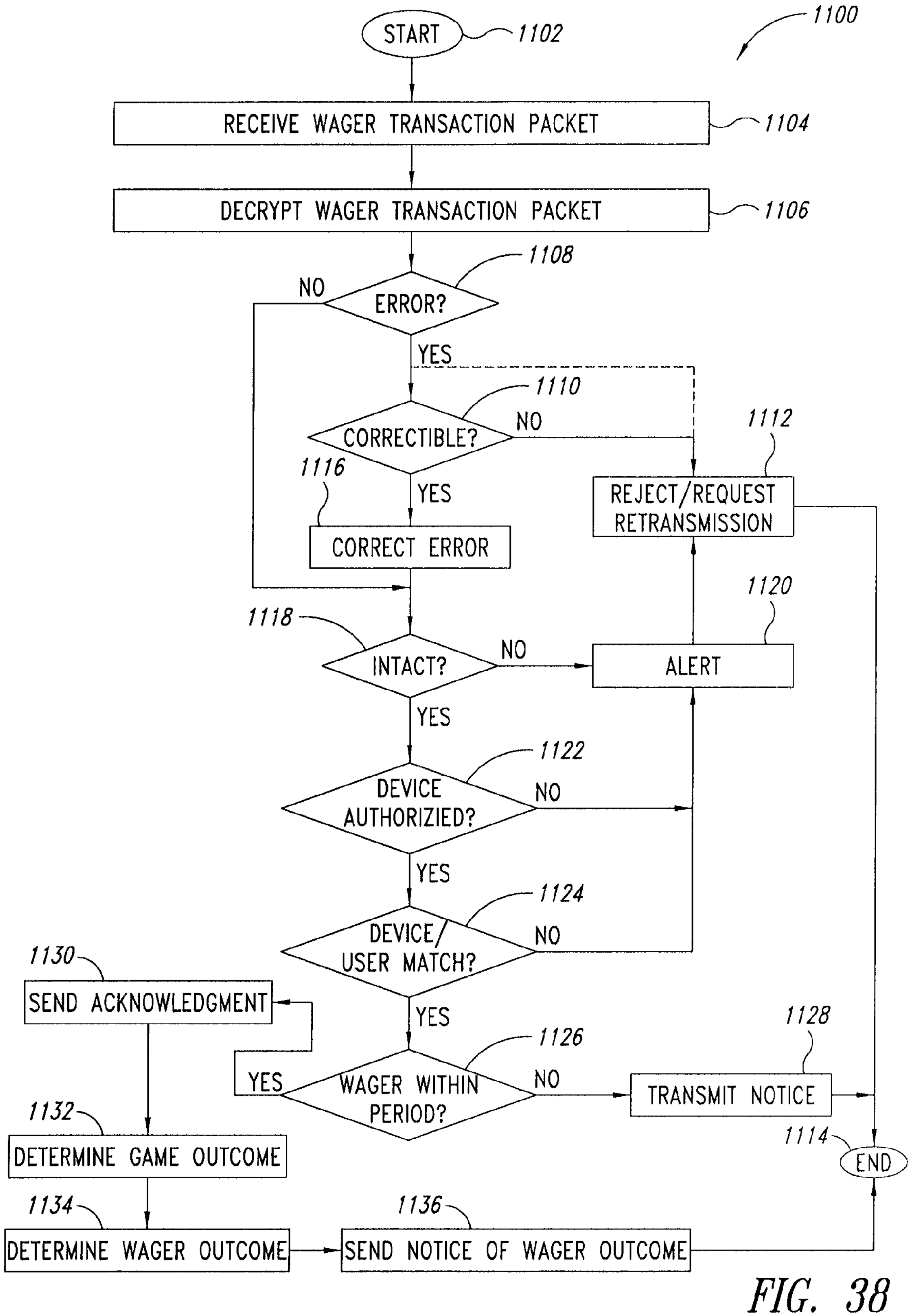
FIG. 38 is a flow diagram of a method of operating the casino server computing system, according to one illustrated embodiment.

FIG. 38 shows a method 1100 suitable for execution on a casino server computing system 42, according to one illustrated embodiment.

The method 1100 starts at 1102, for example on supplying power to the casino server computing system 42, or in response to being called by another routine. The method 1100 may run sequentially, and/or may be executed as separate threads or processes in parallel.

At 1104, the casino server computing system 42 receives a wager transaction packet. The wager transaction packet may be received via a network, over a wired or wireless communications channel.

Optionally, at 1106 the casino server computing system 42 decrypts the wager transaction packet. The casino server computing system 42 may employ any suitable known or later developed encryption/decryption scheme or algorithm.

Optionally, at 1108 the casino server computing system 42 determines whether there is an error in the wager transaction packet. For example, an error may—occur during the creation of the wager transaction packet and/or during the transmission of the wager transaction packet. The casino server computing system 42 may employ any suitable known or later developed error detection (e.g., parity) scheme or algorithm.

If an error is detected, control may pass to 1110 where the casino server computing system 42 determines if the error is correctable. Some embodiments may advantageously employ error correction to reduce the number of times information is retransmitted. If the error is not correctable, control passes to 1112 where the casino server computing system 42 rejects the wager transaction packet and/or requests retransmission of the wager transaction packet, and the method 1100 terminates at 1114. If the error is correctable, the casino server computing system 42 corrects the error at 1116. The casino server computing system 42 may employ any suitable known or later developed error correction scheme or algorithm.

Some embodiments may omit error correction to advantageously reduce the overhead associated with such. In such embodiments, upon detection of an error at 1108 control may pass directly to 1112.

At 1118, the casino server computing system 42 determines whether the wager transaction packet was received intact. This may help ensure that the information contained in the wager transaction packet is authenticated and that a power failure or interruption in communications does not present an opportunity for a breach of security. If the wager transaction packet was not received intact, the casino server computing system 42 may issue an alert or cause an alert to be issued at 1120. The wager transaction packet may then be rejected at 1112, and the method 1100 terminates at 1114.

If the wager transaction packet was received intact, control passes to 1122 where the casino server computing system 42 determines whether the wireless communications device 44 sending the wager transaction packet is an authorized device. The casino server computing system 42 may verify that the wireless communications device 44 is authorized using a lookup table or other database. The database may reflect the status of wireless communications devices provided by the casino or registered with the casino. If the wireless communications device 44 is not authorized, an alert is issued at 1120, the wager packet is rejected at 1112, and the method 1100 terminates at 1114. If the wireless communications device 44 is not authorized, control passes to 1124.

At 1124, the casino server computing system 42 determines whether the user submitting the wager is authorized to use the particular wireless communications device 44 that is generating or originating the wager transaction packet. The casino server computing system 42 may verify that the wireless communications device 44 is authorized using a lookup table or other database. The database may reflect the relationship between wireless communications devices and users. If the user is not authorized to use the particular wireless communications device 44, an alert is issued at 1120, the wager packet is rejected at 1112, and the method 1100 terminates at 1114. If the user is authorized to use the particular wireless communications device 44, control passes to 1126.

At 1126, casino server computing system 42 determines whether the wager was placed within a period during which wagers on the game were or are being accepted. This may be in addition to or as a substitute for the check or verification performed by the wireless communications device 44. The casino server computing system 42 may use the time that the wager was entered into or sent by the wireless communications device 44 as the time the wager is placed. Alternatively, the casino server computing system 42 may use the time that the wager transaction packet was received at a wireless remote access point of the network as the time the wager is placed. Alternatively, the casino server computing system 42 may use the time that the wager transaction packet was received by the casino server computing system 42 as the time the wager is placed.

The casino server computing system 42 may employ a "real-time" approach, only accepting wagers received at the casino server computing system 42 while the respective wagering period is actually open. Additionally or alternatively, the casino server computing system 42 may accept wagers which are received at the casino server computing system 42 after the respective wagering period is closed, if the casino server computing system 42 determines that the wager was placed while the respective wagering period was open. This advantageously addresses possible issues related to delays in communications over the network. To achieve such, the casino server computing system 42 may temporarily keep a database or other record of time periods during which wagering is allowed for different games, hands or rounds.

If the wager is not placed during an open wagering period, the casino server computing system 42 transmits a notice at 1128 to the respective wireless communications device 44, and the method 1100 terminates at 1114. Otherwise, the casino server computing system 42 optionally sends an acknowledgement to the respective wireless communications device 44 at 1130.

At 1132, the casino server computing system 42 determines the game outcome. The casino server computing system 42 may rely on information received by one or more sensors and/or computing systems associated with the particular gaming table or machine. At 1134, the casino server computing system 42 determines the outcome of the wager, based at least in part on the outcome of the game, the wager amount in the wager transaction packet and any odds associated with the game or wager. At 1136, the casino server computing system 42 transmits a notice of the wager outcome to the respective wireless communications device 44, and the method 1100 terminates at 1114.

SUMMARY

The wireless communications devices 44 allow casino personnel to timely enter information into the computing system regarding employees and/or players. Thus, data may be collected for games that have not yet been automated. This allows real time tracking and management of the various aspects of the casino, and eliminates a potential source of errors since data is manually entered at most only once. This also allows awarding of comps in real time, encouraging further play by the players. This also allows players to redeem the comps in real time. Further, players who are issued or purchase the wireless communications devices may play, track their own performance and/or comps, and may order merchandise and/or services as soon as sufficient comps are awarded, and without having to leave the table, hotel room or other facility. The use of location determination such as GPS, permits services and/or merchandise to be delivered directly to the player without any need for the player to identify a delivery location. Thus, a player may, for example, order and receive a drink or snack without having to leave the table, or to request that their car or transportation be ready at an appointed time and location.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/791,397 filed Apr. 12, 2006; U.S. Pat. Nos. 6,460,848, issued Oct. 8, 2002, and entitled "METHOD AND APPARATUS FOR MONITORING CASINOS AND GAMING"; U.S. Pat. No. 6,652,379, issued Nov. 25, 2003, and entitled "METHOD, APPARATUS AND ARTICLE FOR VERIFYING CARD GAMES, SUCH AS BLACKJACK"; and U.S. Pat. No. 6,685,568, issued Feb. 3, 2004, and entitled "METHOD, APPARATUS AND ARTICLE FOR EVALUATING CARD GAMES, SUCH AS BLACKJACK"; and U.S. Patent Publication Nos. 2002/0187821, published Dec. 12, 2002, and entitled "METHOD, APPARATUS AND ARTICLE FOR RANDOM SEQUENCE GENERATION AND PLAYING CARD DISTRIBUTION"; and 2003/0176209, published Sep. 18, 2003, and entitled "METHOD, APPARATUS AND ARTICLE EMPLOYING MULTIPLE MACHINE-READABLE INDICIA ON PLAYING CARDS"; are incorporated herein by reference, in their entirety.

Although specific embodiments and examples are described herein for illustrative purposes, various equivalent modifications can be made without departing from the spirit and scope of the invention, as will be recognized by those skilled in the relevant art. The teachings provided herein can be applied to other systems for casino communications, not necessarily the handheld PDA based system generally described above. For example, the teachings can employ wireless communications devices such as cellular telephones, and cellular systems. Additionally, the teachings can employ networks other than dedicated Extranets, for example, the teachings may employ a network such as the Worldwide Web portion on the Internet, to interconnect some or all of the various described components. The various embodiments described above can be combined to provide further embodiments. The illustrated methods can omit some acts, can add other acts, and can execute the acts in a different order than that illustrated to achieve the advantages of the invention.

These and other changes can be made to the invention in light of the above detailed description. In general, in the following claims, the terms used should not be construed to limit the invention to specific embodiments disclosed in the specification, but should be construed to include all computers, networks, databases, and wireless communications devices that operate in accordance with the claims. Accordingly, the invention is not limited by the disclosure, but instead its scope is to be determined entirely by the following claims.

I claim:

1. A method of operating a server computing system to facilitate remote wagering on table games with wireless communications devices located in a casino, the method comprising:

receiving a wager transaction packet including device information indicative of a device identifier that identifies a wireless communications device, located in a casino, that produced the wager transaction packet, player information indicative of a player identifier that identifies a player authorized to use the wireless communications device that produced the wager transaction packet, a wager, a game occurring at a gaming table on which the wager is being placed, and an indication of a date and time when the wager was entered into the wireless communications device;

determining an outcome of the wager based on at least one gaming event occurring at the gaming table;

transmitting outcome information indicative of the outcome of the wager to the wireless communications device that produced the wager transaction packet;

determining based at least in part on the indication of the date and time when the wager was entered into the wireless communications device, whether the date and time the wager was entered into the wireless communications device is within a period during which wagers on the game were being accepted;

verifying that the wireless communications device identified by the device identifier is presently authorized for use at the casino based at least on the device information contained in the wager transaction packet for each received wager transaction packet; and verifying that a respective player is presently authorized to use the wireless communications device identified by the device identifier to wager on the game based at least on a respective player identifier for each received wager transaction packet, wherein the respective player is identified by the respective player identifier based at least on the player information contained in the wager transaction packet.

2. The method of claim 1, further comprising:

determining whether the wager transaction packet was received intact at the server computing system.

3. The method of claim 2, further comprising:

denying the wager if the wager transaction packet is determined to have not been received intact at the server computing system; and producing an alert if the wager transaction packet is determined to have not been received intact at the server computing system.

4. The method of claim 1, further comprising:

decrypting the wager transaction packet.

5. The method of claim 1, further comprising:

accepting the wager if the date and time the wager was entered into the wireless communications device is within the period during which wagers on the game were being accepted;

rejecting the wager if the date and time the wager was entered into the wireless communications device is not within the period during which wagers on the game were being accepted.

6. The method of claim 5, further comprising:

providing an indication of rejection to the wireless communications device if the wager is rejected.

7. The method of claim 1, further comprising:

determining whether the wager transaction packet was received by a wireless access point within the period during which wagers on the game were being accepted.

8. The method of claim 1, further comprising:

determining whether the wager transaction packet was received by the server computing system within the period during which wagers on the game were being accepted.

9. The method of claim 1, further comprising:

transmitting an acknowledgment of receipt of the wager transaction packet to the wireless communications device that produced the wager transaction packet.

10. The method of claim 1, further comprising:

determining whether an error has occurred during transmission of the wager transaction packet.

11. The method of claim 1, further comprising:

correcting an error that has occurred during transmission of the wager transaction packet based at least in part on error correction information from the wager transaction packet.

12. The method of claim 1, further comprising:

verifying that the wager transaction packet was received via a wireless access point located within a defined geographic boundary.

13. The method of claim 1 wherein the wager transaction packet includes an indication of geographic location of the wireless communications device when the wager was entered into the wireless communications device, and further comprising:

determining based at least in part on the indication of the geographic location of the wireless communications device when the wager was entered into the wireless communication device, whether the wireless communications device was located within a defined geographic boundary when the wager was entered into the wireless communications device.

14. A system to facilitate remote wagering on table games, the system comprising:

a server computing system comprising at least one processor and at least one processor-readable memory that stores instructions executable by the processor to cause the processor to process wager transaction packets by:

receiving a plurality of wager transaction packets, each wager transaction packet including information indicative of an identity of a wireless communications device, at the casino, that produced the wager transaction packet and player information indicative of an identity of a respective player, a wager amount, and a game occurring at a gaming table on which the wager is being placed;

for each of the wagers, determining an outcome of the wagers based on at least one gaming event occurring at the gaming table;

verifying that the wireless communications device identified by the device identifier is presently authorized for use at the casino based at least on the device information contained in the wager transaction packet for each received wager transaction packet; and verifying that a respective player is presently authorized to use the wireless communications device identified by the device identifier to wager on the game based at least on a respective player identifier for each received wager transaction packet, wherein the respective player is identified by the respective player identifier based at least on the player information contained in the wager transaction packet; and for at least some of the wagers, transmitting information indicative of the outcome of the wager to the wireless communications device that produced the respective wager transaction packet; and wherein the instructions cause the processor to process wager transaction packets further by:

determining whether wagers are being accepted; and providing a message to a user of the wireless communications device indicative of an amount of time remaining during which wagers are being accepted.

15. The system of claim 14, further comprising: a plurality of wireless communications devices, each comprising at least one respective processor and at least one respective processor-readable memory that stores instructions executable by the respective processor of the respective wireless communications device to cause the processor of the respective wireless communications device to generate wager transaction packets by:

receiving user input at the respective wireless communications device indicating a respective wager to be placed on the game occurring at the gaming table;

in response, creating one of the wager transaction packets including information indicative of the respective identity of the respective wireless communications device, the respective wager amount, and the game on which the respective wager is placed; and transmitting the respective wager transaction packet intact to the server computing system via a network, where the respective wager transaction packet remains intact during transmission between the respective wireless communications device and the server computing system.

16. The system of claim 14 wherein wireless communications devices cause the processor of the server to process wager transaction packets further by: including information indicative of a respective date and time at which the respective wager is placed.

17. The system of claim 14, further comprising:

a plurality of wireless access points positioned at respective locations in a casino property, the wireless access points having a geographical range limited to within a boundary of the casino property.

* * * * *

UNITED STATES PATENT AND TRADEMARK OFFICE

CERTIFICATE OF CORRECTION

PATENT NO. : 7,967,682 B2
APPLICATION NO. : 11/480274
DATED : June 28, 2011
INVENTOR(S) : Richard Huizinga It is certified that error appears in the above-identified patent and that said Letters Patent is hereby corrected as shown below:

Page 2, Col. 2, Line 8, Item 56:
"5,999,808 A 12/1999 LaDue 455/412.2" should read, --5,999,808 A 12/1999 LaDue 455/412--.

Column 33, Line 35:
"communication device, whether the wireless communications" should read, --communications device, whether the wireless communications--.

Signed and Sealed this
Sixteenth Day of August, 2011

David J. Kappos
*Director of the United States Patent and Trademark Office*